US006199162B1

(12) United States Patent
Luyster

(10) Patent No.: US 6,199,162 B1
(45) Date of Patent: Mar. 6, 2001

(54) BLOCK CIPHER METHOD

(76) Inventor: Frank C. Luyster, 100 Riverside La., Riverside, CT (US) 06878

( * ) Notice: Subject to any disclaimer, the term of this patent is extended or adjusted under 35 U.S.C. 154(b) by 0 days.

(21) Appl. No.: 09/506,285

(22) Filed: Feb. 17, 2000

Related U.S. Application Data

(63) Continuation of application No. 09/154,391, filed on Sep. 16, 1998
(60) Provisional application No. 60/059,142, filed on Sep. 17, 1997, provisional application No. 60/062,992, filed on Oct. 23, 1997, provisional application No. 60/064,331, filed on Oct. 30, 1997, provisional application No. 60/094,632, filed on Jul. 30, 1998, provisional application No. 60/096,788, filed on Aug. 17, 1998, provisional application No. 60/096,921, filed on Aug. 18, 1998, and provisional application No. 60/098,905, filed on Sep. 2, 1998.

(51) Int. Cl.[7] ........................................ G06F 1/26
(52) U.S. Cl. .................. 713/168; 713/171; 713/200; 713/201; 380/28; 380/44
(58) Field of Search ................... 380/28, 44; 713/168, 713/171, 182, 200, 201

(56) References Cited

U.S. PATENT DOCUMENTS

| | | | |
|---|---|---|---|
| 4,078,152 | 3/1978 | Tuckerman, III | 178/22 |
| 4,157,454 * | 6/1979 | Becker | 380/37 |
| 4,160,120 * | 7/1979 | Barnes et al. | 380/29 |
| 4,168,396 * | 9/1979 | Best | 380/37 |
| 4,249,180 | 2/1981 | Eberle et al. | 375/2 |
| 4,255,811 | 3/1981 | Adler | 375/2 |
| 4,306,111 * | 12/1981 | Lu et al. | 380/30 |
| 4,308,617 * | 12/1981 | German, Jr. | 375/208 |
| 4,724,541 | 2/1988 | Mallick | 380/28 |
| 5,003,596 | 3/1991 | Wood . | |
| 5,003,597 | 3/1991 | Merkle | 380/37 |
| 5,054,067 | 10/1991 | Moroney et al. | 380/37 |
| 5,214,704 | 5/1993 | Mittenthal | 380/37 |
| 5,317,638 | 5/1994 | Kao et al. . | |
| 5,351,299 | 9/1994 | Matsuzaki et al. | 380/37 |
| 5,381,480 | 1/1995 | Butter et al. . | |
| 5,454,039 | 9/1995 | Coppersmith et al. | 380/28 |
| 5,724,428 | 3/1998 | Rivest . | |
| 5,727,062 | 3/1998 | Ritter . | |
| 5,838,796 | 11/1998 | Mittenthal . | |

OTHER PUBLICATIONS

Burton S. Kaliski Jr. and Yiqun Lisa Yin, On Differential and Linear Cryptanalysis of the RC5 Encryption Algorithm, Lecture Notes in Computer Science, vol. 963, pp. 171–184, Aug. 1995.

(List continued on next page.)

Primary Examiner—Thomas R. Peeso
(74) Attorney, Agent, or Firm—Cantor Colburn LLP

(57) ABSTRACT

A data encryption system for encrypting an n-bit block of input in a plurality of rounds is presented, where n is preferably 128 bits or more. The data encryption system includes a computing unit for the execution of each round; memory for storing and loading segments; a bit-moving function capable of rotating, shifting, or bit-permute round segments by predetermined numbers of bits preferably to achieve active and effective fixed rotation; a linear combination function which provides new one-to-one round segments using a round operator generally from one algebraic group to combine two different one-to-one round segments taken from one one-to-one round segment set; and a nonlinear function which affects a one-to-one round segment from a particular one-to-one round segment set based on a value which depends on a preselected number of bits in a preselected location from a different one-to-one round segment from the same one-to-one round segment set. The nonlinear function is a variable rotation function or an s-box. A subkey combining function is generally employed in each round to provide new round segments by combining a round segment typically linearly with a subkey segment.

248 Claims, 14 Drawing Sheets

OTHER PUBLICATIONS

Ronald L. Rivest, The RC5 Encryption Algorithm, Lecture Notes in Computer Science, vol. 1008, pp. 86–96, Dec. 1994.

Lars R. Knudsen and Willi Meier, Improved Differential Attacks on RC5, Lecture Notes in Computer Science, vol. 1109, pp. 216–228, Aug. 1996.

Bruce Schneier and Doug Whiting, Fast Software Encryption: Designing Encryption Algorithms for Optimal Software Speed on the Intel Pentium Processor, Lecture Notes in Computer Science, vol. 1267, pp. 242–259, Jan. 1997.

Lars R. Knudsen & Willi Meier; Differential Cryptanalysis of RC5 (1), Pub. European Transactions on Telecommunication, vol. 8, No. 5, Sep. 23, 1997.

W.E. Madryga; A high Performance Encryption Algorithm, Pub. 1984.

Ronald L. Rivest, M.J.B. Robshaw, R. Sidney and Y.L. Yin; The RC6 Block Cipher, Pub. Aug. 20, 1998.

John Kelsey, Bruce Schneir and David Wagner; Key–Schedule Cryptanalysis of IDEA, G–DES, GOST, SAFER, and Triple–DES.

* cited by examiner

WHERE THE LINEAR OPERATIONS ARE:
L2, L6 = xor          L4, L8 = xor
L3, L7 = ADDITION     L5, L9 = ADDITION

BLOCK CIPHER METHOD

CROSS-REFERENCE TO RELATED APPLICATIONS

This is a continuation of application Ser. No. 09/154,391 entitled "IMPROVED BLOCK CIPHER METHOD" filed Sep. 16, 1998, which claims priority to Provisional Application Ser. No. 60/059,142 entitled "IMPROVED BLOCK CIPHER METHOD", filed on Sep. 17, 1997; Provisional Application Ser. No. 60/062,992 entitled "IMPROVED BLOCK CIPHER METHOD" filed on Oct. 23, 1997; Provisional Application Ser. No. 60/064,331 entitled "IMPROVED BLOCK CIPHER METHOD" filed Oct. 30, 1997; Provisional Application Ser. No. 60/094,632 entitled "IMPROVED BLOCK CIPHER METHOD" filed Jul. 30, 1998; Provisional Application Ser. No. 60/096,788 entitled "THE STEELTALON ENCRYPTION ALGORITHM" filed Aug. 17, 1998; Provisional Application Ser. No. 60/096,921 entitled "IMPROVED BLOCK CIPHER METHOD" filed Aug. 18, 1998; and Provisional Application Ser. No. 60/098,905 entitled "IMPROVED BLOCK CIPHER METHOD" filed Sep. 2, 1998 by the same inventor hereof.

FIELD OF INVENTION

This invention relates to block cipher secret-key cryptographic systems and methods. More particularly, the invention relates to improvements in a secret-key cryptographic system and method which uses data-dependent and variable rotations of data in block cipher rounds which are dependent, directly of indirectly, on plaintext data being enciphered.

BACKGROUND OF THE INVENTION

Cryptography is the science of securing communications and information. In recent years, the importance of cryptographic systems has been magnified by the explosive growth and deployment of telecommunications technology. Increasing volumes of confidential data are being transmitted across telecommunications channels and are being stored in file servers, where such data ranges from financial information to electronic votes. It is desired that systems provide security from unsanctioned or illicit interception or modification of such confidential information.

There are two basic operations used in secret-key or symmetric block cipher cryptography. Encryption or encipherment is the process of disguising a communication to hide its content. During encryption, the communication which is known as plaintext is encrypted into what is known as ciphertext. Decryption or decipherment is the inverse process of using the same secret-key values to recover the plaintext from the ciphertext output. While the two basic operations of encryption and decryption may be distinguished in practice, there is in general no necessary mathematical difference between the two operations, other than that they are inverse transformations of each other.

Ciphertext output of a secure block cipher has little or no statistical relation to its corresponding plaintext input. The output (or input) is uncorrelated to the input (or output). Every bit of ciphertext output reflects every bit of the plaintext input and every bit of the key in a complex uncorrelated manner, just as every bit of recovered plaintext input reflects every bit of the ciphertext output and every bit of the key in a complex uncorrelated manner.

Block ciphers, generally, are binary ciphers receiving inputs consisting of a fixed number of bits (a block of n bits), and have outputs of the same fixed number of bits (an equal sized block of n bits). The input and output of such ciphers are one-to-one mappings: each ordered n-bit input is transformed by the block cipher into only one ordered n-bit output; and further, when the transformation is computed in reverse each ordered n-bit output may be transformed back into only one ordered n-bit input.

Secret key values are the values which influence the mapping of input to output provided by the block cipher. It is useful to divide secret keys into two categories: secret input keys and secret keys. Secret input keys may be based on varied input from a user or the encryption system which may be of fixed or variable length, and a secret key is often a transformed secret key input. A secret key is usually of fixed length. A block cipher usually operates on a secret key, but in some cases may operate on an secret input key. If a block cipher first operates on a secret input key, potentially it may use so me algorithm to transform the secret input key into a secret key in a standard format. Then, a block cipher expands the secret key to form subkeys whose length or number of bits exceeds that of the secret key.

Block ciphers and have many rounds calculated in series where each round depends on plaintext through the output of the immediately prior round where generally in each round the same operations are performed iteratively in the same manner. The n-bit input into the block cipher may be called n-bit cipher input. After encryption, the result may be called n-bit cipher output. In each of these rounds, the ordered binary input may be called n-bit cipher round input, and the n-bit ordered binary output may be called n-bit cipher round output. An n-bit cipher input or n-bit cipher output refers to the variable n-bit binary input or variable n-bit binary output of a binary block cipher. Such n-bit cipher input and n-bit cipher output are typically plaintext input and ciphertext output. By contrast, key inputs or subkey values used by a binary block cipher are not variable binary inputs, but arc generally fixed or predetermined values for a given use of the block cipher. An n-bit cipher round input or n-bit cipher round output refers to the variable n-bit binary input or variable n-bit binary output of one (and typically of one operative round) round of a binary block cipher.

An operative round of a binary block cipher is an iterative round which calculates new values for each of x primary segments in the round, where x may vary in different operative rounds, where there are a total of n-bits in the x primary segments, and where the new values of the x primary segments determine the n-bit round output. Operative rounds of a binary block cipher refer to iterative rounds which calculate new values for each of x primary segments in a given round, where x may vary in different rounds, where the n-bit cipher round output consists of these x segments of new values, and where the total of all bits of the x segments equals n bits. Binary block ciphers are ciphers receiving inputs consisting of n ordered bits of input and have outputs of the same number of ordered bits (n bits). A mapping of block cipher inputs to outputs reveals that every possible combination of n input bits from $2^n$ possible combinations has only one corresponding combination of n output bits, and likewise every combination of n output bits from $2^n$ possible combinations has only one corresponding combination of n input bits. In other words, binary block ciphers transform input values to output values in a manner such that the mapping of this transformation relates the members of the set of all possible ordered input values of n-bits in a one-to-one manner with the members of the set of all possible ordered output values of n-bits.

While a segment is defined simply as a plurality of ordered bits, it is also possible to classify types of segments. There are also round segments and one-to-one round segments.

A round segment is a segment within a round (and typically an operative round) of a binary block cipher which is part of n-bit cipher input or n-bit cipher output, or is calculated within a round or operative round the operative round and is intermediate between input and output; is affected by n-bit cipher round input; and affects n-bit cipher round output. For example, a first value in a calculation is said to affect a second value if, after taking into account the specifics of the particular calculation, a random change in all bits of the first value is likely to change at least one bit of the second value with a chance of at least one in three.

A one-to-one round segment is defined as a member of a one-to-one round segment set. A one-to-one round segment set is defined as a set of ordered round segments in an operative round of a binary block cipher where it is true that each n-bit round input corresponds with only one possible result or group of particular values of the ordered segments of that set, and that any group of particular values of the ordered segments of that set correspond with only one possible n-bit round input. For example, the set of segments in the n-bit cipher output are a one-to-one round segment set. The set of segments in any of the n-bit round input or the n-bit round output of each operative round are also one-to-one round segment sets. Where one-to-one round segment sets are calculated in a binary block cipher which operates on n-bits of input or output, it obviously follows that all such one-to-one round segment sets consist of exactly n-bits.

Note that in general there are usually more one-to-one round segment sets than the examples just mentioned. For example, in most binary block ciphers it is possible to form one-to-one round segment sets by combining particular round segments which are determined consecutively even though they are determined in different rounds.

There is a term-of-art in which one speaks of the n-bit data or bits (which for block ciphers can be called text or plaintext or cipher data) of a calculation method from encryption. Such data is generally dependent on any variable input into the method from plaintext. If so, such data is, in another term-of-art, also called variable as opposed to pre-determined or fixed. Consequently, one can speak of all the n-bit data (all the bits) in one-to-one round segment sets as being variable; and such data is different than the predetermined secret subkey data which is also part of block ciphers. Such subkey data is dependent on the secret key, and is fixed and often precalculated relative to any variable plaintext input of the block cipher.

One can observe further that in a well designed block cipher most bits of variable round segments are variable. This observation is true for efficient block ciphers since any non-variable bits can be wasteful or inefficient. For example, although a round segment may be called variable as it has at least one variable bit within it by definition, in a well designed block cipher if a round segment is variable in general, a substantial portion (such as 50 out of 64) of the bits within that round segment will also be variable.

Further, block ciphers may linearly combine one-to-one round segments with subkeys, or rotate them by a predetermined number of bits, or rotate them by a data-dependent number of bits determined by some bits of another unrelated one-to-one round segment, or even combine them linearly with other unrelated one-to-one round segments, and generally such resulting output segments, which are sometimes intermediate values that do not affect n-bit output directly, are also one-to-one round segments.

Finally, the preceding description of primary segment values while sufficient for understanding the scope of the prior art is incomplete. Typically, primary segment values are more than just calculated round segment values which determine a n-bit round output. Typically, a n-bit round input contains old or prior values of primary segments which are replaced over the course of an operative round. Typically, each such replacement value of a primary segment is a one-to-one function of the prior value, if all subkey values and all other primary segments are constant. Generally, all primary segment values are one-to-one round segments.

To increase security each operative round typically interacts one-to-one round segments and secret subkey values. In each operative round, each of the x primary segments is typically a function of its prior segment modified by the combined interaction of at least one other one-to-one round segment and in some cases by a subkey segment for that round.

In practice, execution of block ciphers in microprocessors generally takes place using registers, which typically are the data locations in a microprocessor which are quickest at loading and storing data. Often, binary block ciphers are configured such that the usual segment operated on by the rounds of the block cipher is equal in size to the 32-bit or 64-bit registers of microprocessors which may compute the block cipher.

Increasingly, not only do binary block ciphers use algorithms optimized for 32-bit or 64-bit registers but also they use algorithms which are optimized for the microprocessors of network servers, which are typically internet or intranet nodes. Such network nodes usually must be capable of more than just encryption or decryption. In fact, the majority of time and resources of such servers is allocated to other tasks. As a result, it is critical that a block cipher well suited to this task be capable of quick bootup or startup and make minimal use of on-chip cache, which is one of the most critical resources of a server's microprocessor.

Another type of encryption which may not require as much optimization as node encryption on network servers is bulk encryption of large files. Calculation of block ciphers, well suited to bulk encryption, typically takes place in registers. However, as the amount of data to be encrypted is larger in bulk encryption, quick startup is not essential. Such startup time becomes a small percentage of the total time spent encrypting a large file.

A good example of perhaps the first historically significant symmetric cryptographic system (i.e., when the same key is used in the encipherment and decipherment transformations) is the Data Encryption Standard ("DES"), which is a U.S. Government standard. DES uses small "s-boxes" to provide security. These so-called s-boxes are substitution boxes or, simply, look-up tables.

S-boxes provide output which is a nonlinear function of the input, based on a lookup table. Small s-boxes are lookup tables with a small number of possible inputs. Often, small s-boxes have a small number of output bits as well. For example, each s-box of DES has 6-bit inputs or 64 possible inputs and 4-bit outputs or 16 possible output values. They do not require much memory; nor does it take long to load them in microprocessor memory. S-boxes are generally stored in on-chip cache, generally the next quickest form of microprocessor memory after registers.

DES was the first significant example of a Feistel block cipher. Such block ciphers are named after Horst Feistel. Feistel block ciphers perform repetitive operations on a left half and right half of a block, respectively. This is convenient for execution in hardware and software when the number of registers is limited.

One aspect of DES which is particularly relevant to the defined terms used herein is the fact it swaps its primary segments, also known in DES as cipher block halves. If the swaps are included, some equations which describe in a general way both segments being recalculated in each two successive iterative rounds, are as follows, where LH means the left half, and RH means the right half:

```
increment i by +1
LH= LH xor F(RH xor Key[i])
Swap{LH,RH}
increment i by +1
LH= LH xor F(RH xor Key[i])
Swap{LH,RH}                                   Eq. 1
```

This sequence of calculation is mathematically equivalent to the simpler equations and the operative round below:

```
increment i by +2
LH=LH xor F(RH xor Key[i])
RH=RH xor F(LH xor Key[i+1])                  Eq. 2
```

The approach used herein is to discuss ciphers and their round equations in general using terms developed for those particular ciphers which are expressed without any obscuring primary segment swaps or other similar operators which might have a similar effect, in order to focus on the internal mathematical structure and logic of each round of each cipher. This discussion while simplified is meant to apply also to all ciphers even if they are expressed in a complicated manner using such primary segment swaps or other obscuring operators.

What is relevant about the above simplified presentation of DES is that each such operative round calculates two new values of the primary segments which are part of a n-bit round output. Further, DES applies its nonlinear function to each of the primary segments LH and RH which are part of a n-bit round output. This general structure of DES in which all functions are applied to each of the primary segments is copied in almost all other block ciphers.

Another common feature of most efficient implementations of DES which is copied elsewhere is to place each block half or primary segment in the register of a microprocessor. This feature allows certain desired cryptographic operations to be performed quickly. For example, it becomes possible to add a block half with a subkey, or to xor block halves together, in only one operation (typically in one microprocessor clock cycle). As is well known, xor indicates bitwise exclusive-or. It is an operator which interacts bits in identical positions. If Z equals X xor Y, the result of each bit in a given position in Z equals the exclusive-or of the two bits in the same positions in X and Y.

Unfortunately, small s-boxes generally do not permit ciphers that are efficient, i.e., both fast and secure. Larger s-boxes are typically consistent with more efficient block ciphers. However, large s-boxes either use a significant percentage of on-chip cache (competing with other desired uses of on-chip cache), or they must be loaded prior to each use (which is time consuming). While use of larger s-boxes might increase the efficiency and speed of DES, it would also increase startup time and the use of on-chip cache.

Two interesting examples of Feistel block ciphers which use large s-boxes are the two ciphers referred to as Khufu and Khafre, see, e.g., U.S. Pat. No. 5,003,597. These block ciphers use s-boxes where the 8-bit inputs are considerably smaller than their 32-bit outputs. This approach is consistent with the fact that modem microprocessors take an equal number of clock cycles to compute s-boxes with 32-bit output as they do s-boxes with 8-bit output. So while the output size of the s-box increases, so too does the strength and efficiency of the cipher given a constant number or rounds or clock cycles. Khufu and Khafre are both Feistel block ciphers having many varied details which are not directly relevant here.

In general, Khufu and Khafre ciphers have the following structural characteristics:

First, similar to other Feistel block ciphers, it is convenient to compute the ciphers using two registers which contain the bit-values of the left and right halves. In each round of the block cipher, each register of cipher data is recalculated. This process updates and modifies the initial value of each register, which is the old primary segment, and substitutes a new register value, which is a new primary segment. In this approach, each new primary segment is mapped one-to-one with its old primary segment, all subkey segments and other primary segments being equal.

Second, each new primary segment reflects not only the corresponding old primary segment but also a small number of bits which are the least significant bits ("lsb") of the other register. The lsb affect the new one-to-one round segment in a non-linear manner using s-boxes. The s-boxes of Khufu and Khafre have 8-bit inputs and 32-bit outputs. They accept 8-bit inputs from the last calculated register, and their 32-bit outputs affect the new primary segment in the register currently being computed.

Khufu and Khafre ciphers are unlike most other Feistel block ciphers in that there is only one non-linear operation (i.e., an s-box operation) in each round; it accepts input from only a small fraction or small section of the one-to-one round segment (8 bits), and that non-linear operator potentially affects all the bits of the other one-to-one round segment. This small section is generally less than thirty-five percent of the one-to-one segment which contains the small section. This process of using in each round a small section of a recently calculated one-to-one round segment to affect the new one-to-one round segment in a non-linear manner may be called bit expansion of a small section.

Third and finally, Khufu and Khafre use rotation as an efficient means to move bits. This operation may be necessary in some form when the only nonlinear operation of each round is an s-box operation which uses only a small fraction of bits from one-to-one round segment. Rotation can ensure that all bits eventually become input of the non-linear operation, and thus have some nonlinear effect on the cipher data.

Khufu requires considerable time to generate its s-boxes, and is a complex block cipher. On the other hand, up to this point in time popular adoption of block ciphers historically has followed quick startup time and simplicity. To date it appears that no significant software packages appear to have embraced this block cipher. Khafre uses fixed s-boxes and is simpler than Khufu, but it appears it may use many large s-boxes and it is designed only to compute a 64-bit block cipher. Unfortunately, 64-bit block ciphers are generally insecure due to small block size. It appears that Khafre may use different s-boxes for succeeding rounds in order to avoid certain weaknesses which occur when an s-box is used in the same way to encrypt different cipher data. However, this significantly increases the amount of memory necessary to accommodate its s-boxes.

Due to the complexity of these ciphers, their security has not been evaluated thoroughly by many cryptanalysts. However, it is readily apparent that given a reasonable number of rounds or clock cycles computed, Khafre is not adequately secure.

Another more recent cipher has certain general properties of Khufu and Khafre and was published as a springboard for further investigation and research. This algorithm is called "Test 1" (see, Bruce Schneier and Doug Whiting, "Fast Software Encryption: Designing Encryption Algorithms for Optimal Software Speed on the Intel Pentium Processor". Fast Software Encryption—Fourth International Workshop, Leuven, Belgium, 1997, referred to herein as Schneier et al.). The algorithm was designed as part of a testbed of ideas about fast software rather than as a secure, simple, or practical block cipher.

The block cipher Test1 uses four registers of 32 bits, each of which contains a primary segment. In it each new primary round segment, R[t0], is a function of the last four previously calculated primary segments (R[t−1] thru R[t−4]). Its round equations vary significantly in various rounds to inject some irregularity into the algorithm. However, a typical round equation (Equation 3) of the cipher is as follows:

$$R[0] = ((R[-4] + R[-1]) <<< F\text{-table}[i])$$
$$\text{xor } (s\text{-box}(LSB(R[-2])) + R[-3]) \qquad \text{Eq. 3}$$

In this round equation of this cipher the s-box receives input bits from the least significant bits ("lsb") of R[−2]. The new primary segment R[0] reflects the linear combination of other values and the s-box output using generally non-commutative operators and using round-and-register dependent rotation. Nevertheless, use of non-commutative operators does not appear to be structured efficiently; further, the register size of 32 bits each is too small to gain significant cryptologic strength from use of non-commutative operators; and finally, the sbox is not optimized and may be random and such sbox may have, given all possible input differences, a minimum number of output bit-differences which is too small to provide adequate differential strength.

Of course, in this equation there are four primary round segments. As value R[−4] is the old primary segment, the value of the new primary round segment R[0] is a one-to-one function of the one-to-one round segment R[−4] assuming all other inputs including other one-to-one round segments are constant. Although this property is true for this segment, when the property is repeated throughout the operative rounds, it makes possible the property for the cipher globally that its ordered n-bit inputs map one-to-one with its ordered n-bit outputs.

In practice, use of four registers to encrypt cipher data may be too many registers to achieve good security efficiently. Test1 also appears too complicated to be adopted as a mainstream block cipher. Further, Test1 uses only one s-box to conserve on-chip cache. It is not adequately clear that this approach is secure. Repetitive use of the same s-box in the same manner is usually insecure. While use of non-commutative operations does alleviate this concern somewhat, the registers are too small (only 32 bits) for the non-commutative operators to provide much additional strength. The cipher's use of round-dependent rotation as specified in its F-table also alleviates this concern somewhat. Nevertheless, the round-dependent rotation schedule is fixed and known and hence may not provide adequate security given reuse of the same s-box in successive rounds if the s-box is known.

On the other hand, if the an s-box is generated in a key-dependent random manner prior to encryption as intended by Schneier et al., the bootup time of the cipher is increased substantially. Further, if such a s-box is generated randomly and hence not optimized to avoid potential flaws, there is also a potential risk of weak s-boxes.

By contrast, a symmetric encryptional method known as "RC5" (see R. Rivest). The RC5 Encryption Algorithim. Fast Software Encryption - Second International Workshop, Leuven, Belgium, pages 86-96. Springer-Verlag, 1995) is based on a different paradigm. Unlike DES, Khufu and Khafre, RC5 uses no s-boxes. This fact eliminates the need to reserve large segments of on-chip cache in order to store the s-boxes. Thus, RC5 may be more practical to encrypt or decrypt standard packets of data, usually only 48 bytes each, received from the internet or other digitized phone networks. Such encryption or decryption may take place without having to allocate any time to transferring large s-boxes into on-chip cache.

RC5 is a Feistel block cipher which appears to be the first to use data-dependent rotation in a relatively efficient manner. A primary distinguishing feature of RC5 is the way in which, to calculate new one-to-one round segments, it rotates that segment in a variable, i.e., data-dependent, manner depending on particular bit-values in another one-to-one round segment. This data-dependent rotation is the operation which provides the cryptographic strength of RC5. It permits RC5 to eliminate s-boxes. S-boxes are nonlinear and may act in a complex data-dependent manner. For example, an s-box may affect some bits in a nonlinear manner based on the values of some other bits. If RC5 did not use rotation in a data-dependent manner, it appears it would need s-boxes or some other operation which acts in a data-dependent manner.

Referring herein to prior ail FIG. 1, an algorithmic flow chart of the RC5 enciphering process is shown. A first block 10 contains plaintext input consisting of n bits at the start of the iterative enciphering process. Each plaintext input block is divided up into two primary segments, 12 (R0) and 14 (R1), each of which contain n/2 bits. For example, a 64-bit version of RC5 divides its input into two 32-bit block halves. Typically, in calculating a 64-bit version of RC5 each such block half or one-to-one primary round segment is to be contained in one 32-bit microprocessor register, which is the register size of most modern microprocessors.

Prior to beginning the iterative process, RC5 adds (blocks 16 and 18) one subkey value, K1 and $K_2$, to each primary segment, R0 and R1. Each value of Kw and K2 can be the same or different. Similar to the one-to-one round segments, each such key value contains n/2 bits. Next, RC5 performs the first of many rounds of encryption. Each round of encryption Computes new values of the primary segments R0 and R1. Each computation of the two primary segments is similar in form, even though it has different inputs and outputs and is stored in different registers.

To compute in the first half round the new primary segment R0, the following procedure is used. The half round uses xor (block 20) to combine the segments R0 and R1. Next, it extracts (block 24) a given number of bits ("f" bits) from the least significant bits of the right primary segment R1. For example, if f is 5 bits, it would extract the 5 least significant bits ("lsb") of R1 in order to provide one input used by the variable rotation.

The number of lsb in a one-to-one round segment (the lsb contain "f" bits) is that number which permits as many different rotations as are possible for a primary segment. For example, a 64-bit block has two primary segments of 32 bits each. The 32 possible rotations of these halves may be selected using f=5 bits, as 2^5=32. Hence, for each potential block size there is an associated number of bits "f" which permits all potential rotations of the primary segments. Thus, the total number of different values of V extracted from the lsb of R1 may be as many 2^f, or in this example 2^5, possible bit-values. It will be noted that the "least significant bits" which affect a rotation are crytographically speaking the most significant bits of each round.

Then, the xored values from the left primary segment R0 are rotated (block 26) by V, i.e., the value of the lsb. Finally, to this result is added (block 28) a subkey K3 for this half round. The resulting one-to-one primary round segment is the new value of R0 (block 30) in the first round.

This process is then repeated in the second half round to calculate the right primary segment R1 using the new value of R0. To compute in the second half round the new primary segment R1, the following procedure is used. The round uses xor (block 22) to combine the values of its primary segment R1 with that of the other primary segment R0. Next, it extracts the given number of bits ("f" bits) from the least significant bits of R0. Again, if f is 5 bits, it would extract (block 32) the 5 least significant bits ("lsb") of R0 in order to provide one input used by the variable rotation. Then, the xored values in the right segment R1 are rotated (block 34) by V, i.e., the value of the lsb. Finally, to this result is added (block 36) a subkey K4 for this half round. The resulting one-to-one primary round segment is the new value of R1 (block 38) in the first round.

Each round of RC5 is only part of a complete encryption of one plaintext block. Many rounds are generally necessary depending on block size. This number of rounds selected depends on block size and the users desire for security, but is typically greater than 8 and less than 64. After all rounds are completed the resulting ciphertext value of segments R0 (block 40) and R1 (block 42) are generated, which are then combined to generate ciphertext consisting of n bits (block 44).

Each round of RC5 in FIG. 1 may also be expressed as two equations, Equations 4 and 5 below, where each equation determines the bit-values of one primary segment and where each such segment corresponds to half an n-bit block of data. This description follows, where i is the index of the iterative round and where i is incremented by two between rounds (these equations ignore the initial addition of the subkeys K0, K1 to the plaintext):

| | |
|---|---|
| R0= ((R0 xor R1)<<<LSB(R1)) + Key[i] | Eq. 4 |
| R1= ((R1 xor R0)<<<LSB(R0)) + Key[i+1] | Eq. 5 |

Unlike DES, RC5 does not swap its one-to-one primary round segments between calculating each such segment. Consequently, RC5 requires fewer clock cycles for a given number of new segment values and also it is easier to understand.

Similar to DES, in RC5 each new value of a primary segment is a one-to-one function of its prior value given that the other one-to-one round segment and the subkeys are constant. Incidentally, in RC5 every round segment calculated in each round, with the possible exception of the value V which controls the data-dependent rotation, is a one-to-one round segment.

It will be noted that similar to the simplified structure of DES using no round segment swaps, the structure of RC5 ensures that the same operations affect each primary round segment: (1) the nonlinear operation of data-dependent rotation affects each primary segment R0 and R1 based on the small section bits of the other primary segment, (2) the linear combination of the two primary segments using xor affects each primary segments R0 and R1, and (3) modification by a new subkey value affects each primary segment R0 and R1.

Again, decryption is the inverse of encryption. All the same steps are repeated but in reverse order. Decryption uses ciphertext output as input and recovers the values of the plaintext inputs. The decryption round equations (Equations 6 and 7) of RC5 are simply the inverse of the encryption round equations:

| | |
|---|---|
| R1= ((R1-Key[i+1])>>>LSB(R0)) xor R0 | Eq. 6 |
| R0= ((R0-Key[i])>>>LSB(R1)) xor R1 | Eq. 7 |

It should be apparent to one skilled in the art that the choice of which equations are used for encryption or decryption is a convention. Hence, it is possible to build a cryptographic system in which what is herein called the RC5 inverse equations are used for encryption, and what is herein called the RC5 encryption equations are used for decryption.

It is useful to define a quantitative measure called good bits which indicates the degree to which cumulative linear combination (i.e., the process of combining round segments in a linear manner to produce a new round segment) of round segments does or does not introduce good bits to affect a rotation. Good bits are those bits from cipher input which affect the small section of the segment which controls second round nonlinear activity but which do not affect the small section of the segment which controls first round nonlinear activity. Of course, it is useful to keep in mind that when this bit-tracing calculation of good bits is applied to decryption equations such input may be ciphertext which is ordinarily thought of cipher output, just as the output of the last round may be plaintext. Generally, the definition of good bits measures the number of small section bits which definitely control the nonlinear activities of each round which do not in general also control the nonlinear activities of the preceding round. For this reason, the number of good bits measures the inflow in each round of fresh or new data from linear diffusion which influence the nonlinear activities. When the number of good bits is at least half as large as the total use of small section bits to affect nonlinear activity in each round, or greater, then the block cipher has a property which may be called new small section data in successive rounds.

It is difficult to evaluate the good bits of two consecutive rounds of encryption of RC5 because during encryption all segment bits are rotated, hence it is uncertain rather than definite which input bits affect the nonlinear activity of the subsequent two rounds. Similarly, the use of addition or subtraction in encryption or decryption makes it uncertain rather than definite which bits affect which due to "carry" bits in addition and subtraction which allow some input bits to affect more or less significant bits though often with a low probability.

In the case of ambiguity due to variable data-dependent rotation of all segments which are combined linearly, the total number of calculated good bits is zero since those segments should be excluded from the calculation of good bits. After first discarding any such bits from the determination of good bits, the calculation of good bits is based on whichever equation (encryption or decryption) generates a greater number of good bits. This greatest number of good bits provides a rough measure of the strength of the block cipher in the area of data-dependence and bit-diffusion.

Evaluation of good bits is done therefore using the decryption equations, eliminating any values which have been rotated by a variable operator, and converting all linear operators other than xor to xor. After making these changes it is possible with simplicity and consistency to trace which input bits of any n-bit round input definitely affect the first and second of two consecutive rounds in a nonlinear manner.

In the case of RC5, the input bits which affect its variable rotations in the second round due to linear diffusion are the same that do in the first round. These bits come from the lsb of the cipher input segment R0 and R1. Hence, there are no non-overlapping input bits which definitely control the small section nonlinear activity of the cipher in a second round but not in a first round, and the number of good bits in each round is zero. As the number of good bits (0) are much fewer than the number of bits which affect rotations in each round (2f), RC5 does not have the property of new small section data in successive rounds.

To understand a possible effect of inadequate new small section data in successive rounds, it is useful to understand the differential analysis of data-dependent rotation in RC5, and to examine a particular example. A typical differential attack on a block cipher relies on the fact that some bit inputs fail to affect other bit values in a block cipher. A good example of block cipher encryption may therefore illustrate in simplified manner how a typical differential attack might work.

Typically, differential attacks are effective because they use self-cancellation to extend the power of the differential method over multiple rounds. It turns out in most cases that there exist certain input differences between two related encryptions called differential characteristics which have a high probability of self-cancellation in the operative rounds of the block cipher, where after several rounds of encryption there is a high probability that the output bit-difference between the two encryptions equals the initial bit-difference.

For example, consider the following simple inputs into the RC5 block cipher in FIG. 1:

For Plaintext Input #1 let,
R0 ={00000000...};R1 ={00000000...}
For Plaintext Input #2 let,
R0'={00001000...};R1'={00001000...}
The difference between these registers is,
D0= {00001000...};D1 ={00001000...}

In the above example, the only bit that is different in the two sets of one-to-one round segments is the fifth bit from the left. As the fifth bit in each segment is different, when xored together in the above RC5 equation (1) the difference in the inputs cancels out. Cryptanalysts are generally able to use such self-cancellation of input differences between two related encryptions to find differential characteristics that can with a certain probability pass through multiple rounds unaffected by the block cipher. It turns out that when assuming the bit input differences shown above the best probability of bits canceling out is seen in every third new register value (R0 in the 1st round, R1 in the 2nd round, R0 in the 4th round, R1 in the fifth round, etc.).

It is possible to examine a simplified example which illustrates this type of differential analysis. First, it is useful to calculate a base case using RC5 in which nothing of cryptographic interest occurs. Using the plaintext input shown above where all bits equal 0, it is useful to assume that all subkey bit values also equal 0. These inputs result in potentially an infinite number of rounds of encryption in which all bits of each new one-to-one round segment equal 0. Of course, given these assumptions, the ciphertext output bits of RC5 also equal zero. This result is not surprising and reflects the simplified assumptions concerning subkey values.

Second, the interesting step in creating a useful illustration of the behavior of RC5 is to allow certain non-zero input bits. Using this approach, the new one-to-one round segments in succeeding rounds of this example based on an input or input-difference which has some non-zero bits illustrate the differential behavior of the cipher.

Referring herein to prior art FIG. 2 (wherein the blocks are numbered as in FIG. 1, with the numbers in the second round being designated with a prime), a simple example in which given input values where some bits are modified from the base case to non-zero bits and, the non-zero bits pass through two rounds of RC5 encryption with little or no effect upon the other bits is shown. As stated above, for simplicity and ease of explanation, all key values and most of the input values are equal to 0. This example is similar to the differential input difference shown above. Only the fifth bit of each register, i.e., each block half, has a value of 1. Note also that in this example, which is similar to a typical differential attack on a Feistel block cipher, every third primary segment or half round of RC5 contains bits in which any non-zero input bits have canceled out and all bits are equal to 0. In a differential attack on RC5 by a cryptanalyst, this self-cancellation property reduces the effort required to break the cipher.

It will be appreciated with RC5 encryption, that even with an infinite number of rounds a particular bit may not be affected. With these assumptions, it turns out that the fifth input bit in these registers with a value of 1 cannot ever affect a rotation. In other words, an infinite number of rounds are required until the input bit affects a rotation.

Of course, this example is only possible due to weak subkey values. All values of the subkeys equal zero. In this example, the weak rotations which permitted this result to come about depend primarily on certain subkey values; and the rotations in the example shown above are affected by a total of only 8 plaintext bits. In FIG. 2, the data values which affect the rotations are the initial least significant 4 bits of each plaintext block half.

It is worth noting that this block cipher may iterate through potentially a large number of rounds, and yet the output may depend primarily on only eight plaintext bits and on those subkeys which influence the one-to-one round segments associated with those plaintext bits. This suggests that this block cipher violates a requirement of a secure block cipher in that every output bit depends on every bit of plaintext input and on every bit of key input.

The primary weakness shown in this example of RC5 is that, assuming worst case variable data dependent rotations, the variable cipher data circulate in such a manner such that in certain rounds (where in general one round is a number of steps large enough that the number of data-dependent rotations is at least as great as the number of primary round segments in the block cipher) there exists a small set of potentially stagnant or isolated stationary variable bits in specified bit-positions which control the number of bits of all data- dependent rotations ("specified isolated bits")

where by definition a) only that set of specified isolated bits in the specified bit-positions can control the data-dependent rotations, and b) only that set of specified isolated bits in the specified bit-positions can affect the values of the specified isolated bits in the same specified bit-positions. By definition, the number of specified isolated bits is the smallest number possible assuming any possible data-dependent rotations. This means, assuming that those data-dependent rotations occur, there is a minimum number of specified isolated bits where only those bits can control the degree of data-dependent rotations in the block cipher, and only those specified isolated bits can affect their own values.

In the case of RC5-32 (i.e., using the example shown above and in FIG. 2 which has a 32-bit block size and two 16-bit halves), in one round there are 8 specified isolated bits, which are the least significant 4-bits of each of the two round segments of the block halves, where in that round only the 8 specified isolated bits affect data-dependent rotations, and assuming a data-dependent rotation of zero bits the specified isolated bits are affected only by the specified isolated bits in that round. As previously stated, this number of specified isolated bits is invariant as the number of rounds increases. In other words, given an infinite number of rounds, it is still theoretically possible that in RC5 an input bit might not affect a data-dependent rotation. Further, the number of specified isolated bits is a small fraction of the number of bits in the n-bit variable cipher data block (in this example, the 8 specified isolated bits are only 25 percent of the total of 32-bits in the total data block).

The weakness of RC5-32 can be seen using Equations 4 and 5. The specified isolated bits are in the least significant 4 bits in bit-positions 0 through 3 of each of the block halves R0 and R1. Only bits in these positions can affect the data-dependent rotations. The xor of the block halves combines the bit-positions 0 through 3 in each of the block halves, to produce a result where its least significant 4 bits in bit-positions 0 through 3 depend only on the specified isolated bits. Assume data-dependent rotations of zero bits. If so, the new bit-values of the 4 least significant bits of R0 and R1, in the positions of the specified isolated bits, depend only on values of the specified isolated bits. Assuming these data-dependent rotations are always zero, even given an infinite number of rounds there is no way that other bits which are not specified isolated bits can influence the specified isolated bits, nor is there any way that the other bits can influence value V, which determines the data-dependent rotations.

The existence of a small number of specified isolated bits in a round which cannot be influenced by other bits subject to certain assumptions about variable rotations is a sign that a cipher round or rounds are inadequately secure. The question of whether there exists a subset of the n-bit data block of a block cipher which satisfies this cryptographic property of being specified isolated bits is a logical question applicable to a specific round and also to consecutive rounds of each block cipher.

In analyzing the RC5 equations using block sizes of 64-bits and 128-bits, there are specified isolated bits where the total number of such bits is similarly low. The total numbers of specified isolated bits is only 10 bits out of 64, and 12 bits out of 128 respectively for these block sizes.

Further, when analyzing RC5 by replacing all use of addition or subtraction with xor for analytical simplicity (RC5 after this substitution of operators is roughly as strong analytically), it is clear that other more complicated subkey schedules can result in larger possible sets of specified isolated bits where those sets of specified isolated bits are still a small number of bits, i.e., are a subset of the possible maximum, and often are 50 percent or less of the possible maximum number of variable bits in the cipher data block.

This potential problem in which the data-dependent rotations of RC5 depend after many rounds primarily on a small number of bits of the subkey and on a small number of input bits appears to be related to having inadequate small section data in successive rounds. In particular, in RC5 there seems to be a correlation or coincidence of weakness. In the instances in which RC5 is weak differentially, it is also weak in diffusing input bits and any changes in input bits. Calculating the number of bits of new small section data in successive rounds in fact gives us a crude way of estimating the degree of linear diffusion of input differences in one-to-one round segments when the variable data-dependent rotation is otherwise unable to provide adequate diffusion. It appears that this coincidence of weakness reduces the potential diffusive and differential strength of data-dependent rotation significantly.

Cipher attacks which limit their analysis of RC5 to plaintext inputs which prevent rotations from occurring in the initial rounds are said to take advantage of weak subkeys. All subkeys of ciphers depending on data-dependent rotation have some plaintext inputs for which this is true, though it is easier to use this type of attack when the rotations depend on as few plaintext inputs as possible. Similarly, cipher attacks which limit their analysis of RC5 to input values which provide rotations which cancel out some input differences with a high probability are said to take advantage of differentially weak subkeys. It may be that all subkeys of ciphers using data-dependent rotations have plaintext inputs for which this is true, though it is easier to use this type of attack when such rotations depend on as few plaintext inputs as possible.

The example above in FIG. 2 in which all subkeys equal 0 illustrates both weak subkeys and differentially weak subkeys given inputs of 0 in the least significant 4 bits of both plaintext inputs.

While most subkeys in RC5 do not provide results as weak as the example above, there are in fact a multitude of potential examples of weak subkeys. Increasingly, it seems that the most effective attacks on RC5 take advantage of such weak subkeys. It would seem preferred then not to use RC5 without a way of screening out either weak subkeys, or at a minimum differentially weak subkeys. However, as a practical matter the generation of subkeys in RC5 is already slow and to additionally screen out or eliminate weak subkey values would be time consuming and complex.

The most significant recent cryptanalytic study of RC5 was written by Knudsen and Meier (Lars R. Knudsen and Willi Meier, Improved Differential Attacks on RC5, Advances in Cryptology—Crypto '96, pages 216–228. Springer-Verlag, 1996). This study fine-tuned a differential attack first discussed by Kaliski and Yin (B. Kaliski and Y. L. Yin, On Differential and Linear Analysis of the RC5 Encryption Algorithm, Advances in Cryptology—Crypto '95, pages 171–184. Springer-Verlag, 1995).

While the study of Kaliski and Yin suggested that sixteen (16) rounds of RC5 might be sufficient for a 128-bit RC5 block cipher to resist differential attack, the attacks by Knudsen and Meier obtain better results by detecting and taking advantage of weak subkeys. As a result, they are potentially able to penetrate many more rounds of RC5. Due to the increasing progress that is being made in such attacks, the security of RC5 is uncertain. It is clear that RC5 has some weaknesses which may make it too insecure for widespread use.

In order to block this type of attack it would be necessary to increase the work required to detect and to take advantage of weak subkeys. It appears that the reason such weak subkey attacks penetrate many more rounds than the more general attack by Kaliski and Yin is that the data-dependent rotations of RC5 may depend primarily on only some subkey values and some cipher input bits.

An unrelated potential weakness of RC5 is that it has a complex and somewhat slow key expansion method. This method requires roughly nine operations per subkey, or eighteen operations per round, in order to expand RC5's input key. Efficient encryption and decryption of standard 48-byte digital network packets requires quick key expansion.

It should be noted it is not accidental that the key expansion method in RC5 is somewhat slow. In particular, RC5 uses a complex nonlinear method using key data-dependent rotations to expand its key.

The use in RC5 of a complex slow means of generating the key is consistent with the perspective of cipher designers that the key expansion method "should maximize avalanche in the subkeys and avoid linear key schedules" (see 'Key Schedule Cryptanalysis of IDEA, G-DES, GOST, SAFER, and Triple-DES', by John Kelsey, Bruce Schneier, David Wagner, in Advances in Cryptology, Crypto '96, pp. 248–249). The RC5 key expansion method is nonlinear and maximizes avalanche and as a result it is considered secure; and use in RC5 or other block ciphers of an alternative linear key expansion would be perceived by cryptographers as weak.

SUMMARY OF THE INVENTION:

The above-discussed and other drawbacks and deficiencies of the prior art are overcome or alleviated by the improved block cipher method of the present invention, wherein it is an object of the invention to provide cryptographic systems and methods which are secure.

It is another object of the invention to provide a cryptographic system and method which uses data-dependent rotation with a novel iterative calculation which is robust. The robust quality of encryption using this method resists attacks by sophisticated algorithms which detect and take advantage of weak subkeys to determine the keys of the cryptographic system.

It is another object to provide a novel mechanism and method for quick key expansion, particularly for encryption rounds with data-dependent rotation, which decreases the time required to prepare a block cipher to encrypt or decrypt digital packets of bytes.

It is still another object of the invention to provide a cryptographic system and method of the above character which uses minimal numbers of s-boxes with a novel iterative calculation where the block cipher does not require an excessive startup time, yet is simple, secure and efficient for bulk encryption. The block cipher of the present invention uses no more on-chip cache than necessary, and uses its s-boxes in a secure manner.

It is yet another object to provide a novel mechanism and method for complex key expansion, which uses a minimum amount of time to prepare a block cipher to encrypt or decrypt a large file and which nevertheless ensures that the subkeys generated by the method reflect every bit of the key in a complex uncorrelated manner.

The foregoing objects, and others, are accomplished by the data encryption system for encrypting an n-bit block of input in a plurality of rounds of the present invention, where n is preferably 128 bits or more. The data encryption system includes a computing unit for the execution of each round; memory for storing and loading segments; a bit-moving function capable of rotating bits (or of otherwise moving bits into different positions) of one-to-one round segments by predetermined numbers of bits; a linear combination function which provides new round segments using a round operator generally from a first algebraic group to combine two different round segments; and a nonlinear function which affects a round segment based on a value which depends on bits from another round segment, where both round segments are different round segments from the same one-to-one round segment set. A round operator is a mathematical operation capable of being carried out in a microprocessor in computing an operative round, such as addition, subtraction, bit-wise exclusive-or, or rotation.

Both embodiments of the present invention are block ciphers with cipher data blocks preferably of at least 128 bits, which are either Feistel ciphers or near-Feistal ciphers. The Feistal ciphers divide the data block up into no more than two block halves of SZ bits, wherein the halves are primary round segments and SZ is a value as small as 64 and as large as 128. The near-Feistel block ciphers divide the data block into no more than two large segments, each containing 64 or 128 bits, and a third typically small primary round segment typically not to exceed 20 bits. In practice, this means that both embodiments of the current invention use mathematical operations computable on a microprocessor which act on either a 64-bit or a 128-bit segment of cipher data.

This use of the Feistel approach with no more than two large data segments is a critical aspect of the invented block cipher as it permits the block cipher to be efficient, secure, and also practical in a range of modem processors. Embodiments of this Feistel or near-Feistel approach generally modify each of the primary round segments in each round of calculation in the same way, typically using operations which modify all the bits of the large primary round segments in single linear operations. While the present invention is not restricted to use of a Feistel or near-Feistel approach, this approach is generally beneficial to the security of the cipher.

On the other hand, certain operations such as 64-bit data-dependent rotations are not yet implemented with maximum efficiency on 32-bit processors such as Pentium MMX chips. This means that block ciphers with block sizes in excess of 64-bits and which use data-dependent rotations may end up using from 4 to 8 data segments of 32-bits each.

For other block ciphers, especially those using sboxes implemented using MMX instructions, there do not appear to be any special efficiency constraints encountered as a result of using only two large data segments of 64-bits or larger. Although it is possible to implement a block cipher of the present invention which uses sboxes and which has more than two large data segments of 64-bits or greater (and may use between 2 and 4 such large data segments), it is strongly preferred to use only two such large primary round segments.

Despite the fact that efficiency constraints may compel use of up to 8 primary round segments in a block cipher using data-dependent rotation, it is preferred for reasons of maximizing security and efficiency that no more than 4 primary round segments are used. It is also preferable for reasons of maximizing security and efficiency that the block size is at least 128 bits, that such block size be predetermined (rather than of variable or perhaps text-dependent size), and related to these points, it is preferred that the minimum size of the round segments rotated by the a data-dependent variable rotation function is at least 32 bits.

While it is not obvious how best to achieve various mathematical properties in a Feistel block cipher or even which properties are most important, designers of secure block ciphers continue to focus on inventing new Feistel block ciphers. Good design of Feistel block ciphers is difficult because the structure is so simple that designers cannot randomly insert into a cipher "everything but the kitchen sink" and hope that something encrypts the cipher data in a secure manner. The simplicity of Feistel block ciphers permits purest expression of good encryption methods. Use of a Feistel block cipher structure by itself does not promote secure encryption, but the structure is synergistic with good encryption methods. Good Feistel ciphers are not randomly designed, but have regularly repeating rounds in which identical operations occur in a similar manner.

Such Feistel block ciphers have the best record of security and popularity in the field of encryption. DES is an aging, but still viable encryption standard which is a Feistel block cipher. "RC5" is a new paradigm using data-dependent rotations in a Feistel block cipher. As a further example of a secure new encryption standard, one embodiment of this invention uses relatively non-commutative operators for sbox output combination and for linear diffusion in a Feistel or near-Feistel block cipher.

In one embodiment of the present invention, the nonlinear function is a variable rotation function executable on the computing unit which generally rotates a one-to-one round segment by a value which depends on a preselected number of bits from a preselected location of a different one-to-one round segment from the same one-to-one round segment set.

In another embodiment of the present invention, the nonlinear function is an s-box and the system generally includes a s-box linear combination function which uses a round operator generally from a second algebraic group executable on the computing unit which combines a one-to-one round segment with the output of an s-box lookup of a value which depends on a preselected number of bits from a preselected location in a different one-to-one round segment from the same one-to-one round segment set, wherein the first algebraic group is preferably non-commutative with the second algebraic group.

Generally, all embodiments of the system of the present invention have a subkey combining function in each round which provides new round segments by combining a round segment typically linearly with a subkey segment, where the number of times the subkey function is used in the rounds of the cipher is roughly equal to the number of times in such rounds the nonlinear function is used, or in any case is at least half of the number of times in such rounds the nonlinear function is used. Qualified operative rounds of a binary block cipher refer to such rounds of the block cipher which exhibit some particular, generally good, cryptographic properties.

The key expansion method applicable to data-dependent ciphers of the present invention detailed herein provides a rapid subkey generation method which permits control of the differences between subkeys using fixed table values and given well-chosen fixed table values could help to limit problems related to differentially weak subkeys, and to weak subkeys in general.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the numerous FIGURES.

DESCRIPTION OF THE PREFERRED EMBODIMENT

Figure 3:
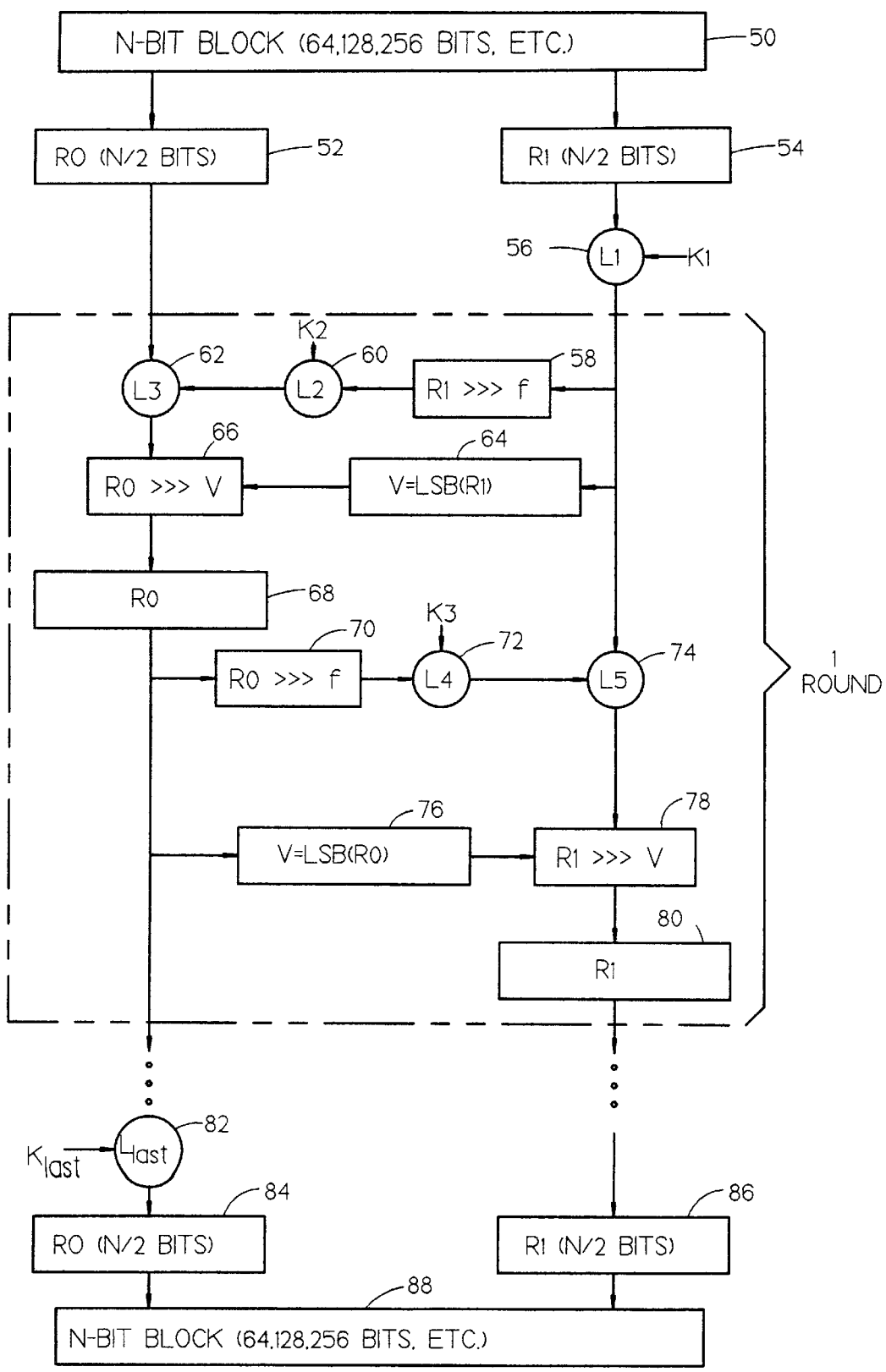
FIG. 3 is an algorithmic flow chart of an encryption method using data-dependent rotation in accordance with the present invention.

Referring to FIG. 3, an algorithmic flow chart for one round of the cryptographic system of the present invention is generally shown. The present invention is primarily intended to be practiced in a computing unit, such as a microprocessor, and the primary segments stored in memory.

A first block 50 contains a n-bit cipher input (e.g., plaintext) at the start of the iterative enciphering process. Each input block is divided up into x, in the present example x equals 2, primary round segments 52 (R0) and 54 (R1), where typically each contain n/x bits. The value of x may vary in each round, but it is generally preferred that x be the same in all operative rounds. The value of x can be any integer of at least two, preferably an integer of from 2 to 4. Preferably, x equals 2 in all rounds; for the purposes of this example, x will be assumed to be 2. For example, a 128-bit version of the cryptographic system divides its input into two 64-bit primary round segments or block halves. In the present example, each block half is computed in one 64-bit register.

In the present example many linear combination operators are used and they are designated herein as L1, L2,L3,L4, etc. Such linear operators are, at a minimum, round operators, i.e., operators computable using mathematical operators capable of being carried out on most microprocessors. Linear Operators are drawn from the list of all operators computed as part of the instruction set of a typical microprocessor which have two inputs, and examples of linear operators include addition, subtraction, SIMD addition, SIMD subtraction, and bit-wise exclusive-or, where such SIMD (Single Instruction Multiple Data)operations include either addition or subtraction executed in parallel (e.g., MMX-style addition of 2 segments of 32-bits each from two 64-bit registers). Linear Operators are restricted to those operators computed as part of the instruction set of a typical microprocessor which have the properties that (1) given two inputs with an equal probability of containing 0's and 1's, the output of the operator contains generally an equal probability of 0's and 1's, and (2) given that either input is constant, the output is a one-to-one function of the other input. More specifically, they are instructions executable on a computing unit having two input segments typically of unsigned integers and one output segment which is typically an unsigned integer, such as addition, xor, addition or subtraction in parallel (such as MMX-style addition of two 64-bit segments, each consisting of 2 values of 32-bits each). A segment is a fixed number of ordered bits, where that number is an integer of at least 2.

Linear combination operators, which are called for simplicity linear operators, are restricted to mathematical operations where: (1) given two input segments with an equal probability that each input bit of the segments may be 0 or 1, the output segment has generally an equal probability that each of its output bits may be a 0 or 1, and (2) given that either input is constant, the output is a one-to-one function of the other input which is not constant. Of necessity, linear combination operators used in block ciphers are computed almost without exception using modular arithmetic, where the modulus of the calculation usually reflects the number of bits in the segment being computed.

In the present invention, any linear operation may be substituted for any other linear operation in any round, and no round must use the same linear operators in the same way as the preceding round. Nevertheless, for simplicity and in some cases to optimize the security of the cipher to defend against certain attacks, it is preferred to select linear operators from certain algebraic groups where the same linear operators are used for the same purposes in each round.

Where not otherwise specified, it is generally assumed that whichever round operators are described as typical of a round of a cipher, are meant to apply to all rounds of the cipher, where if a given linear operator is addition, for example, it is meant to be applied in the same way in all rounds of the block cipher.

As has been explained so far, it should be clear what is the meaning of direct linear combination by a linear operator. Yet, there may still be some degree of semantic confusion in understanding the difference between direct and indirect linear combination.

In the mind of the lay public, there may be a belief that indirect linear combinations of segments might only require use of linear combination operators. This interpretation is not very flexible for crytographic purposes as there are some predetermined operations which are essentially linear such as predetermined bit-rotation, or predetermined bit-diffusion which have few if any cryptographic consequences by themselves.

In this document, indirect linear combination will encompass both linear combination and predetermined 1:1 operations. To be more precise about this approach, it is useful first to define the meaning of a 1-to-1 predetermined linear transformation ("1:1 PLT").

A 1:1 predetermined linear transformation ("1:1 PLT") is a predetermined operation from the 1:1 transformation group consisting of {predetermined direct linear combination, predetermined bit-rotation, predetermined bit-permutation, and predetermined 1:1 reversible bit-diffusion} on a particular variable value of cipher data such that its output is mapped 1-to-1 with its input value. For example, a fixed rotation of a variable segment by a predetermined number of bits (i.e., by a number of bits that is not data-dependent) is a 1:1 PLT. Similarly, a linear combination of a particular variable value with a predetermined key value is a 1:1 PLT. Applying a 1:1 PLT to a primary round segment of block cipher does not change the bit-data of the primary round segment in a non-linear manner.

To put in perspective the cryptographic significance of both linear combinations and 1:1 PLT's, Claude Shannon, an early cryptographic pioneer, said many years ago that all secure ciphers must have some combination of "confusion" and "diffusion" to be secure. Linear combinations and 1:1 PLT's by themselves do not result in any significant increase in crytographic security because such functions lack the non-linear aspect of "confusion".

Linear combination of a first and second variable value can mean the direct combination of the values using linear operators. Direct examples of such combination usually involve use of certain linear combination operators (such as xor, addition, subtraction, SIMD addition, SIMD subtraction).

By contrast, indirect linear combination means a calculation which involves a combination of direct linear combinations and 1:1 PLT's, subject to three conditions. It is required that there are at least two variable input segments, where each input segment into the calculation is of equal size (an equal number of bits) and where that segment and all 1:1 PLT's of that segment typically affect the output of the calculation one time only (as an input into a direct linear combination). Indirect linear combination is like the root of a tree. It typically does not feed into the tree in two different places.

This description of the three conditions may sound complicated, but in fact it is quite simple. These conditions are the logical equivalent of a direct linear combination of equal-sized variable segments with the proviso that at any preselected point(s) in the calculation, prior to output of the final result, any variable segment may be operated on any number of times by 1:1 PLT's (and each time the segment value replaced by the output of the 1:1 PLT).

It should be acknowledged that while in theory indirect linear combination may use any number of 1:1 PLT's, in practice well-designed block ciphers using indirect linear combination of Q variable segments limit the use of 1:1 PLT's per such linear combination to a number no greater than (Q+1). For example, even though in an efficient block cipher an indirect linear combination of 2 variable segments could use any number of 1:1 PLT operations to achieve such linear combination, in practice such linear combination will not use more than 3 1:1 PLT operations.

An example of indirect linear combination includes (1) operating on a first variable segment with a fixed rotation and (2) on a second segment by adding to it a predetermined subkey value, prior to combining the results of these two predetermined operations using a linear combination operator. Another example is a direct linear combination of a first variable segment with a second variable segment where the resulting sum is an input into a predetermined bit-permutation, where the output of the calculation is the output of the bit-permutation.

The following is not an example of indirect linear combination. A first variable segment is added to a predetermined rotation of a second variable segment and then xored with a bit-permutation of the first variable segment, where the output of the calculation is the final xor result. In this case, one input segment affects the output is two different ways. Hence, there is a violation of one of the three conditions.

When there is an indirect linear combination of two variable segments previously operated by 1:1 PLT's, the linear operator which is said to combine the two values is that linear combination operator which combines the two results of the 1:1 PLT operations.

In both the case of direct linear combination and indirect linear combination of two variable segments, the result of the process has the two properties that (1) given two inputs with an equal probability of containing 0's and 1's, the result of the process contains generally an equal probability of 0's and 1's, (2) given that either input is constant, the output is a 1:1 function of the other input.

If two variable values are said to be linearly combined, such a statement by definition does not require that the values be directly combined as they may be indirectly combined; however, it does make clear that the combination of the two variable values takes place without using any non-linear operations (such as data-dependent sbox use, data-dependent rotates, data-dependent-shifts, or data-dependent multiplication).

For clarity, however, it shall be assumed in general throughout this discussion that terms such as "linear combination" and being "linearly combined" refer to direct linear combination, unless it is stated or implied that indirect linear combination is also a possibility.

There also may be direct or indirect linear combination of three variable values. As before, if this is an indirect example of linear combination, it means that at least one variable segment in the calculation was operated on by a 1:1 PLT. Of course, two linear combination operators are generally required to combine three variable values. Thus, in indirect linear combination of three variable values, the three variable values would generally be operated on (after any initial 1:1 PLT operations) by two linear operators in order to produce a combined single linear result.

Such indirect linear combination of three variables values may occur even though one of the variable values may be a nonlinear function of the other variable values. The combination of values can be a linear combination of the three potential input values even though the source of one of the three variable values may in fact be a nonlinear function of another.

For example, a linear combination of a substitution box result, with two block halves, is a linear combination of its three input values even though the substitution box result may reflect certain bits in one of the block halves in a non-linear manner. In summary, the description of a calculation as a direct or indirect linear combination refers to the details inside the calculation and does not inform us whether the inputs into the calculation are biased, correlated, or are a nonlinear function of other inputs into the calculation.

Similar to the linear combination of two segments, in the case of the linear combination of three variable segments, the result of the process has the two properties that (1) given three inputs with an equal probability of containing 0's and 1's, the result of the process contains generally an equal probability of 0's and 1's, (2) given that any two of the three inputs are constant, the output is a 1:1 function of the variable input.

Prior to beginning the iterative process, the present invention linearly combines (block 56) using operator LI at the right primary round segment, R1, with a first subkey value, K1. Next, the present invention performs the first of many rounds of encryption. Each round of encryption computes new values for its primary segments R0 and R1. Each computation of the two values is similar in form, even though it has different inputs, outputs, subkeys, and uses different registers. Subkeys are an expansion of a cipher key. Typically, the expansion transforms a given fixed number of bits to a much greater number of bits. Such subkey values are used often in predetermined particular rounds of a block cipher. A round segment is a segment which is a segment of bits of n-bit round input, or a segment of bits of n-bit round output, or a segment of bits calculated in a cipher round which is affected by n-bit round input, and which affects n-bit round output, where for example the word affect or affected indicates that when a first segment affects a second segment, a random change in all bits of the first segment will change at least one bit in the second segment with a chance of at least one in three.

Both R0 and R1 are primary segments, and are also one-to-one round segments. In fact, except for the small sections of bits which determines the data-dependent rotation, all variable segments in each round of this embodiment are one-to-one round segments.

To compute the first new primary round segment R0, the following procedure is used. The round calculates (block 58) a new value from a rotation of the right round segment R1 by a predetermined number of bits (typically rotation to the right by "f" bits), referred to as fixed rotation. It linearly combines (block 60) using operator L2, this intermediate round segment with subkey K2 for this half round to produce a new intermediate round segment. It then linearly combines (block 62) using operator L3, the round segment RO and the new intermediate round segment to provide a replacement value for the primary round segment R0.

Next, a given number of bits (typically it is preferred if that number is "f" bits where "f" preferably is a number of bits which is a logarithm base 2 of the size of the round segments) is extracted (block 64) from the least significant bits of the right round segment R1. For example, a 128-bit block cipher would use 6 least significant bits (f=6 permits all possible rotations of the one-to-one round segments, as generally $2^f=n/x$, and in this case $2^6=128/2$). It would extract the 6 least significant bits ("lsb") of the right one-to-one round segment, R1, in order to provide one input value, V, used by the variable, i.e., data-dependent rotation. A one-to-one round segment set is a set of ordered round segments in an operative round where it is true that each n-bit round input corresponds with only one possible ordered result insofar as the particular values of the ordered segments of that set are concerned, and that any particular ordered result insofar as the particular values of the segments are concerned corresponds with only one n-bit round input. Further, a one-to-one round segment is a round segment which is part of a one-to-one round segment set. Then, the left primary round segment R0 is rotated (block 66) by V, the value determined by the lsb to provide a replacement value for the primary round segment R0 (block 68) which is also a one-to-one round segment.

This process is then repeated to calculate the primary round segment R1. To compute the right primary round segment, R1, the following procedure is used. The round calculates (block 70) an intermediate round segment from a rotation of the other register R0 by f. It linearly combines (block 72) using the operator L4, this intermediate segment with subkey K3 for this half round to produce a new intermediate round segment. It linearly combines (block 74) the right primary round segment, R1, and the new intermediate round segment to produce a replacement value for the primary segment R1. A primary segment, an operative round is a segment of the new value of which is calculated to be part of its n-bit round output, and where typically the n-bit round input contains an old or prior value of the same segment, where throughout the round there are one or more new replacement values of the primary segment calculated where each new replacement value is a one-to-one function of its prior value, if all subkey values and all other primary segments are constant. Generally, all primary segment values are one-to-one round segments. Next, it extracts (block 76) a given number of bits ("f" bits) from the least significant bits of the left one-to-one round segment, R0. For example, a 128-bit block cipher would use 6 least significant bits (f=6). It would extract the 6 least significant bits ("lsb") of the left primary round segment R0 in order to provide one input, V, used by the variable rotation. Then, the right primary round segment, R1, is rotated (block 78) by V, the value determined by the lsb to provide a replacement value for the primary round segment R1 (block 80).

Each such round in which replacement round segments for R0 and R1 are computed is only part of the process. Many rounds are necessary depending on block size and the users desire for security, but this number of rounds is typically between 8 and 64 rounds, with at least 5 of such rounds incorporating the described process, and such rounds are herein called qualified operative rounds; some users may select a larger number of rounds, such as 128 rounds. Indeed, there is no true upper limit to the number of rounds which can be employed, with the tradeoff being that more rounds reduce the speed of calculation.

After completion of the last round, the system linearly combines (block 82) using the last linear operator of the rounds the left primary round segment R0, with the last subkey value, Klast. The ciphertext value for segments R0 (block 84) and R1 (block 86) are complete, and are then combined to provide ciphertext consisting of n bits, i.e., a n-bit cipher output (block 88).

There are four important and beneficial mathematical properties of this embodiment in calculating in each round the two primary segments R0 and R1 which maintain the security of the block cipher:

(1) Related to the calculation of each new primary one-to-one round segment R0 and R1, there is a nonlinear function, which in this case is data-dependent rotation, which calculates a new one-to-one round segment by modifying a one-to-one round segment from a particular one-to-one segment set based on a value which depends on preselected bits in a preselected location of a different one-to-one round segment from the same one-to-one segment set. As the value depends on a number of bits less than thirty-five percent of the size of the one-to-one round segment in the chain, i.e., a small section of the segment, this embodiment of the invention has a property referred to herein as bit expansion of a small section.

(2) Related to the calculation of each new primary one-to-one round segment R0 and R1, there is a linear combining function, which uses a linear operator typically from a certain algebraic group, which provides a new or modified one-to-one round segment by linearly combining a one-to-one round segment from a particular one-to-one segment set with a different one-to-one round segment from the same one-to-one segment set. Hence this embodiment of the invention has a property referred to herein as cumulative linear combination.

(3) Related to the calculation of each new primary one-to-one round segment R0 and R1, the modifications of and operations performed on the one-to-one round segments which takes place in properties (1) and (2) above, where these modified segments are typically primary round segments, are non-commutative with respect to each other. Hence, this embodiment of the invention has a property referred to herein as non-commutative one-to-one round segment interactions.

(4) Related to the calculation of each primary round segment R0 and R1, there is a subkey combining function, which produces a modified round segment from a round segment. As the subkey has generally the same number of bits as the round segment being modified, this embodiment of the invention has a property referred to herein as adjustment by a full-sized subkey. Achieving this fourth property appears beneficial and perhaps necessary for block ciphers using data-dependent rotation.

As previously discussed, the linear operators in this embodiment of the invention may be any linear operator. Further, the linear operators may differ in different rounds, and thus be round dependent. It will be appreciated that when the nonlinear operator of the bit expansion of a small section property (1) is data-dependent rotation, use of any linear operator to accomplish the cumulative linear combination property (2) ensures the achievement of the non-commutative one-to-one round segment interactions property (3). Consequently, all linear operators should be adequately secure.

Certain linear operators may be more secure than others. In particular, use of operators from mixed algebraic groups is consistent with cryptographic practice in other block ciphers and seems to provide good security here. For example, L2 could be xor, L3 could be addition (in the modulus of the round segment), L4 could be xor, L5 could be addition (in the modulus of the round segment), which one can represent as {L2:xor, L3:+, L4:xor, L5:+} in each round.

Ideally, it appears simplest and most self-consistent to use linear operators in such a way that in each round when a given linear function is used for a particular function, the linear operator used is always the same. For example, addition might be used as the operator which does all linear combination of one-to-one round segments, and xor is used as the operator which does all linear combination of round segments and subkeys. This is the specific approach adopted in the preferred embodiment of the invention. However, use of addition for all linear combinations in the round is also believed to be secure. Also, while all linear operators could be xor, this option may be less secure. For the balance of the present example, the linear operators of this embodiment are assumed to be {L2:xor, L3:+, L4:xor, L5:+}, although this may not be the most secure configuration for each round.

It should be noted that in this embodiment, the value of each primary segment is an indirect linear combination of two primary segments. The new value of each primary segment is an indirect combination of its value with another primary segment, where that other segment is combined linearly with a subkey prior to the linear combination of round segments. The combination with a predetermined subkey is an example of a 1:1 PLT. As has been stated elsewhere in this specification, placement of the subkey values is flexible; it could have been placed anywhere in the round where it would affect a round segment. Related with this, it does not seem to matter cryptographically whether the linear combination of round segments to produce a new round segment is typically a direct or indirect combination.

More generally, in this embodiment the new round segment value is a linear combination of round segments derived from other round segments. Such derivation can involve a 1:1 PLT such as combination with a subkey as shown above. Or it may be simpler or more complex.

A general statement of the embodiment is to observe that it calculates a new value of a particular primary round segment which is a direct or indirect linear combination of round segments derived from two round segments, one of which is the current value of the particular primary round segment, and the other is most of the bits of some other primary round segment.

Such derivations can be a direct identity transformations of the two input round segments, or they can be more complex. If the derivations are not a 1:1 PLT of the input round segments, it is preferred generally that each such derivation be solely from its input round segment, or perhaps that each such derivation be solely a 1:1 function of its input round segment.

It is useful to understand several definitions applicable to such derivations discussed herein. These definitions apply to particular uses herein of the words derivation, derive, etc.: (1) a derivation of a second value from a first value means that the first value is at least one of the variable and predetermined data sources which may affect the calculation of the second value, (2) a derivation of a second value solely from a first value means that the first value is the only variable data source which affects the calculation of the second value, even though there may be multiple predetermined values such as subkey values which also affect the calculation of the second value, (3) a derivation of a second value as a 1:1 function of a first value means that the first value is the only variable data source which affects the calculation of the second value, and that the second value is a 1:1 function of the first value, (4) a derivation of a second value as a 1:1 PLT of a first value, means that a predetermined number of 1:1 PLTs, which may be equal to zero or any number greater than zero but is generally less than three, transform the first value into the second value.

Note that by definition, derivation of a second value from a first value under definition #4 is a subset of definition #3; similarly, definition #3 is a subset of definition #2; similarly, definition #2 is a subset of definition #1.

Each round of this embodiment may also be expressed as two iterated equations, where each equation determines the value of one primary round segment, and where i is the index of the round and is incremented by x between rounds, e.g., incremented by 2. These round equations (Equations 8 and 9) ignore the first and final xors of the subkeys K1 and Klast to the plaintext input and ciphertext output.

$$R0 = ((R0 + ((R1 >>> F) \text{ xor } Key[i])) >>> LSB(R1)) \quad \text{Eq. 8}$$
$$R1 = ((R1 + ((R0 >>> F) \text{ xor } Key[i+1])) >>> LSB(R0)) \quad \text{Eq. 9}$$

Decryption is the inverse of encryption. In the present invention all the same steps are repeated but in reverse order. Decryption uses ciphertext output as input and recovers the values of the plaintext inputs. Of course, as noted above, what is herein called the decryption operation can be used for encryption, and vice versa.

The decryption equations (Equations 8 and 9) of the present invention are the inverse of the encryption equations:

$$R1 = ((R1 <<< LSB(R0)) - ((R0 >>> F) \text{ xor } Key[i+1])) \quad \text{Eq. 10}$$
$$R0 = ((R0 <<< LSB(R1)) - ((R1 >>> F) \text{ xor } Key[i])) \quad \text{Eq. 11}$$

In order to analyze the impact of the inclusion of the fixed rotation on the strength of the block cipher, it is useful to ask first, does the inclusion of the fixed rotation in the block cipher with data dependent rotations increase the number of specified isolated bits?

Analysis of the present invention demonstrates that (when using a fixed rotation value not equal to zero), even if all addition and subtraction operations are replaced by xor operations for analytical simplicity, there is no set of specified isolated bits as small as it would be for the comparable version of RC5 using the same block size. Further, it can be shown that for many fixed rotations no set of specific isolated bits exists which is a subset of fewer than n-bits if the cipher data block contains n-bits.

This result can be true even if the number of bits of fixed rotation is badly chosen (such as being equal to a fixed rotation of only 1 bit).

Despite the good test result which is shown below for fixed rotations as small as 1 bit, it is preferable that the number of bits of fixed rotation, f, is as large as the size of the number of bits which determine the data-dependent rotation, which equals the log base 2 of the bit-size of the round segment (such as 5 bits if there are two primary segments and the size of each such round segment is 32 bits, or 6 bits if the size of each rotated round segment is 64 bits). Of course, good results can be obtained as well using a number of bits of fixed rotation either 1 bit more or less than this preferred number. Hence, if z is the number of bits which determine the data-dependent rotation, it may be preferred that the number of bits of fixed rotation, rotated either to the left or to the right, is (z−1),z, or (z+1) bits.

Of course, the number of bits of fixed rotation can be implemented as either fixed rotation of a round segment of certain bit-size ("BIT-SIZE") to the left or right. So when it is stated that the preferred number of bits of fixed rotation equals the log base 2 of the bit-size of the round segment, this also means generally the preferred fixed rotation is by a number of bits A in one direction which equals log(base 2) of BIT-SIZE or by an equivalent number of bits B with rotation in the opposite direction which equals (BIT-SIZE− log(base 2)BIT-SIZE). For example, in the present embodiment using a block size of 128 bits and a round segment size of 64 bits, these equivalent preferred values of fixed rotation would be either 6 bits (A=6) or 58 bits (B=58).

It is possible to show that using even a weak fixed rotation of 1 bit the number of specified isolated bits includes all bits of the variable data block. This is easily proved by contradiction. First recall from prior definition of the term that if there is a subset of fewer than n-bits in the n-bits of the data block which contains the specified isolated bits, then there exist potential cipher interactions where such specified isolated bits a) affect the data dependent rotations, and b) the specified isolated bits affect only themselves for all variable rotation amounts.

Assume that a particular group of bits, say on a little-endian processor the least significant bits at positions 0 through bit-position 5 in each block half, are specified isolated bits. What happens in a round using Equation 8 when such bits are combined with the other block half linearly? If in Equation 8, we look at the specified isolated bits of the input R0, those must be variably rotated by a value of zero bits in order that the specified isolated bits affect no output bits in bit-positions which are not pail of the assumed specified isolated bits (in bit positions other than 0 through 5).

But if the variable rotation is zero, then the specified isolated bits in the same initial bit-positions (0 through 5) in the input RI, after a fixed bit rotation by 1 bit to the right, occupy bit-positions (4,3,2,1,0,63). And, further the output bit of Equation 8 in bit 5, is now being affected by a bit-value of R1 which formerly was in bit-position 6. Bit-position 6 is not one of the assumed specified isolated bits, and yet it is affecting the specified bit-positions in bits 0 through bit 5. This contradicts the definition of the term specified isolated bits as it demonstrates that the bits are not isolated but are affected by other bits for all possible variable data-dependent rotations.

By extending this type of analysis, it is possible to show that there are no specified isolated bits which are a subset of the n-bit data block given most fixed rotation values. This is true for a fixed rotation of 1; it is true for a preferred fixed rotation of log base 2 of BIT-SIZE; it is also true for a relatively prime fixed rotation of 25 bits.

On the other hand, there are some generally weak fixed rotations such as rotations by half the size of the round segments, where in some variations of this block cipher it is possible to have specific isolated bits which are a subset of the n-bit data block. It is possible to produce a similar cipher in which one substitutes for any linear operations of the rounds of the cipher which use addition, subtraction, multiplication, division, similar operations which use no carry operations. The resulting alternative cipher is a slightly weaker but cryptographically similar variation which may be tested for the existence of specified isolated bits. For example, in this instance if the round segment size is 64 bits each, a fixed rotation of 32 bits would not add much security. In such a case, using the embodiment shown in FIG. 3, but with the operation xor replacing use of addition/subtraction there would be specific isolated bits at bit positions (0 through 5, and 32 through 37). It is evident that if a variation on a cipher using data-dependent rotation, in which there is a substitution of xor for addition or subtraction, has specific isolated bits which are a subset of the n-bit data block, it is generally best to modify the use of fixed rotation in the cipher because of weakness in the cryptographically similar variation.

Incidentally, it should be noted what is achieved by such use of the fixed rotation or predetermined bit-moving operation in this embodiment. By guaranteeing that the specified isolated bits of the n-bit data block are as large as the n-bit data block, use of the predetermined bit-moving operations generally ensures that every input bit of the block cipher can affect a rotation within 10 or 20 rounds regardless of what variable data-dependent rotations may occur.

In summary, while in the present invention predetermined bit-moving operators may be inserted anywhere into a block cipher, one may test for an indication that the placement of the bit-moving operations is beneficial. When the number of specified isolated bits is equal or nearly equal to the bit-size of the variable cipher data block, one has confirmation that the stricture or placement of the predetermined operations in the block cipher is appropriate.

To summarize the usefulness of testing for specified isolated bits, it is useful to evaluate each iterative round of a block cipher using data-dependent rotations for the number of specified isolated bits. The preferred contribution of the fixed rotation in such rounds is to increase the number of specified isolated bits in a given number of rounds. In the case of the preferred embodiment shown in FIG. 3, the number of specified isolated bits equals the size of the n-bit variable data block, which is to say there is no small subset of isolated bits in the cipher.

In order for the use of fixed rotation or other predetermined bit-moving operations in the block cipher to achieve a certain minimal standard, it is preferred that use of such predetermined operation permits the block cipher to increase its number of specified isolated bits to a minimum number of bits which is greater than 50 percent of the size of the n-bit variable data block. It is better still if the number of specified isolated bits is greater than 80 percent of the bit-size of the n-bit variable data block. Both of these conditions are achieved in FIG. 3.

When examining the embodiment in FIG. 3, it is clear that the fixed rotation has an input which is a round segment, and that the output of the fixed rotation is a round segment. Further, some of the bits of the input to the fixed rotation are variable; and at least some of the bits of its output affect n-bit round output. Generally, it appears that in order for fixed rotation or other predetermined bit-moving operation(s) in a block cipher using data-dependent rotation in its iterative rounds to increase the number of specified isolated bits or to have other beneficial results for the security of the block cipher, it is necessary: a) for the operation to have a round segment input (where it has some bits affected by n-bit round input), and b) the operation must have output bits where at least some of its output bits affect n-bit round output. These three conditions related to input bits, output bits, and result concerning increases in specified isolated bits, help to ensure that the fixed rotation or other predetermined bit-moving operation serves its purpose in improving the security of a block cipher using data dependent rotations in its round function.

Further, it should be noted that the fixed rotation by a non-zero number of bits may generally be placed anywhere in the round function without reducing its benefits to security. And as noted elsewhere in the specification, fixed rotation is just one type of bit-moving operation. Fixed rotations are just one type of predetermined bit-permutation. The benefits of fixed rotation by non-zero numbers of bits to the security of block ciphers using data dependent rotation is not restricted to fixed rotations, but rather such security benefits can result from use of all predetermined bit-moving operations in general, including predetermined non-identity bit-permutations. And hence the function used need not be a fixed rotation, and may instead be any kind of non-identity predetermined bit-moving operations.

The bit-moving operation or function may also be a logical or arithmetic bit-shift operation. Predetermined circular bit rotation operations and predetermined bit-shift operators both use predetermined rotation. However, unlike circular rotations, logical or arithmetic shift operations drop or discard bits when they are rotated over the start or end of a round segment. For example, a predetermined logical shift operation is equal to a combination of a predetermined bit-rotation with a predetermined bitwise AND operation with a constant value also called a bit-mask operation. The additional masking or discarding of bits implicit in a fixed bit-shift operation compared with a fixed rotation offers no significant cryptographic advantage to the cipher, and can in fact offer significant disadvantages. However, in some processors fixed bit-shifts may be executed faster than fixed bit-rotations, especially if the bits discarded are not needed. Hence, it is typically appreciated by programmers skilled in the art that when writing a program which requires some form of fixed bit-rotation the choice of whether to use circular bit-rotation or bit-shifts is based on convenience and sometimes depends on the details of the particular microprocessor on which the program is intended to run. The embodiments shown herein which use circular bit-rotation as a means of bit-moving to improve the security of a block cipher which uses data-dependent rotations exist in parallel with alternative generally equivalent versions which use bit-shift operations, where such bit-shift operations may be a perfect or imperfect substitute for such circular fixed rotation.

Of course, it is worth keeping in mind that in many cases use of logical (or even arithmetic) shift operations are slower than fixed rotate operations. For example, when bits input into the bit-moving function may not be discarded, two logical shifts and one xor operation are required to achieve a perfect substitute for one fixed rotate operation.

The above discussion helps to show that from predetermined circular rotations may be derived a class of predetermined non-identity rotation operators which include not only predetermined circular rotations but also logical bit-shift and arithmetic bit-shift. Similarly, discussion to follow helps to show that from predetermined non-identity bit-permutations may be derived a class of predetermined bit-moving operators which includes not only non-identity bit-permutations but also modified bit-permutations where, for example, not all input bits affect output bits. Incidentally, predetermined circular rotations are a member of both such classes, and also the class of predetermined non-identity rotation operators is a subset of the class of predetermined bit-moving operators.

These two classes of operators may be expressed mathematically in various ways, and can often provide inputs and outputs equivalent to operators discussed herein without being calculated in an identical manner.

Herein the word bit-moving is used generally to describe operations executed in software or hardware which move bits, by which it is meant that a given input bit in a given position is "moved", i.e., that input bit solely determines the value an output bit in a different position. A variable rotation is also a type of a bit-moving operation (particularly when the number of bits of the variable rotation is non-zero). Variable rotations can be classified as variable bit-moving operations.

It is important for this discussion of the present invention concerning block ciphers which use data-dependent rotations to define a predetermined or "fixed" bit-moving operator and operation. It can be defined as a predetermined operator which moves at least 1 input bit in a given bit-position in a predetermined manner to a different bit-position in its output executable in software or in hardware which: a) typically includes or comprises some type of a predetermined non-identity bit-permutation as a way to move one or more bits, and b) may optionally include use of the operators predetermined bit-concatenation, predetermined bit-discarding, and partial masking using bitwise AND and bitwise OR.

A predetermined non-identity bit-permutation, by definition, is a bit-permutation which has at least one input bit in a given bit-position which determines the value of an output bit in a different bit-position. Predetermined non-identity bit-permutations do not operate on or combine their bits and only permute the order of their bits, and they are predetermined 1:1 transformations where each input bit solely determines one output bit, and when calculated or traced backwards, each output bit solely determines one input bit.

It should be noted that this definition does not in all cases require that a predetermined bit-moving operation must use a predetermined non-identity permutation as part of its calculation, as alternative ways of expressing the calculation may exist which do not require use of a predetermined non-identity permutation. In such cases, there will exist a mathematically or cryptographically equivalent expression which does use a predetermined non-identity bit-permutation functionally as a means to move one or more bits.

Note also that it is preferred that a predetermined bit-moving operation move more than 1 bit into a new bit-position; moving only 1 bit would be either inefficient or insecure. It is preferred that it move a minimum of f bits into new positions, where f is the log base 2 of the bit-size of the round segment being variably rotated. Even better, it is preferred that it move a number of bits into new positions which equals the bit-size of a round segment being variably rotated.

It is within the scope of the present invention in which predetermined bit-moving operators or predetermined non-identity rotation operators are used to improve the security of bit-diffusion such that all bits in the data block can affect a variable data-dependent rotation, to make use of only a small number of bits of the output of the predetermined bit-moving operator. For example, assume that there is a derivative round segment in which certain most significant bits can reflect the values of all bits of a primary round segment. If so, given reasonable implementation by one skilled in the art, use of fixed rotation to move these most significant bits into the least significant bits where they affect or control variable data-dependent rotation should increase the number of specified isolated bits to equal the bit-size of the variable data block. Consequently, in this case the bit-moving operator is used in a manner to improve the security of bit-diffusion such that all bits in the data block can affect a variable data-dependent rotation consistent with the present invention.

A predetermined bit-permutation has an equal number of input bits and output bits. But a predetermined bit-moving operator might be a predetermined bit-permutation with a variable input where that variable input is concatenated with an invariant empty field filled with zeros using a bit-concatenation operator, such that the output includes those zeros and is larger than the variable input. On the other hand, some of the output bits from a bit-permutation might be discarded using a bit-discarding operator, and thus the output of a predetermined bit-moving operation might be smaller than its input. Further, it is possible to combine the input or output of non-identity bit-permutations with bit-wise AND and bit-wise OR operations such that some but not all bits are "masked out" and their values are replaced by constant values such as 0 or 1.

Examples of predetermined bit-moving operations include the rotation operators, which include predetermined circular bit-rotation by non-zero numbers of bits and predetermined bit-shifting by non-zero numbers of bits (either logical or arithmetic bit-shift, although generally logical bit-shift is preferred to arithmetic bit-shift), predetermined non-identity bit-permutation operators such as predetermined non-identity byte-permutations, byte-order reversal operations.

Examples of operations which are not predetermined bit-moving operations include variable bit-rotation, variable bit-shift, addition, subtraction, multiplication, bitwise-AND, bitwise-OR, xor.

Note also that predetermined bit-moving operations all have inverses and may be xored with their "bit-moving inverses" to cancel out the effect of any bit-movement, and provide an identity transformation of their inputs as a result. Hence, while it is possible to place a bit-moving operator in different places a block cipher, even appropriate placement of such an operator in a block cipher may be canceled out by other inappropriate placement. Hence, after the design process is complete, the block cipher must be examined in its totality using some test such as testing for specified isolated bits.

As suggested previously, use of fixed, i.e., predetermined, circular bit-rotation (or its mathematical or cryptographic equivalent using other operators such as bit-shift operators) is generally preferred to use of other predetermined non-identity rotation operators. And use of predetermined non-identity rotation operators (or its mathematical or cryptographic equivalent using other operators) is generally preferred to use of predetermined bit-moving, operators.

Regardless of which bit-moving operators or operations are ultimately adopted for a block cipher, it is believed that use of predetermined bit-moving, operations is critical. It is believed that there will be few if any secure and efficient variations of block ciphers, which in iterative rounds use data-dependent rotation, which do not also use fixed or predetermined bit-moving operations in some form in those iterative rounds to ensure secure bit-diffusion in which all bits in the data block can affect a variable data-dependent rotation. Such predetermined bit-moving operators or related mathematically equivalent operators are derived from use either of fixed circular bit-rotation or of predetermined non-identity bit-permutation.

Concerning use in the present invention of fixed rotation in block ciphers with data-dependent rotation of two to four primary round segments, there are two beneficial traits called effective and active fixed rotation (which are not yet defined). It is preferred that the fixed rotation is effective fixed rotation; it is also preferred that the fixed rotation is active and has output bits where most of the output bits affect n-bit round output.

In the present invention, for one skilled in the art there are innumerable ways of implementing the use of fixed rotation or other bit-moving operations to ensure adequate bit-diffusion and an adequate number of specified isolated bits. One test for correct use of predetermined bit-moving operations is whether the use of fixed rotation or other predetermined bit-moving operator increases the number of specified isolated bits from what it would be without fixed rotations or other predetermined bit-moving, operations. As a result of such verification, we can say that use of fixed rotation or of other predetermined bit-moving operators is mathematically necessary for without it, the cipher is either insecure or inefficient. The fixed rotation directly or indirectly affects the size of the set of bits which control the data-dependent rotations. By increasing the number of specified isolated bits, which is the minimum size of the set of bits which controls the data-dependent rotation, the fixed rotation helps to provide adequate linear diffusion.

The embodiments shown herein of this invention all demonstrate effective and active fixed rotation. This preference does not mean that fixed rotation to be secure must be active for all embodiments. The preference for fixed or predetermined rotation does not mean that predetermined logical or arithmetic shift operations or other predetermined bit-permutations cannot accomplish an equivalent effect. Finally, it appears that the preference for use of effective fixed rotation does not mean that all such bit-moving operations must be effective.

It is true that historically fixed rotation has been used in various block ciphers for various reasons. In Khufu, fixed rotation was used to ensure that all output bits eventually effect an sbox input, and hence controls a nonlinear activity. This reason is similar to the use of fixed rotation in the present invention. The structure of Khufu which uses larger sboxes with more output bits than input bits, and uses fixed rotation as a novel means of ensuring all sbox output bits eventually become an sbox input was a novel and ingenious design which took advantage of the strengths of the microprocessor for efficient, secure encryption.

In DES, use of fixed rotation is more complicated. Fixed rotation is not technically part of the DES specification or structure. Actually, DES was designed for hardware, and uses bit-permutation. Its bit-permutation is a way of ensuring in general that at least one bit from each different sbox is assigned to each sbox input in the next round. When implemented in software, fixed rotation or equivalent logical shifts combined with mask operations can achieve the same effect as bit-permutations. This use of bit-permutation is sophisticated and reflects the insights of IBM and the NSA in the 1970's.

When Ron Rivest published RC5, it seemed clear that this was a simple block cipher that did not require use of either sboxes or of any form of predetermined bit-moving operations such as fixed bit-permutations, fixed rotations or fixed shift operations.

This is because the apparently random nature of the data-dependent rotation combined with some form of cumulative linear mixing of the other round segments appeared to ensure that all bits affected all bits in a small number of rounds. Due to-such apparently random mixing of bits, it would seem pointless and foolish to add fixed rotations or logical shifts or other predetermined bit-moving operators to this type of block cipher. It was not at all obvious to the designers of RC5 or to the public when RC5 was presented that use of the fixed rotation would cause any significant change to the security of the algorithm, good or bad.

In the article published by Ron Rivest describing RC5 (Fast Software Encryption, Lecture Notes in Computer Science, December 1994, Belgium, Springer), there is no mention of use of fixed rotations, and the article said that in only eight rounds of RC5 every message input bit would affect one rotation.

By contrast, in the present invention a new and better variation of block ciphers using data-dependent rotation in their iterative rounds is presented. It is asserted that by introducing into such block ciphers the use of fixed rotation (or the equivalent use of logical bit-shift) it is possible to fix a weakness of such block ciphers. It is also stated that the weakness which is fixed is the existence of certain inputs where the input bits do not affect a rotation after many rounds. It is asserted that such combination of data-dependent rotation with fixed rotation permits all plaintext or ciphertext data to affect a rotation in a smaller number of rounds.

The following discussion helps to review the number of good bits of this embodiment which refers to the linear diffusion of fresh data into the data-dependent rotation operator and understanding good bits is a way of appreciating, one potential benefit of fixed rotation, and this discussion defines the meaning of active and effective rotation, which are preferred ways of implementing block ciphers with data-dependent rotation.

To understand an aspect of FIG. 3, analysis of the inverse equations (Equations 10 and 11) permits one to appreciate the bit-diffusion of data through the embodiment. It is possible to trace the n-bit round input of two consecutive rounds to show that there appear to be 2f (i.e., x times f) input bits which affect the nonlinear activity of a second round of the embodiment which do not affect the nonlinear activity of the first round. Of course, such bits are called good bits and they control the number of bits of data-dependent rotation in the given round. This number of good bits (2f) is more than half of the 2f-bits which affect the variable rotations of each round. Consequently, the system of the present invention has the property called new small section data in successive rounds.

One feature of this embodiment which permits a number of good bits greater than zero (i.e., greater than the number of good bits of RC5) is its use of active and effective fixed rotation in its iterative rounds. It is important to understand that use of the term active fixed rotation does not mean fixed rotation passively as means of accessing a small number of bits. Active fixed rotation is fixed rotation where if the output of a fixed rotation round operator produces z bits, most bits of the output and preferably at least (z−2) bits affect the n-bit round output of that round.

Effective fixed rotation has a different meaning. It refers to use of fixed rotation in an effective manner. Effective use of fixed rotation in the iterative rounds of a block cipher using data-dependent rotation is use which is not commutative with use of data dependent rotation. In other words, it is ineffective use of fixed rotation if it occurs on top of or in sequence with rotation of a similar one-to-one round segment using data-dependent rotation.

Of course, use of fixed rotation may be round or segment dependent as long as the number of bits of rotation is predetermined prior to operating on the variable data in the block cipher.

Figure 12:
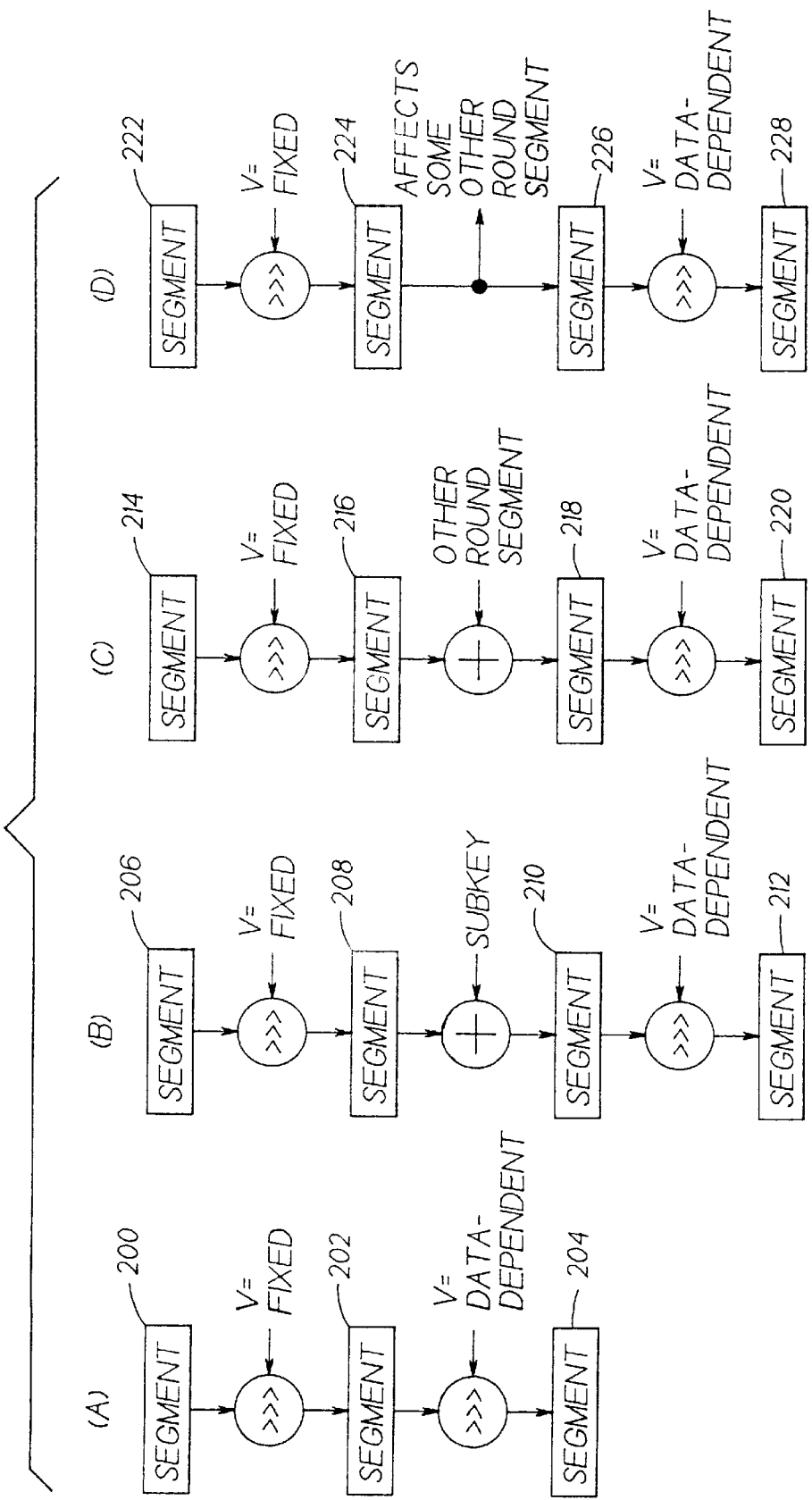
FIG. 12 is a column listing of examples of ineffective and effective fixed rotation as it applies to data-dependent rotation in accordance with the present invention.

Referring to FIG. 12, column A shows a simple example illustrating ineffective fixed rotation. It will be noted that column A is an example of an unproductive one-to-one segment rotation chain. An unproductive one-to-one segment rotation chain is a chain of at least three round segments wherein the following properties are true without regard to whether the block cipher (encryption) or its inverse (decryption) is calculated: (1) each round segment except for the last segment in the chain affects the next round segment in the chain and no other round segments, (2) each round segment except for the first one is determined by a round operator whose input sources are selected from the group consisting of the previous round segment in the chain, subkey values, any data-dependent values which determine the rotation of the data-dependent operators in the chain, and (3) the chain includes the input round segments and output round segments of particular instances of each of two functions, a fixed rotation function and a data-dependent rotation function. An unproductive one-to-one segment rotation chain is defined herein as a chain of at least three round segments 200, 202, 204 wherein the following properties are true without regard to whether the block cipher is computed normally (often called encryption) or in its inverse mode (often called decryption): (1) each round segment of the chain except for the last segment of the chain affects the next round segment of the chain and affects no other round segments, (2) each round segment of the chain except for the first round segment of the chain is determined by a round operator whose inputs are selected from a group consisting of and limited to the previous round segment in the chain, subkey values, and any values which determine the degree of data-dependent rotation, and (3) the chain includes both the input round segments and the output round segments of particular instances of each of two functions, a fixed rotation function and a data-dependent rotation function. Any fixed rotation where its output segment (or its input segment) is a round segment in an unproductive one-to-one segment rotation chain is ineffective fixed rotation.

Of course, by definition and for clarity, a few observations are in order. First, predetermined rotations by non-zero numbers of bits are ineffective fixed rotation if they are part of an unproductive one-to-one segment rotation chain. Further, if non-identity bit-permutations or logical bit-shifts are used in a manner equivalent with bit-rotations, they may classified as ineffective if they are part of an unproductive one-to-one segment rotation chain. All other uses of predetermined bit-rotations by non-zero numbers of bits, non-identity bit-permutations, and bit-shifts arc classified as effective bit-rotation (even if the predetermined bit-moving operation is not, strictly speaking, bit-rotation).

Turning to column B in FIG. 12, there is an external input into a chain of segments 206, 208, 210, 212, while the input is from a subkey value. Hence, column B is also an unproductive one-to-one segment rotation chain and any fixed rotation with an output round segment in this chain is ineffective fixed rotation.

Turning to column C in FIG. 12, the input into the middle of the chain of segments 214, 216, 218, 220 is a round segment not from within the chain. Therefore, the chain is not an unproductive one-to-one segment rotation chain and the fixed rotation in the chain is effective.

Turning to column D in FIG. 12, there is an output in the middle of the chain of segments 222, 224, 226, 228 which affects some other round segment other than the next link in the chain. Therefore, the chain is not an unproductive one-to-one segment rotation chain and the fixed rotation in the chain is effective.

The use of fixed rotation in a block cipher where such fixed rotation is used in an active and effective manner is the fifth desired property of the present invention, and it is associated with generally measurable benefits such as an increase in the number of good bits. As used herein, the term fixed rotation is interpreted broadly to include round and segment dependent fixed rotation, where the number of bits of fixed rotation varies according to the round or the segment of the round or both.

The following proposition illustrates that the use of active and effective fixed rotation can increase the strength of block ciphers using data-dependent rotation. In general, the ability of a cryptanalyst to detect and then to take advantage of weak subkeys in data-dependent block ciphers requires weak data-dependence and weak bit-diffusion. By ensuring that a new small section of data is inputted into the variable rotation in succeeding rounds, the cryptographic system and method increase data-dependence and bit-diffusion; the method increases the randomness of the ciphertext output; and thus weak key values become more difficult to detect and harder to take advantage of. Regardless of the source of the prior art's shortcomings, the present system and method provides more secure encryption.

Another indirect or tentative way to confirm the increase in strength associated with the present invention is to compare different indicators in two different scenarios. In the first scenario, the number of bits of fixed rotation equals zero. In this case, the number of good bits equals zero, and in general not all input bits affect a rotation given any number of rounds for some subkeys. In the second scenario, the number of bits of fixed rotation equals f. In this second case, the number of good bits is 2f, and, not taking into account any possible self-cancellation of input bits, all plaintext input bits affect a rotation regardless of the values of the subkeys after roughly n/xf rounds. Unfortunately, while it is useful to calculate the number of rounds which ensures that each input generally affects a rotation, the calculation can be very time-consuming except when it is determined in scaled-down models using block ciphers where the block size is 16 bits or less. Hence, while the discussion herein has focused on the benefits associated with increasing the number of good bits which is possible to calculate, the benefits of the present invention are not so limited.

It should be noted, as has been stated elsewhere in this document, that use of fixed rotation to benefit the strength of a block cipher using data-dependent rotation is a special case. The most general case involves use not merely of fixed rotation (i.e. predetermined rotations by non-zero numbers of bits), but rather involves the use of bit-permutations other than the identity permutation. Fixed rotations by non-zero numbers of bits are a subset of the possible bit-permutations, and unlike most bit-permutations, have the advantage of generally being executed in one clock cycle on a microprocessor. When executed in hardware, any type of bit-permutation may be used with no penalty in speed. One should understand the use of fixed rotations to improve the security of data-dependent rotation is not limited merely to fixed rotations. In fact, it is possible to achieve the security gains associated with fixed rotations by carefully selecting appropriate bit-permutations. However, many bit-permutations are not as secure as properly implemented fixed bit-rotation, in which the fixed numbers of bits of rotation, "f", is set equal to the number of bits which in that round control the data-dependent rotation of a data-dependent rotation operator.

Figure 4:
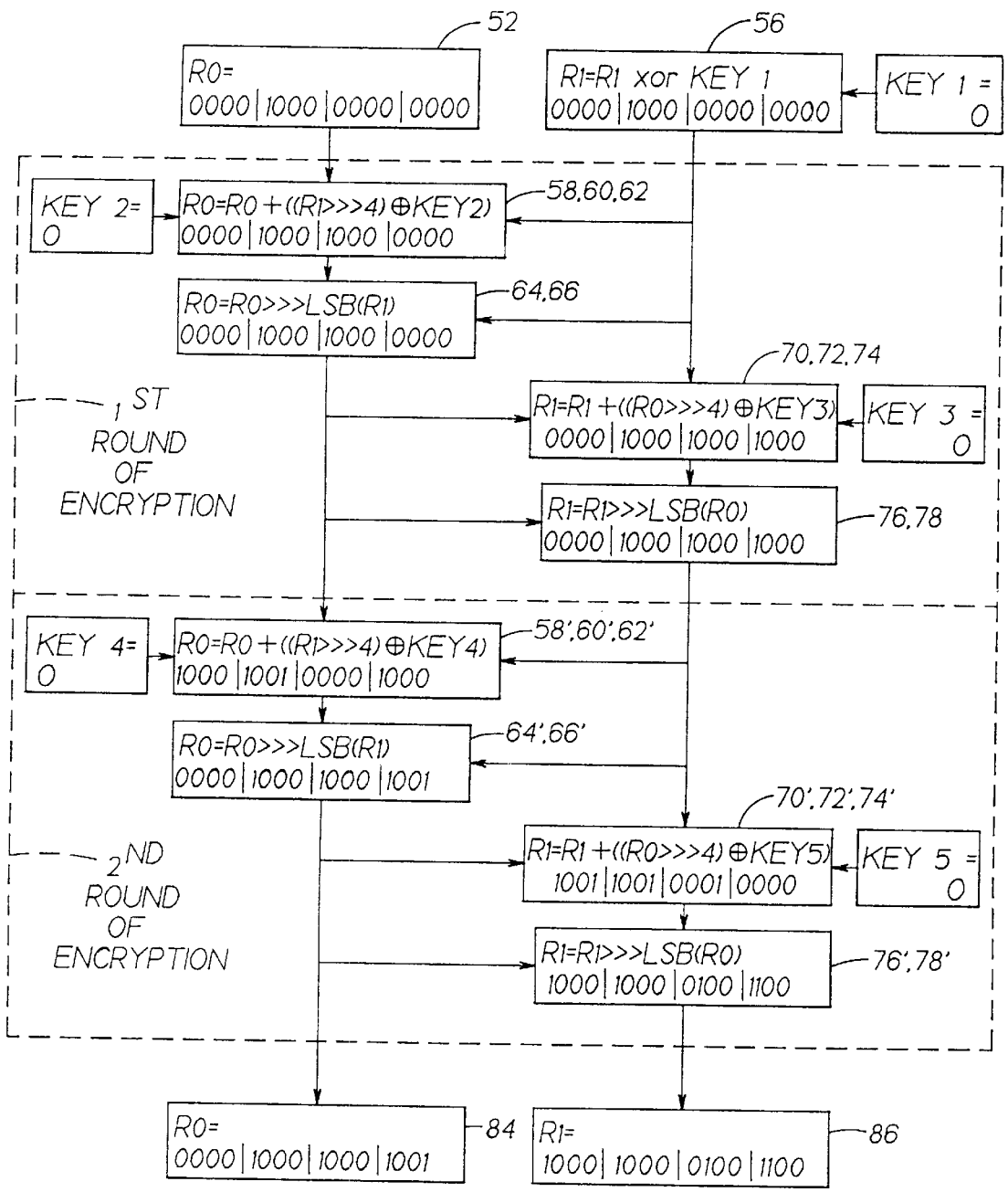
FIG. 4 is an example which illustrates two rounds of the encryption method of FIG. 3, assuming input and subkey values used in FIG. 2, in accordance with the present invention.

Referring to FIG. 4 (wherein the blocks are numbered as in FIG. 3, with the numbers in the second round being designated with a prime), a simple example is shown in which a given input passes through two rounds and is modified by it despite simple subkeys in which all values equal 0. It will be appreciated that the bits which determine rotations in this example are not based solely on the initial lsb of the plaintext input segments. This example reflects a cryptographic system in which the variable rotations depend on many different subkey and input values.

It appears that the security and efficiency of the cryptographic system and method of this invention may depend primarily on achieving the five properties discussed above. There are many variations on this general method which are secure. The variations appear to be secure in general so long as the changes made do not nullify the above described preferred properties.

It will be appreciated that the system as heretofore described utilizes active fixed rotation and other functions to affect the one-to-one primary segment variables of each R0 and R1 in each operative round. It will further be appreciated, however, that it is not always required for a secure block cipher that each primary round segment R0 and R1 be affected by each of those functions at some point in each operative round.

Apart from this general observation, variations in the present invention include using values of x other than 2 in certain or in all rounds (i.e., more than 2 primary segments), and using linear combination operators other than those shown above in the preferred embodiment. There are many other variations which also result in secure binary block ciphers including but not limited to: (1) the source of bits affecting non-linear activity, (2) changes in the number of bits of fixed rotation, (3) reversing the direction of the data-dependent rotation, (4) a different order of computing primary round segments (5) new or different key expansion methods, (6) different key placement in the equations, (7) alternative placement of the fixed rotation, (8) achieving nonlinear bit expansion with an s-box instead of data-dependent rotation, (9) other key expansion methods associated with more complex subkey generation.

First, although the embodiment of FIG. 3 is shown having certain bits extracted from the least significant bits of one-to-one round segments for purposes of obtaining f bits to affect a variable rotation, extraction of bits from the least significant bits may not always be preferred. Currently, it is much quicker to extract a given number of bits from the least significant bits of a register than from anywhere else on the register. Such an extraction of bits from the least significant bits generally requires nothing more than one mask operation (in those processors requiring mask operations prior to a rotate instruction). By contrast to extract bits from anywhere else in a register generally requires a fixed rotation and in some instances a mask operation. However, the present invention may not be so limited as microprocessor technology advances. Intel MMX operations may permit extraction of bits from preselected locations in certain registers other than the lsb as efficiently as extraction of bits from the lsb. Consequently, in the present invention it is preferred to extract bits which have nonlinear effects from the lsb or from other bit locations from which bits may be extracted efficiently.

Second, although the embodiment of FIG. 3 is shown with fixed rotation to the right by f bits (where f is generally equal to 6 bits given a 128-bit block cipher), it will be appreciated that the rotation can also function by rotating to the left. In the present system, the fixed rotation is typically based in the number of bits, f, required to select a new position for a data-dependent segment (e.g., 6 bits permits 2^6 possible rotations, which is the segment size for a 128-bit block with 2 block half primary segments of 64-bits each). For such a b lock cipher, a fixed rotation rightward or leftward by a number of bits less than f (e.g., rotation rightward by less than 6 or by more than 58, for a 128-bit block with 2 primary segments) is generally less secure than rotation by 6. It will be noted that fixed rotation by an intermediate value greater than 6 or less than 58 appears in some cases to be less secure than fixed rotation by 6, although it may in some cases be as secure or perhaps even more secure than fixed rotation by 6. For example, for such a block cipher, fixed rotation by 32 bits would generally be less secure than fixed rotation by 6 bits. More generally, as mentioned previously, such number of bits of such predetermined or fixed rotation may vary according to each round and to the particular segment being calculated in each round.

Third, the direction of data-dependent rotation in the preferred embodiment is to the right by a number of bits determined by the data-dependent value. However, it will be appreciated that such data-dependent value can also determine data-dependent rotation to the left. Neither leftward or rightward data-dependent rotation is believed to be more secure than the other.

Fourth, in embodiment of FIG. 3, a system is shown in which in the first half of each round the round operators modify the left primary round segment R0, and then in the second half of each round the round operators modify the right primary round segment R1. Clearly, the order of computing new primary round segments could be reversed with no adverse consequences. The first half round might modify the right primary round segment R1, and the second half round might modify the left primary round segment R0. There is no requirement in general in any round as to what is the preferred order of modification of primary round segments. On the other hand, generally the present invention is most effective if in a given round at any point the primary round segment being modified currently is different than the primary round segment which was last modified (i.e., it is preferred not to modify the same primary round segment twice in the same way without first modifying the other primary round segment in that way at least once).

Fifth, a good block cipher using data-dependent rotation is attainable with a quick start-up. As data-dependent block ciphers have no s-boxes, they offer potentially a much faster bootup or startup than other block ciphers. Any slow or complex key expansion process will increase the start-up time. A problem with the prior art RC5 encryption method, as previously noted, is that its key expansion process is slow.

Further, there is an opportunity for a new fast key expansion when using data-dependent rotation in the rounds. Related key attacks generally involve a cryptanalyst selecting various plaintext inputs to a block cipher as well as selecting certain differences in key inputs. While these attacks are highly theoretical, they can indicate an underlying weakness in a block cipher. Certain block ciphers using data-dependent rotation as part of the block cipher are more resistant to related key attacks when using certain subkey generation methods.

In particular, the prevailing view in the field that it is necessary to use a key expansion method which maximizes avalanche in the subkeys and avoids linear key schedules is entirely wrong concerning key expansion for block ciphers with either round-dependent rotation in the block cipher or data-dependent rotation of round segments. In such block ciphers simple quick linear key expansion with no avalanche is perfectly secure. This is a novel and surprising innovation in this field.

Hence, there is an opportunity to adopt a new method of key expansion which is fast and simple and secure, where this method has these advantages for two categories of block ciphers. In general, this method can benefit block ciphers using fixed rotation where such fixed rotation is round-dependent. This method also and in particular benefits block ciphers using data-dependent rotation, especially where such data-dependent rotation uses active effective fixed rotation.

Figure 5:
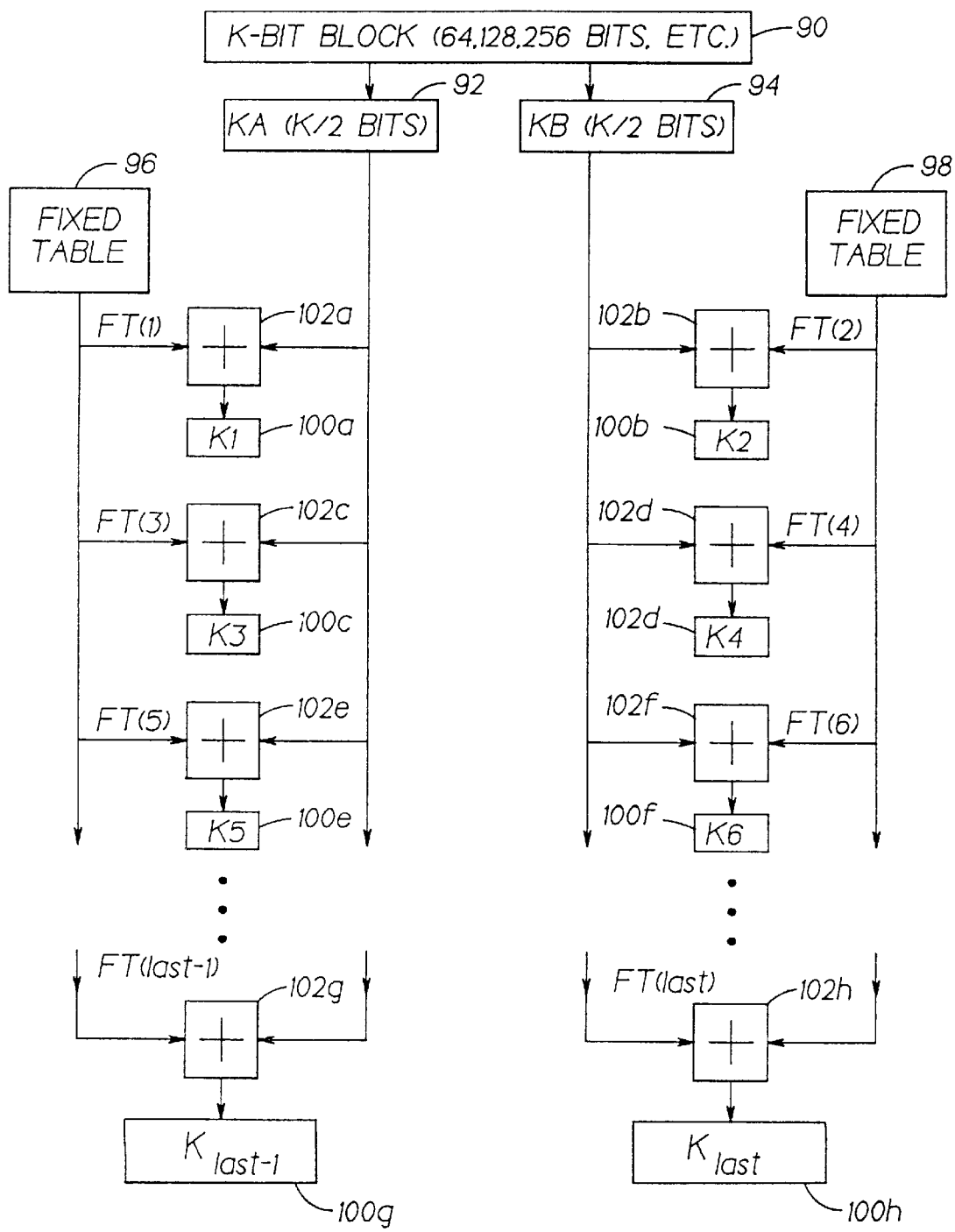
FIG. 5 is an algorithmic flow chart of a method for subkey generation for block ciphers using data-dependent rotation in accordance with the present invention.
Figure 6:
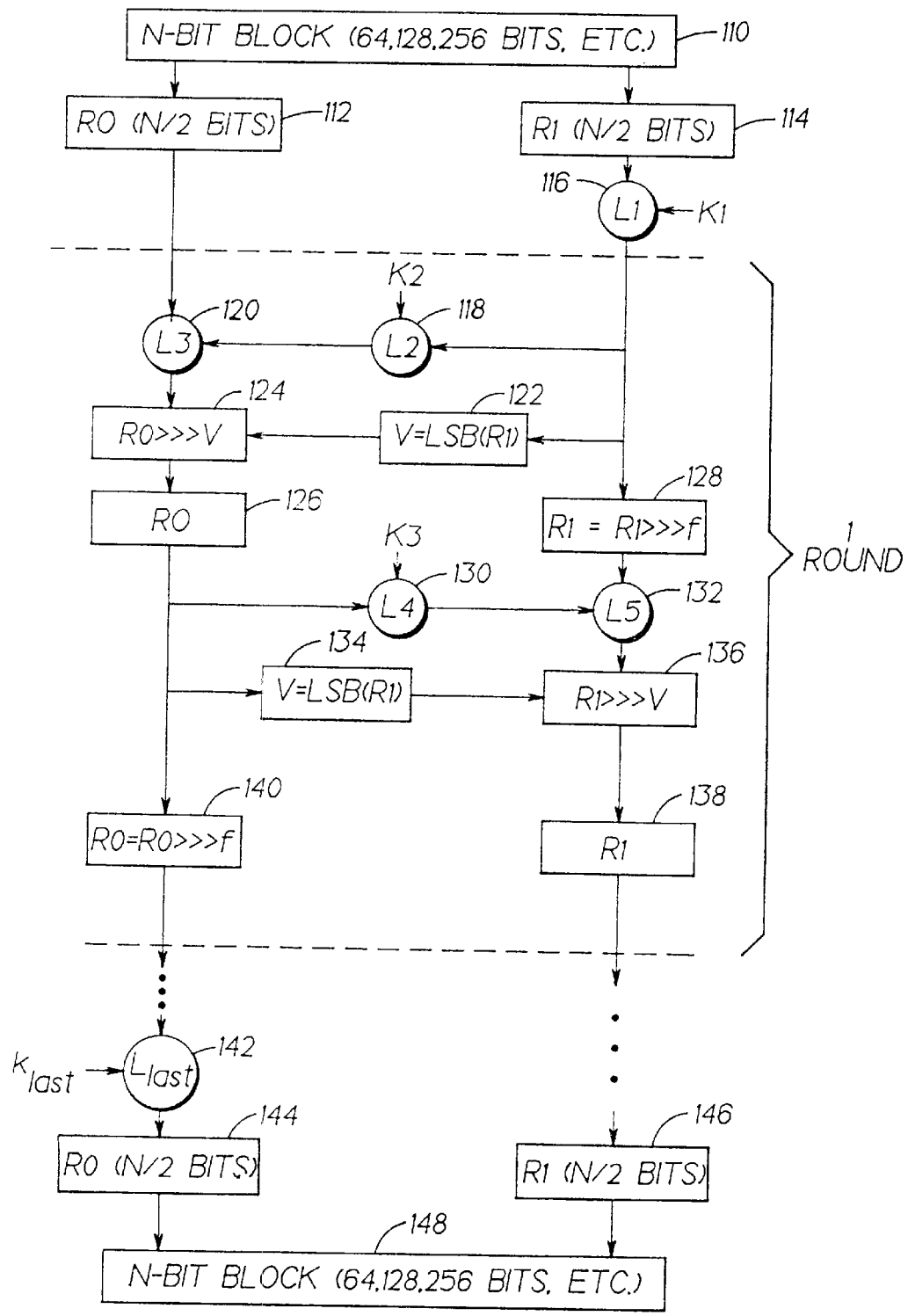
FIG. 6 is an algorithmic flow chart of an encryption method using data-dependent rotation in accordance with an alternate embodiment of the present invention.

Referring to FIG. 5, an algorithmic flow chart is shown which demonstrates this novel simple and secure linear method which calculates the subkeys for each round of the block cipher using data-dependent rotation in its operative rounds shown in FIG. 3 or FIG. 6. Since this subkey generation method is well suited for block cipher using data-dependent rotation (as in FIGS. 3 and 6), it is for the same reasons well suited for subkey generation in RC5 (as it is also a block cipher using data-dependent rotation).

A fixed key size of k bits (block 90) which may be a function of an input key is defined. An input key is ordered bits determined by a user or system, which are typically secret, i.e. non-public, which are input to a cipher and are in general to influence the behavior of the cipher. An input key may be of variable length, and sometimes it is necessary to compress, or condense or even to expand an input key prior to use by a cipher. Such compression of a large input key into a cipher key used by the cipher can be particularly helpful when the input key bits may not be entirely random and may be auto-correlated. A cipher key is ordered bits, often called key bits, which are a transformed input key, using any particular transformation which may be specified by a cipher. The key is usually of fixed length or a fixed number of bits, but may be of variable length. But in any case, this key expansion method starts with key bits, and does not restrict any operations which may convert key input bits to key bits. It divides the key bits up into y registers, where y most often equals two, and assigns k/y bits into each of the key segments, e.g., KA (block 92) and KB (block 94). Using this linear key expansion method, there are successive rounds in which each of the subkeys is the sum of one of the key segments and of a round and segment dependent predetermined value typically from a fixed table ("fixed table"), shown as blocks 96 and 98.

It will be noted that as there are in this example two key segments and two primary round segments in the block cipher, when the subkeys are used in the block cipher, those subkeys reflecting the value of KA have a direct effect on the right primary round segment R1 calculated in various rounds, and subkeys reflecting the value of KB have a direct effect on the left primary round segment R0 calculated in various rounds. Due to linear mixing of cipher data in the block cipher (the property of cumulative linear combination), both key segments KA and KB also have indirect effects on the primary round segments of R0 and R1.

If there are y key segments, sorting the fixed table or predetermined values into y sets of values permits each set to contain only those fixed table or predetermined values which are combined with a given key segment. For example, if y=2, sort the fixed table values into two distinct sets, one of which is those fixed table values which are combined with key segment KA to produce subkey values, and the other which is those fixed table values which are combined with key segment KB to produce subkey values. In general, it is preferred to require a few minimal guidelines to ensure the security of this method. The y sets of values of the fixed table should be checked to assure that the fixed table values in each set are not all the same.

Varying the fixed table values ensures that, when using the approach shown in FIG. 5, there is an adequate number of distinct or different values in the resulting subkey values. By contrast, if for example all subkey values were equal to, in hexadecimal, 0123456789abcdef, potentially every round of the block cipher might act the same given identical round inputs. This would indicate a weak subkey schedule. In this example with inadequate variation, there is only one distinct subkey value of 64-bits, and all subkeys are equal to that value. Accordingly, it may be preferred to design the key expansion system in such a manner and with a list of predetermined values which contain many distinct values or which are otherwise selected such that for randomly provided keys (and for randomly provided key inputs) there is a 99 percent chance or better that a minimal standard is achieved in which the key expansion system produces a list of at least 10 subkeys in total which are used in the operative rounds of the block cipher, where such resulting subkeys are not all the same value, and if fact there are at least 5 distinct, i.e. different, subkey values in that list of subkeys (where such subkey values are as small as 16 bits and as large as 64 bits). The key expansion system shown in FIG. 5 achieves this minimal standard 100 percent of the time given at least 5 distinct predetermined values in the fixed table; virtually all other secure key expansion methods used by other block ciphers also achieve this minimal standard; other ways of achieving this minimal standard may be apparent to one of ordinary skill in the art.

If the number of primary segments which provide n-bit round output, where there are x such primary round segments, and the number of key segments, where there are y key segments, are the same (e.g., there are 2 of each), then it is useful to compute the difference of each fixed table value in each set from the prior fixed table value in the same set. These differences between specific set members form new sets of fixed table difference values.

If there is one linear operator which combined the key segments and fixed table values to produce subkeys and if that operator is addition, then any differences computed from a set of fixed table values should ideally be based on subtracting each fixed table value from its prior value. By contrast, if there is one linear operator which combined the key segments and fixed table values to produce subkeys and if that operator is xor, then ideally any differences computed from a set of fixed table values should be based on xoring each fixed table value and its prior value. If no such prior value exists, the difference value should be excluded from the appropriate set of difference values.

By way of example, if x=y, when each set of difference values is evaluated individually not all the values of that set should have identical values. This avoids concerns when simple relationships between successive values where a given input key {KA,KB} may produce identical subkeys as another key {KA',KB'} where the identical subkeys produced by the two keys are in different rounds. For example, the subkeys in round i produced by {KA,KB} may be identical to the subkeys in round i+k produced by {KA', KB'}. In such a case, it is generally possible for a related key attack on the block cipher to succeed.

This method does not require the number of cipher data registers which form the block ("x") to equal the number of key segments ("y"). It is not required that they be added together or even that the values be stored in fixed tables. It is also not required that the key segments and predetermined values are always combined using the same round operator, or that they are combined using a linear operator.

This method requires generally the combination of particular key segments and predetermined values using generally any mathematical operations capable of being carried out in a microprocessor in order to produce subkey values, where the predetermined values are typically stored in fixed table values. The combination of segments and values may for example occur using subtraction or xor in various rounds applied to various segments to calculate the subkey values. This combination of key segments and predetermined values to produce subkey values using various linear operators may be preferred to a combination using various operators for which the number of bits of the two inputs of the operator are unequal (e.g., variable rotation). As shown in FIG. 5, it may be preferred to use just one linear combination operator, rather than using various round-and-segment dependent operators. Further, it may be preferred, in some circumstances, that the linear operator which combines the key segments and fixed table values is non-commutative with the linear operator in the block cipher which combines round segments with the subkeys. Still further, it may be preferred that such a linear combination operator which provides subkeys under this method provides all the subkeys used by the block cipher for which the subkeys are generated. In accordance with this method, the above specific method subkeys, may in general be expressed as the output of an operator having two inputs, where one such input is a key segment and the other input is a predetermined value. Defined mathematically, this arrangement is one in which one input is a key-dependent segment, and another input is a predetermined value or constant value. Hence, it is not strictly necessary for the subkey value to be a combination using some operator applied to a key segment and a predetermined value. Rather, using this method, it is acceptable if the new subkey value is affected by a combination, using some operator, of some other previously calculated subkey and a new predetermined value, as long the value of the previously calculated subkey is key-dependent. This method then, produces a new subkey value affected by an operator output, where such operator has two inputs, one input is a key-dependent segment and the other operator is a new predetermined value. Accordingly, it may be preferred that the new predetermined value does not affect a previously calculated subkey value on which the new subkey value depends. Further, it may be preferred that each such operator has two inputs with an equal number of bits, and that such operators are linear.

The general formula in the preceding paragraph gives a general summary of this iterative key expansion method for block ciphers with data-dependent rotations which generates the subkeys as follows: a) take key dependent segments (where most of the bits are variable and depend on the key bits), b) linearly combine them with predetermined segments, c) use the resulting linearly combined segments as near-to-final segments, in that either preferably the linearly combined segments are the final subkey segments, or else alternatively the final subkey segments are affected by the linearly combined segments (and preferably would be affected directly). And, note that this general summary of the method requires minimization of the total number of mathematical operations as detailed below.

The number of bits of output of operators and the number of bits of subkeys generated from the k-bit key, is approximately one bit of mathematical operator output per bit of subkeys generated (e.g., such as the one linear combination operation per subkey generated in FIG. 5). A minimal number of mathematical operations, including any operations to convert the input key to the k-bit key is desired. The ratio of bits of mathematical operation output to bits of subkeys generated is generally less than 2 to 1 and is preferably a ratio close to 1 to 1, to provide simple, fast, and secure subkey generation. A maximum ratio of 3.5 to 1 is contemplated by the present invention, whereby higher ratios are not believed to provide the advantages of the present invention. These ratios of mathematical operation bits to subkey bits, excludes from the numerator those operations such as loading or storing a value to or from memory which are not mathematical operations. Of course, mathematical operations are such operations as linear operations, bit-wise "and" and "or" operations, and bit-wise rotations. The method is a significant improvement over the prior art due to its sparseness and limited number of operations, and the fact that such a simple and fast method would not ordinarily be secure when implemented for a block cipher which does not use data-dependent rotations as part of its operative rounds.

It should be noted that the erroneous belief that it is necessary to have subkey schedules using maximum avalanche and nonlinear interaction generally results in key expansion methods with a ratio of mathematical operation output bits to subkey bits of greater than 4 to 1. The key expansion method of RC5 seems to have a ratio of roughly 9 to 1. Some of these operations are linear and some nonlinear. By contrast, the key expansion method described herein for block ciphers using data-dependent rotation in its iterative rounds is able to provide fast secure key expansion and has a ratio as low as 1 to 1, using predominantly linear operators.

The innovative aspect of the key expansion method described herein is the surprising result that using the combination of: a) a simple generally linear subkey generation method, and b) a block cipher using data-dependent rotation of round segments, it is possible to produce secure subkey segments from a key in spite of very low ratios of operation output bits to subkey bits.

As mentioned above, this method does not assume use of any particular method to convert key input bits to key segments. Such conversion may involve either expansion or compression of the key input values. Such conversion may for example accept variable size key inputs. Once such key inputs are converted into the appropriate size key block by whatever method, then this key expansion method as specified above divides the key data up into y segments and expands the key segments into subkeys using predetermined values which typically are from a fixed table.

Finally, it is preferred that there is no simple linear or affine or other non-random statistical relationship between the bits of the predetermined values or fixed table, and that the such bits have roughly equal probabilities, i.e., are unbiased.

The flow chart of FIG. 5 is the equivalent of the subkey equations below. These equations may provide the values of all subkeys used in the main embodiment from key segments KA and KB. Such subkeys identified below as Subkey[i] or Subkey[i+1], are generally in the equations of the block cipher which uses such subkeys identified as Key[i] or Key[i+1]. The equations use an index value i, where i is incremented by x (i.e., by 2) between each iteration or round, similar to the other equations previously discussed:

| | |
|---|---|
| Subkey[i] = (Fixed_table[i] + KA) | Eq. 12 |
| Subkey[i+1] = (Fixed_table[i+1] + KB) | Eq. 13 |

This method requires only 1 mathematical operation per subkey, and should be over three times as fast as most key expansion methods in generating subkeys. Assuming that subkeys are not precalculated and stored in cache for packet encryption, typical subkey expansion may require 30 percent or more of the time required to encrypt a standard packet of 48 bytes. This method for key-expansion may increase the combined speed of key-expansion and encryption for each 48-byte packet by roughly 20 percent.

As to what varied source of numbers should be used in the fixed table, there are many possibilities. It might be preferred to use well known, trusted random numbers to load the fixed table, such as from the RAND tables which contain a million random numbers which were published in 1955. Or perhaps using the value of pi (3.14159, etc.). Alternatively, it might be preferred to fill the fixed table with optimized values, which should minimize the chance of any differentially weak subkeys.

Sixth, the embodiment of FIG. 3 shows the segments xored with subkey values after they are rotated by a fixed amount. There are many other places in the block cipher where modification by subkey values could have taken place. It is believed that the exact placement of the subkey segments in the algorithm is not critical to the security of the block cipher. For example, instead of the placement of the subkeys as shown in FIG. 3, a different approach may be adopted, as described in the following encryption equations,

| | |
|---|---|
| R0= R0 xor Key[i] | Eq. 14 |
| R0= (R0 + (R1>>>F))>>>LSB(R1) | Eq. 15 |
| R1= R1 xor Key[i+1] | Eq. 16 |
| R1= (R1 + (R0>>>F))>>>LSB(R0) | Eq. 17 |

In accordance with the preferred embodiment, the main reason subkey value is combined with an intermediate one-to-one round segment rather than with a primary round segment directly is not to increase the security of the block cipher, but rather to accommodate the pipelining of modern microprocessors. There can be a delay in microprocessors between obtaining the lsb of a register and using it to affect a nonlinear activity. Extracting a subkey from a list and combining it linearly with a round segment are useful steps to take while waiting for a nonlinear result from a microprocessor.

Seventh, there are alternative places in this general method in which to locate the fixed rotation. And, the following example is not intended to limit the placement, or the use of predetermined bit-moving operators in the block cipher.

Referring to FIG. 6, another embodiment of the cryptographic system and method in which there is a different placement of the active, effective fixed rotation is shown. A block 110 of plaintext input of n bits is divided up into two equal size primary round segments or half blocks of n/2 bits, R0 (block 112) and R1 (block 114). Prior to beginning the iterative process, this alternative embodiment linearly combines (block 116) using the operator L1 the right segment R1 with the first subkey segment K1. Next, the first of a plurality of rounds of encryption (preferably in excess of 8 rounds) are performed. Each round of encryption computes new values of the primary segments R0 and R1. Each computation of the two primary segments in each encryption round is similar in form, even though it has different inputs and outputs, uses different subkeys, and uses different registers.

Both R0 and R1 are primary segments, and are also one-to-one round segments. Except for the small sections of bits which determines the data-dependent rotation, all variable segments in each round of this alternative embodiment are one-to-one round segments.

To compute the primary round segments R0 and R1 in the first half round, the following procedure is used. First, combine (block 118) linearly using the operator L2 the register R1 with the subkey K2 to produce an intermediate segment value. Combine (block 120) linearly using operator L3 that intermediate segment with R0 producing a replacement value of primary segment R0. Then, extract (block 122) a value V from R1 by taking f of the lsb bits of register R1. Rotate (block 124) the replacement value of R0 by the value V just extracted. This resulting value of R0 after the rotation is the new value of R0 (block 126). Then rotate (block 128) the value of R1 rightward by f bits. The resulting value of R1 is the new value of R1. Then repeat this process to compute the second half round, but where the roles of R0 and R1 are switched, and where the subkey segment used is K3.

To compute the primary round segments R0 and R1 in the second half round, the following procedure is used. First, linearly combine (block 130) using the operator L4 the primary segment R0 with the subkey K3 to produce an intermediate round segment. Linearly combine (block 132) using the operator L5 that intermediate segment and RI producing a replacement value of R1. Then, extract (block 134) a value V from R0 by taking f of the lsb bits of register R0. Rotate (block 136) the replacement value of R1 by the value V just extracted. This resulting value of R1 after said rotation is the new value of R1 (block 138). Then rotate (block 140) the value of R0 rightward by f bits. The resulting value of R0 is the new value of R0.

Each such round in which new one-to-one round segments for R0 and R1 are computed is only part of the process. Many rounds are necessary depending on block size and the users desire for security, but this number of rounds is typically between 8 and 64 rounds, with at least 5 of such rounds incorporating the described process, and such rounds are herein called qualified operative rounds; some users may select a larger number of rounds, such as 128 rounds. Indeed, there is no true upper limit to the number of rounds which can be employed, with the tradeoff being that more rounds reduce the speed of calculation.

After completion of the last round, the systems adds (combines) (block 142) the left segment R0 with the last subkey value, Klast. The ciphertext value for segments R0 (block 144) and R1 (block 146) are complete, and are then transferred as ciphertext consisting of n bits, i.e., a n-bit cipher output (block 148).

For simplicity, the equations related to FIG. 6 below which represent this alternative embodiment assume linear combination functions in which one-to-one segments are combined together in cumulative linear combination using the operator of addition in the modulus of the segment, and that the subkey combination function uses xor. As stated previously, there are other acceptable linear operators which can perform these functions.

The equations which represent the alternative embodiment shown in FIG. 6 are,

| | |
|---|---|
| R0= (R0 + (R1 xor Key[i]))>>>LSB(R1) | Eq. 18 |
| R1= R1>>>F | Eq. 19 |
| R1= (R1 + (R0 xor Key[i+1]))>>>LSB(R0) | Eq. 20 |
| R0= R0>>>F | Eq. 21 |

The equations which represent the inverse (i.e., decryption) of FIG. 6 are,

| | |
|---|---|
| R0= R0<<<F | Eq. 22 |
| R1= (R1<<<LSB(R0)) − (R0 xor Key[i+1]) | Eq. 23 |
| R1= R1<<<F | Eq. 24 |
| R0= (R0<<<LSB(R1)) − (R1 xor key[i]) | Eq. 25 |

As in the preferred embodiment, this alternate embodiment also has the properties of: (1) bit expansion of a small section, (2) adjustment by a full sized subkey, (3) cumulative linear combination, and (4) non-commutative one-to-one round segment interactions.

The fixed rotation provides a significant number of good bits, e.g., 2f good bits, and that number of good bits is roughly equal to the number of input bits which control the nonlinear activities in each round (2f). The block cipher has the property of new small section data in successive rounds.

Eighth a highly secure block cipher for bulk encryption of large files using s-boxes is presented.

Unlike encryption using data-dependent rotation which extracts f bits from the lsb of each register in order to affect the degree of rotation, this variation and method of encryption extracts g bits from a preselected location such as the lsb of each segment as input into a nonlinear s-box. Unlike encryption using data-dependent rotation, therefore, in this method the number of bits which control the non-linear process is g bits. Further, it may be preferred when using this method to select a number of bits of fixed rotation equal to g bits.

Figure 7:
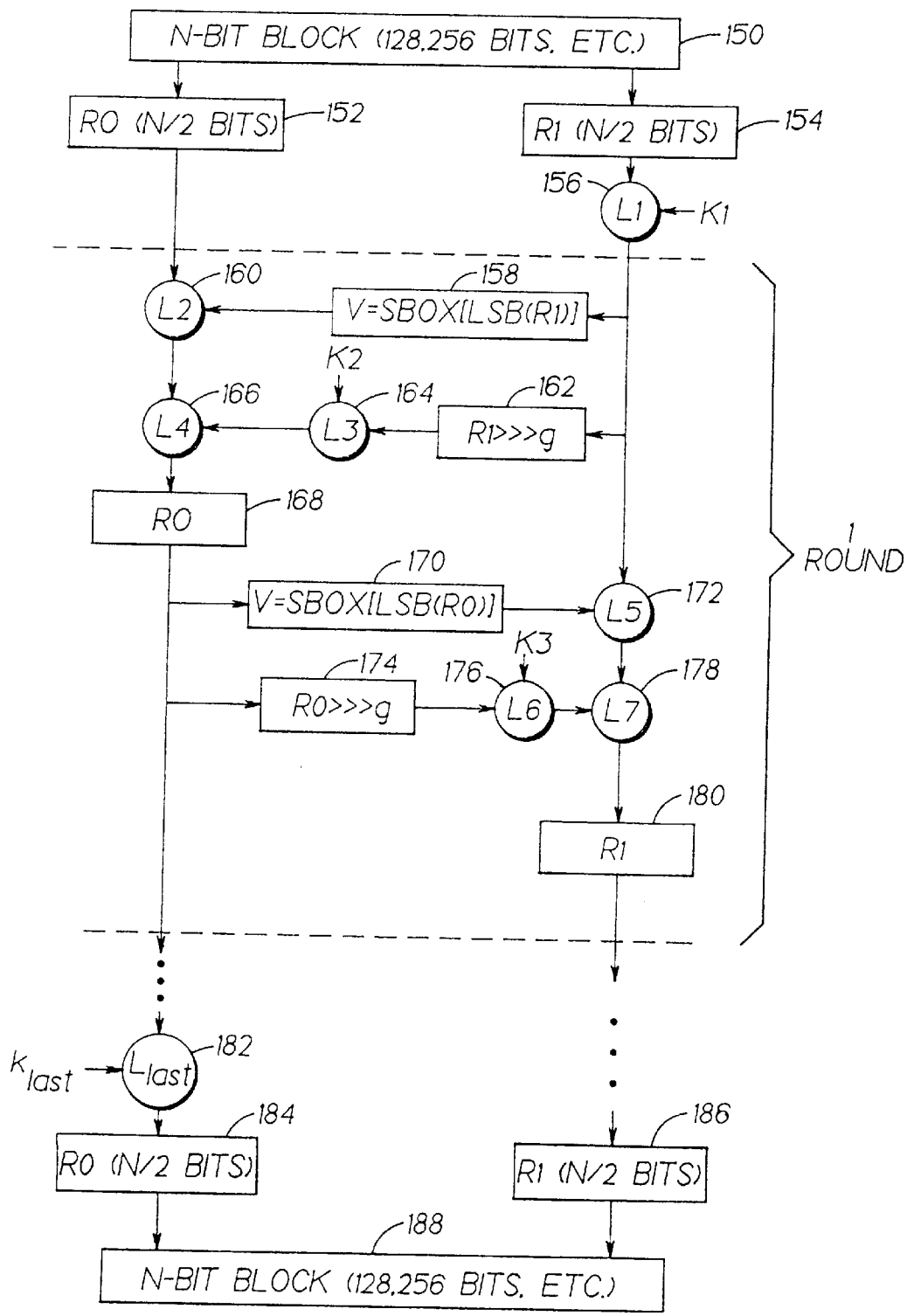
FIG. 7 is an algorithmic flow chart of an encryption method using an s-box in accordance with another alternate embodiment of the present invention.

Referring to FIG. 7, an algorithmic flow chart for one round of the cryptographic system and method using s-boxes is generally shown. An initial block 150 of n input bits is plaintext input. Each plaintext input block 150 is divided up into two one-to-one primary round segments 152 and 154, i.e., block halves, each of which contain n/2 bits. For example, a 128-bit version of the cryptographic system divides up its input into two 64-bit one-to-one round segments, R0 (block 152) and R1 (block 154) respectively.

Both R0 and R1 are primary segments, and are also one-to-one round segments. In fact, except for the small sections of bits which are s-box input, the round segments of s-box output, all variable segments in each round of this embodiment are one-to-one round segments.

Prior to beginning the iterative process, the method shown in FIG. 7 takes the right primary round segment R1 and linearly combines (block 156) it using operator L1 with a subkey segment K1. Next, the first of a plurality of rounds of encryption (preferably equal to or exceeding 5 rounds) are performed. Each round of encryption computes new values of the one-to-one primary round segments R0 and R1. Each computation of the two primary segments is similar in form, even though it has different inputs and outputs and uses different registers.

To compute the first half round, i.e., to compute the primary round segment R0, the following procedure is used. Extract (block 158) the least significant g bits of R1. Use these as input into the s-box lookup table. Assign the value of the s-box output to register V. Linearly combine (block 160) using operator L2 segment R0 with segment V to produce a replacement primary round segment R0. Then compute an intermediate one-to-one segment by rotating (block 162) the register R1 rightward by g bits. Linearly combine (block 164) using operator L3 this intermediate segment with K2 to form a new intermediate segment. Then linearly combine (block 166) using operator L4 this new intermediate segment with R0 (where R0 now reflects segment V). The result is the new value of primary segment R0 (block 168).

Then repeat this process to compute the second half round, but where the roles of R0 and R1 are switched, and where the subkey segment used is K3. To compute the second half round, i.e., to compute a replacement primary round segment R1, the following procedure is used. Extract (block 170) the least significant g bits of R0. Use these as input into the s-box lookup table. Assign the value of the s-box output to register V. Linearly combine (block 172) using operator L5 primary segment R1 with value V to produce a replacement round segment R1. Then compute an intermediate one-to-one segment by rotating (block 174) the register R0 rightward by g bits. Linearly combine (block 176) using operator L6 this intermediate segment with K3 to form a new one-to-one intermediate segment. Then linearly combine (block 178) using the operator L7 this new intermediate segment with R1 (where R1 now reflects the segment V). The result is the new value of primary segment R1 (block 180).

Each such round in which new primary round segments R0 and R1 are computed is only part of the process. Many rounds may be necessary depending on block size and the users desire for security, but this number of rounds is typically between 8 and 64 rounds, with at least 5 of such rounds incorporating the described process, and such rounds are herein called qualified operative rounds; some users may select a larger number of rounds, such as 128 rounds. Indeed, there is no true upper limit to the number of rounds which can be employed, with the tradeoff being that more rounds reduce the speed of calculation.

After completion of the last round, this alternative embodiment linearly combines (block 182) the left one-to-one round segment R0 with the last subkey segment, Klast. Then the ciphertext value for segments R0 (block 184) and R1 (block 186) are complete and are transferred as ciphertext consisting of n bits, i.e., a n-bit cipher output (block 188).

To ensure secure encryption, it is preferred that the operators which linearly combine the one-to-one round segments with each other should in general be non-commutative with the operators which combine the s-box output with one-to-one round segments. The following equations are a practical implementation of this approach and they use the algebraic group of addition to linearly combine one-to-one round segments with each other, and xor to linearly combine s-box output with one-to-one round segments,

| | |
|---|---|
| R0= (R0 xor s-box[lsb(R1)]) + (R1>>>g) xor Key[i] | Eq. 26 |
| R1= (R1 xor s-box[lsb(R0)]) + (R0>>>g) xor Key[i+1] | Eq. 27 |

Again, decryption is the inverse of encryption. All the same steps are repeated but in reverse order. Decryption uses ciphertext output as input and recovers the values of the plaintext inputs. As in the preferred embodiment, this alternate embodiment using an s-box also has the properties of: (1) bit expansion of a small section, (2) adjustment by a full sized key, (3) cumulative linear combination, and (4) non-commutative one-to-one round segment interactions.

Even though this method uses no data-dependent rotations, the calculation of the number of good bits determined from the encryption or decryption equations is still a useful means of testing whether fixed rotation is active and effective. There are numerous good bits (i.e., 4g in total) which exceed the 2g of input bits used by the s-boxes each round. This is consistent with the use of active and effective fixed rotation in the block cipher, and this s-box variation of the block cipher has a sufficient number of good bits.

Variations of this cipher exist that are believed to be weaker than those variations shown as the preferred variations where potentially: (1) an sbox output determined by some bits of one block half is combined with that block half linearly prior to linear combination with the other half, and (2) logical shift instructions may be used instead of rotate instructions.

The following set of equations demonstrates a round as an example of potentially weak variation #1:

| | |
|---|---|
| R0=R0+ (s-box[lsb(R1+key[i])] xor R1) | Eq. 28 |
| R1=R1+ (s-box[lsb(R0+key[i+1])] xor R0) | Eq. 29 |

The following set of equations demonstrates a round as an example of potentially weak variation #2:

| | |
|---|---|
| R0=(s-box[lsb(R0+key[i])] xor (R0 shifted by 8 bits))+R1 | Eq. 30 |
| R1=(s-box[lsb(R1+key[i+1])] xor (R1 shifted by 8 bits))+R0 | Eq. 31 |

Note first of all that the above equations show an example in which fixed logical shift operations may be used as a bit-moving operation in a manner similar to fixed rotation operations, as they are fundamentally similar operations, as would be appreciated by those with ordinary skill in the art.

Note additionally that these alternative encryption equations are similar to the preferred embodiments in certain ways. Stated in general, this present invention when using sbox lookups is one which is a block cipher which recalculates the value of each primary round segment as a generally linear combination of itself, which we may call the prior round segment value, the value of another round segment, which may be called the other round segment, and an sbox value. This statement makes no restrictions on the order of linear operations, or which generally linear operations are performed, or any restrictions on what additional operations including nonlinear operations are performed.

Most variations of this cipher using sboxes illustrate this general structure in which values of each primary round segment are modified with indirect or direct linear combinations of three values: (1) a round segment which is generally 64 bits or more and contains at least 50 variable bits (over 75 percent of the bits) which are from or are derived from a 1:1 PLT of the prior round segment value, (2) another round segment which is generally 64 bits or more and contains at least 50 variable bits (over 75 percent) which are from or are derived from a 1:1 PLT of the other round segment value, (3) the sbox output or a 1:1 PLT of it or derived from a 1:1 PLT of it, which is dependent on data from the n-bit cipher data block, and the sbox output generally contains 64 bits or more. Note that in practice when there is a 1:1 PLT of a value such a block half, an efficient implementation generally does no extra operations and so uses an identity PLT. Of course, a 1:1 identity PLT of a round segment is simply the value of that round segment.

Incidentally, a similar general statement about the invention using data dependent rotations may be made. We can say that most variations of the block cipher using data-dependent rotations (preferably with active predetermined bit-permutation or rotation) modify each primary round segment with indirect or direct linear combination of two values: (1) a round segment where substantially all of its bits are variable bits which are from or are derived from a 1:1 PLT of the prior round segment value, (2) a round segment where at least 75 percent of its bits are variable and are from or are derived from a 1:1 PLT of the other round segment value.

Figure 8:
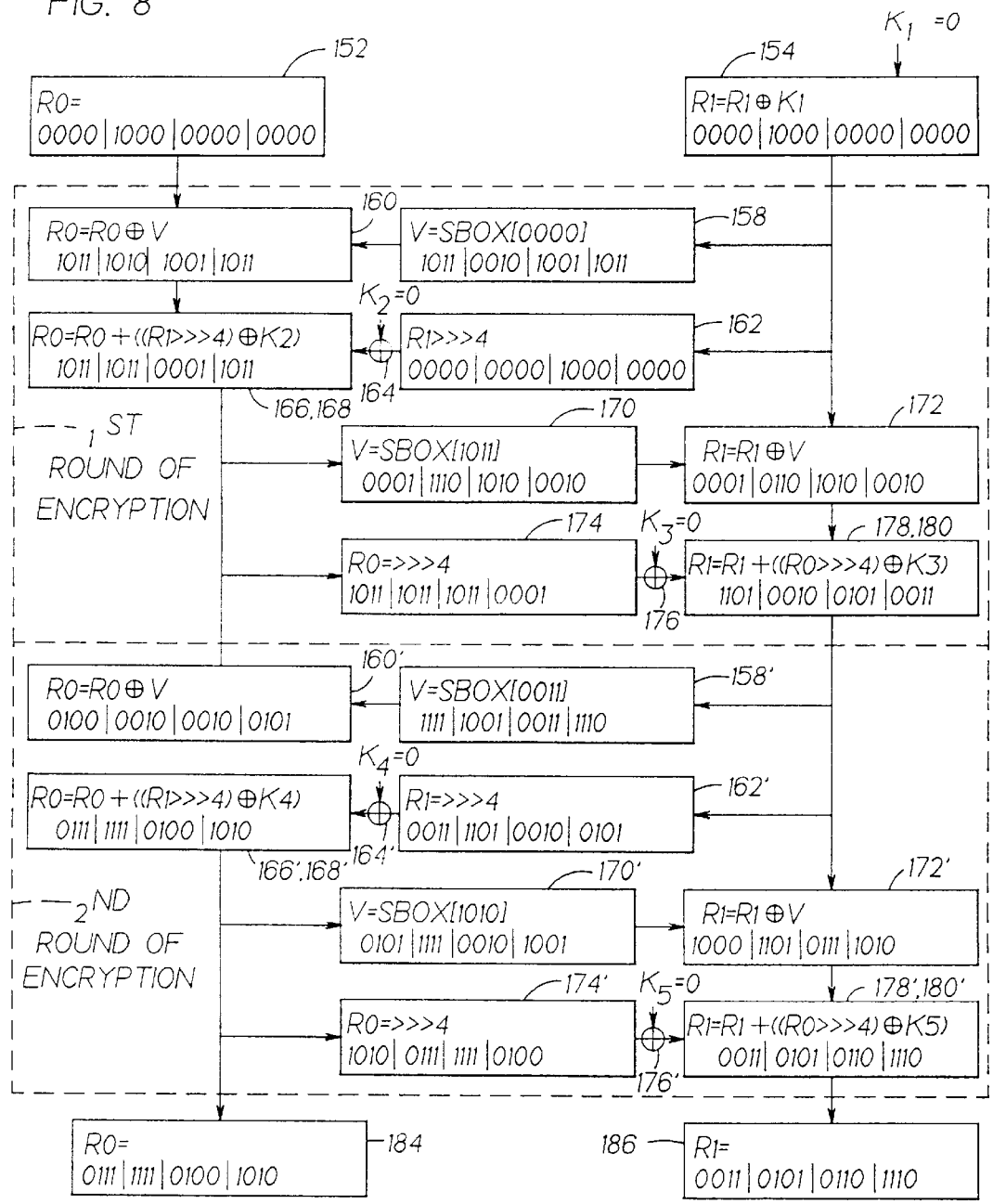
FIG. 8 is an example illustrating two rounds of the encryption method of FIG. 7.

Referring to FIG. 8 (wherein the blocks are numbered as in FIG. 7, with the numbers in the second round being designated with a prime), an example in which two rounds using an s-box is shown in which a given input passes through two rounds of the invention and is modified by it despite simple subkeys in which all values equal 0. It will be appreciated that the bits which determine s-box output in this example are not based solely on the initial lsb of the plaintext input segments. This example reflects a cryptographic system in which the s-box outputs depend on many different subkey and input values.

The s-box cipher method minimizes problems such as pipeline optimization in microprocessor chips and "address generation interlock". In particular, a certain amount of time is required between loading a pointer and using it. For example, a pointer is an address in an s-box or lookup table. Hence, it is an advantage that three intermediate operations are computed between determining the input into the s-box and using the s-box output. These operations are: rotating a one-to-one round segment by a fixed number of bits, reading a subkey segment from a table, and xoring the rotated segment by the subkey value. As a result, there should be little down time in the microprocessor, and the processor is kept busy computing useful intermediate segments as it waits for the output of the s-box table.

It may be preferable when using this s-box cipher method to ensure that the sizes of the s-box input (g bits) and its fixed rotation (which may also equal g bits) are relatively prime to the segment size. In particular, it may be preferred that both are odd (as the segment size is typically even, and a power of 2). Further, it may also be preferable if the segment size divided by s-box input size g is nearly equal to an odd number, or in any case that the register size is not exactly divisible by g. For current microprocessors, a preferred block configuration might use an s-box input size of 9-bits or 11-bits, with a fixed rotation of an equal number of bits, and with a block size of either 64 bits or 128 bits.

Figure 9:
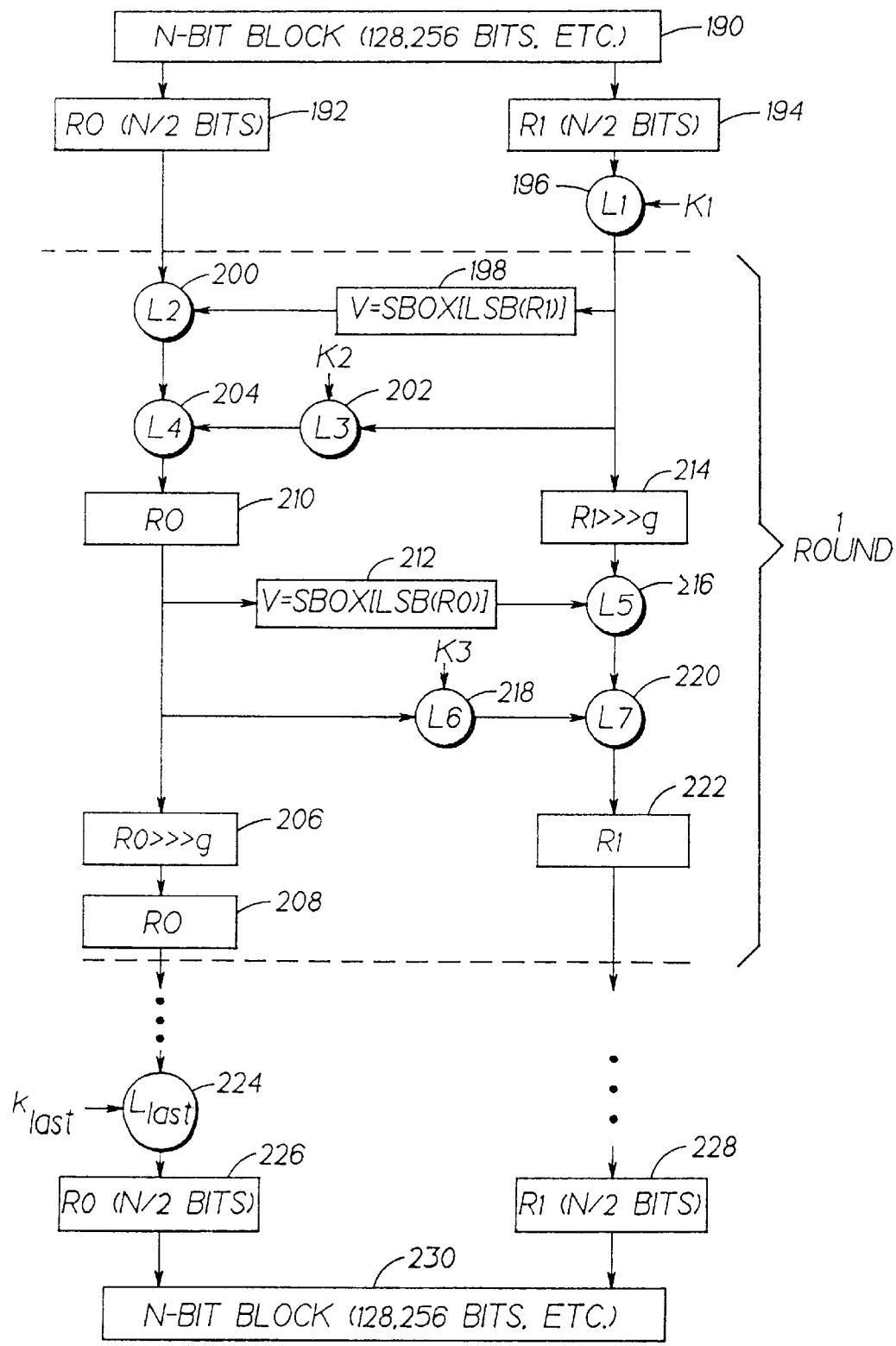
FIG. 9 is an algorithmic flow chart of an encryption method using an s-box in accordance with still another alternate embodiment of the present invention.

On the other hand, if the present method is used for a cipher computed on 8-bit processors or smart cards or economical signal processing chips, it may be preferred if the size of the s-box input (g bits) and its fixed rotation (typically g bits) equals 8 bits. The loss in potential theoretical efficiency of using values not necessarily prime to the register size may be offset by the speed and practicality of 8-bit rotations on certain processors. If such an s-box input size and rotation are adopted which are not relatively prime to the segment size, it may be preferable to use an alternative fixed rotation method as shown in FIG. 9, which is discussed hereinafter.

In most block ciphers using s-boxes, use of the same s-box to compute all nonlinear results is considered weak. For example, DES uses different s-boxes for each 6-bit input received from its half-block of input. By contrast, the present invention reuses the same s-box multiple times without risk of compromising security. To appreciate why this method of using s-boxes is secure, it is useful to analyze the calculation of each round. Each s-box output affects an entire round segment where each such round segment is ideally 64-bits or larger. This is the property of bit expansion of a small section discussed hereinbefore.

To cryptanalyze block ciphers it is generally necessary to find a way of canceling any differences in the output of an s-box with a given input difference with a high probability. Such cancellation might be easy if any s-box outputs are identical to one another, or even if the minimum total number of bit-differences between any two s-box outputs is small (or perhaps if the number of contiguous bit-differences is small). But given that the s-box output is much larger than its input, it is generally possible to optimize the s-box such that for an s-box with a 32-bit output, or even better a 64+-bit output, for all possible s-box outputs the minimum number of bit differences is roughly one quarter or more of the s-box output size.

Note further that the optimization of the sboxes used with this method is based on permutations. This method ensures that each of 8 output bytes (each of the bytes is a contiguous or consecutive section of 8 bits) provides an output change of at least 1 bit for any and all sbox input differences. This method of building the sbox, either using permutations or any sbox generation method with the same easily measurable property, wherein such that contiguous or consecutive sections of bits (of 20 bits or less) have a bit-output difference of at least 1 bit for any 1 bit input-difference, ensures the block cipher has considerable differential strength when the sbox output is 64-bits or more. Such differential strength is also increased if the sbox optimization method also guarantees a minimum number of output bit-differences for any input difference, preferably where that minimum is greater than that expected by chance (as seen in the embodiment SteelTalon with a minimum output bit difference of about 18 bits).

These sbox optimization methods which generally guarantee a minimum number of output bit-differences for all possible input differences which is better than that expected by chance, or which guarantee a minimum output difference of at least 1 bit in consecutive or contiguous sections of 20 bits or fewer, are synergistic with the structure of a block cipher in which new values of a first primary round segment are calculated based on the direct or indirect linear combination of three values: a) a first variable segment reflecting or derived solely from the value of the first primary round segment, b) a second variable segment reflecting or derived from the value of another different primary round segment, and c) an sbox value of at least 64 bits whose input is dependent on some bits from the n-bit cipher data.

Any bit-differences of any s-box outputs affect potential carry operations related to addition or subtraction by the time any round segments affected by the s-box are linearly combined with other round segments. These carry operations are data-dependent and are non-commutative with xor, which is another operator affected by the s-box output. The property of non-commutative one-to-one round segment interactions which makes this possible is generally associated with the property of cumulative linear combination of segments discussed hereinbefore.

Generally, it appears that the security of this s-box method is optimized by using two non-commutative operators to: (a) linearly combine one-to-one round segments with each other, and (b) linearly combine one-to-one round segments with s-box output. As a result of such non-commutative linear operations, the probability of any s-box canceling out is very small. Not only would certain s-box inputs be necessary for self-cancellation of s-box outputs, but also all bits modified by a carry operation would need to be canceled out. As a result, both linear and differential analysis of this method using an s-box becomes difficult.

Of course, this alternative embodiment may in general be changed in the same ways as the preferred embodiment, and in general it appears that as long as the aforementioned preferred properties of the present invention are valid, the resulting block cipher should be secure assuming a reasonable number of rounds.

Variations in this s-box alternative embodiment which in general should not affect the security adversely in a significant way includes but is not limited to: some changes in the number of bits of active fixed rotation, alternative linear combination operators, new or different key expansion methods, different key placement in the equations, and alternative placement of the fixed rotation.

Referring to FIG. 9, an algorithmic flow chart for one round of the cryptographic system and method using s-boxes in accordance with an alternate embodiment is generally shown. The system and method is similar to that shown and described with reference to FIG. 7, however the fixed rotation is relocated. An initial block 190 of n input bits is plaintext input. Each plaintext input block 190 is divided up into two one-to-one primary round segments, 192 and 194, i.e., block halves, each of which contains n/2 bits. For example, a 128-bit version of the cryptographic system divides up its input into two 64-bit one-to-one round segments, R0 (block 192) and R1 (block 194) respectively.

Both R0 and R1 are primary segments, and are also one-to-one round segments. In fact, except for the small sections of bits which are s-box input, the round segments of s-box output, all variable segments in each round of this embodiment are one-to-one round segments.

Prior to beginning the iterative process, the method shown in FIG. 9 takes the right primary round segment R1 and linearly combines (block 196) it using operator L1 with a subkey segment K1. Next, the first of a plurality of rounds of encryption (preferably equal to or exceeding 5 rounds) are performed. Each round of encryption computes new values of the one-to-one primary round segments R0 and RI. Each computation of the two primary segments is similar in form, even though it has different inputs and outputs and uses different registers.

To compute the first half round, i.e., to compute the primary round segment R0, the following procedure is used. Extract (block 198) the least significant g bits of R1. Use these as input into the s-box lookup table. Assign the value of the s-box output to register V. Linearly combine (block 200) using operator L2 segment R0 with segment V to produce a replacement primary round segment R0. Linearly combine (block 202) using operator L3 the right round segment with K2 to form a new intermediate segment. Then linearly combine (block 204) using operator L4 this new intermediate segment with R0 (where R0 now reflects segment V (block 210)). Then compute a one-to-one segment by rotating (block 214) the register R1 rightward by g bits. The result is the new value of primary segment R1 (block 214).

Then repeat this process to compute the second half round, but where the roles of R0 and R1 are switched, and where the subkey segment used is K3. To compute the second half round, i.e., to compute a replacement primary round segment R1, the following procedure is used. Extract (block 212) the least significant g bits of R0. Use these as input into the s-box lookup table. Assign the value of the s-box output to register V. Linearly combine (block 216) using operator L5 segment R1 with value V to produce a replacement round segment R1. Linearly combine (block 218) using operator L6 intermediate segment R0 with K3 to form a new one-to-one intermediate segment. Then linearly combine (block 220) using the operator L7 this new intermediate segment with R1 (where R1 now reflects the segment V). The result is the new value of primary segment R1 (block 222). Then rotate (block 206) R0 by "9" to produce a replacement value of R0.

Each such round in which new primary round segments R0 and R1 are computed is only part of the process. Many rounds may be necessary depending on block size and the users desire for security, but this number of rounds is typically between 8 and 64 rounds, with at least 5 of such rounds incorporating the described process, and such rounds are herein called qualified operative rounds; some users may select a larger number of rounds, such as 128 rounds. Indeed, there is no true upper limit to the number of rounds which can be employed, with the tradeoff being that more rounds reduce the speed of calculation.

After completion of the last round, this alternative embodiment linearly combines (block 224) the left one-to-one segment R0 with the last subkey segment, Klast. Then the ciphertext value for segments R0 (block 226) and R1 (block 228) are complete and are transferred as ciphertext consisting of n bits, i.e., a n-bit cipher output (block 230).

Figure 10:
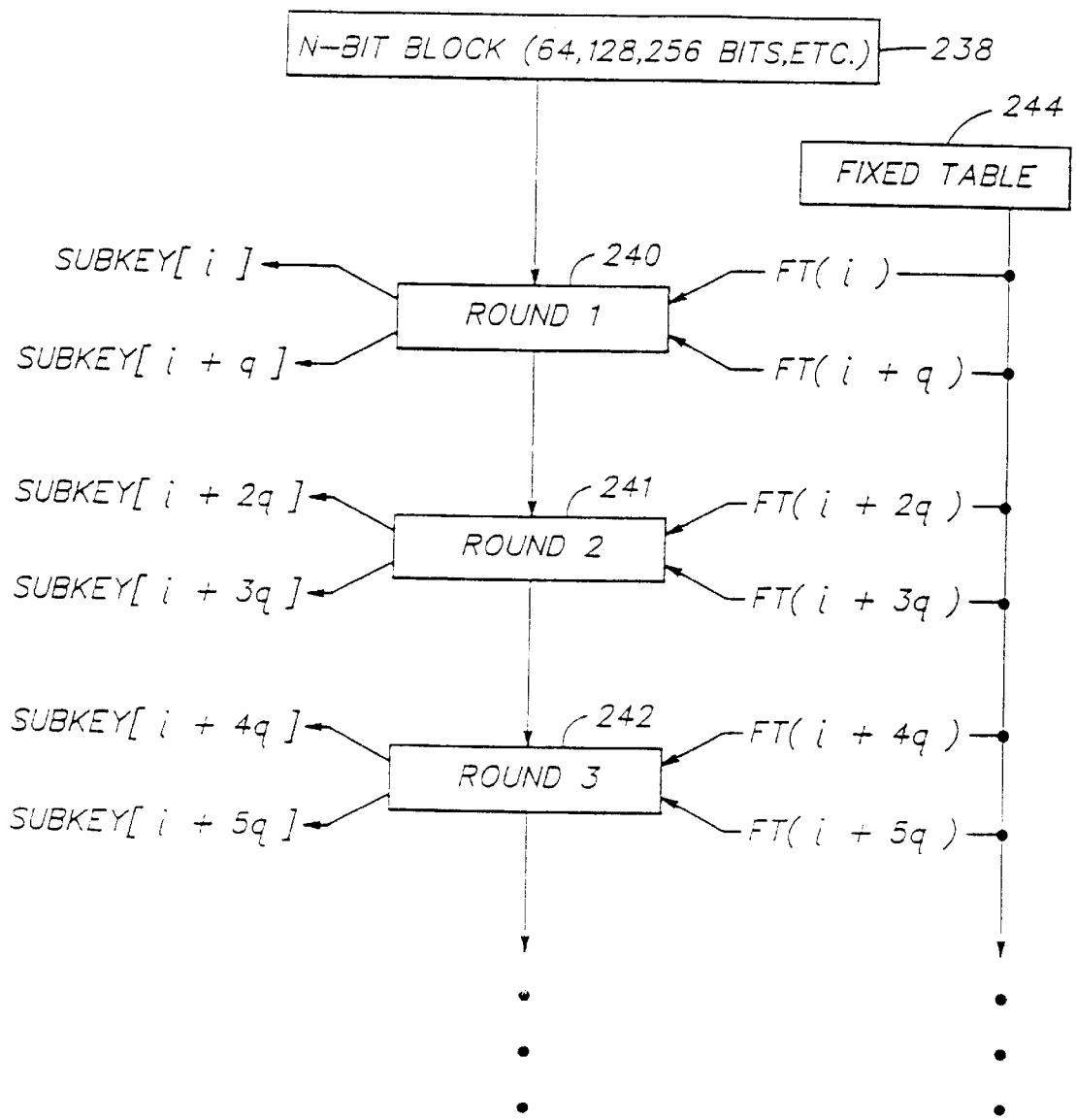
FIG. 10 is an algorithmic flow chart of a method for complex subkey generation in accordance with the present invention.
Figure 11:
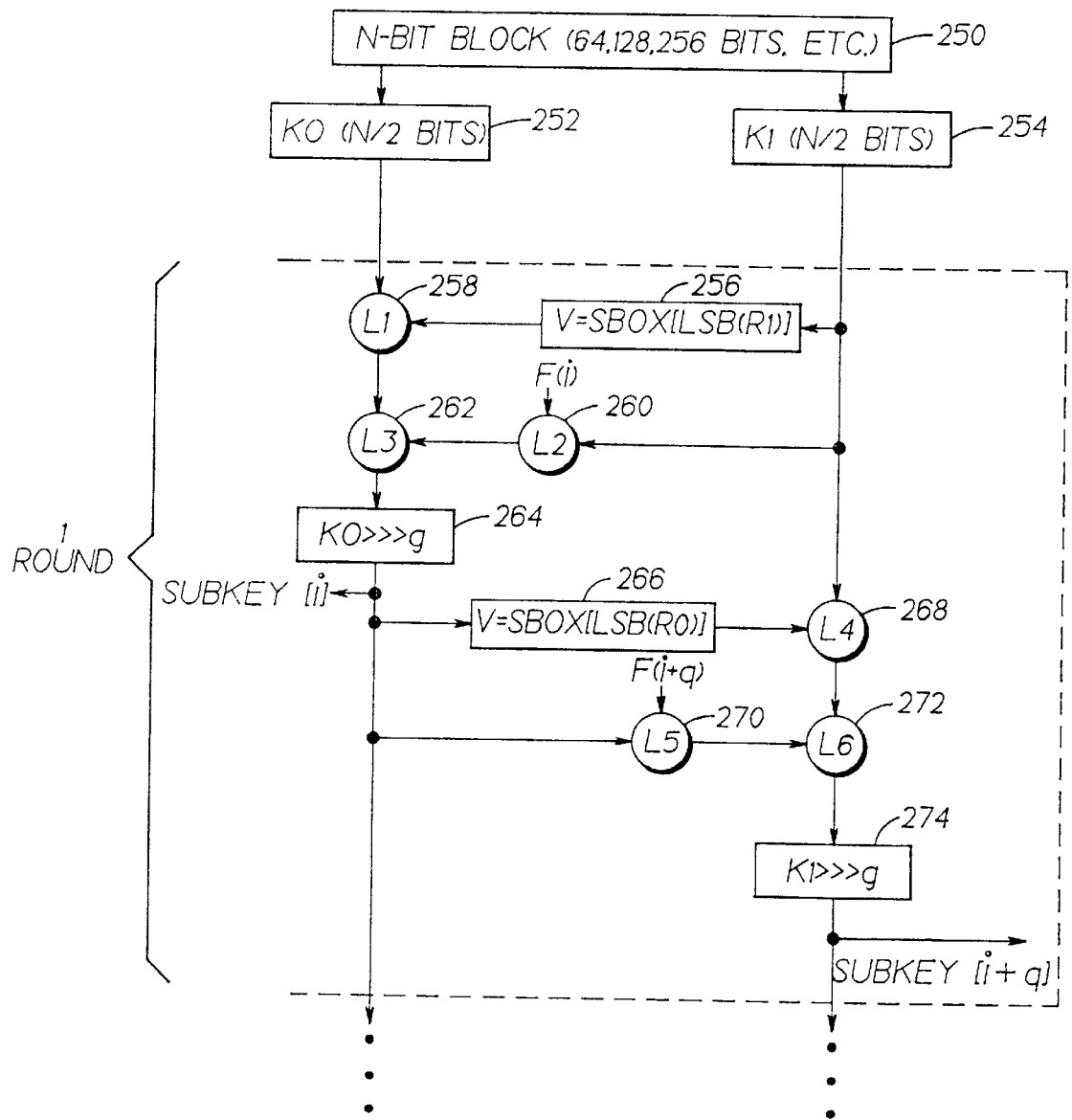
FIG. 11 is an algorithmic flow chart of a method for complex subkey generation to a generative block cipher using s-boxes in accordance with the present invention.

Referring to FIG. 10, another alternative embodiment providing a key expansion method is shown. This expansion method is applicable to all block ciphers in general. It is particularly appropriate to block ciphers for bulk encryption where attaining the quickest possible bootup time is not generally necessary.

In this method, subkeys for use in a block cipher are generated from the one-to-one round segments of various rounds 240–242 of a generative block cipher in which key segments are input into the generative block cipher as if they are plaintext input. Subkeys generated using this method are mapped one-to-one with the secret key segments, but are complex uncorrelated functions of such secret key segments. As a result, it will be futile to apply related key attacks or similar key-based analytical methods to attack a block cipher using the subkeys output from this subkey generation method.

In particular, in this method the key segments input into the generative block cipher contain n bits. The key is input into the generative block cipher as n-bit cipher input. Typically, this generative block cipher is similar in form to the block cipher which uses the subkeys produced by this key expansion method. The key expansion block cipher typically uses as input 2 segments of n/2-bits each. The key value mentioned above determines the values of these two round segments. The generative block cipher also uses known but generally random values from a fixed table 244 to modify one-to-one round segments in order to provide some necessary irregularity in each round. Such known values (e.g., respective FT[i]–[i+5q] values) affect the segments of the generative block cipher the same in general as subkeys would in a secret key block cipher. The injection of adequate irregularity into each round 240–242 makes related-key attacks impossible and makes the resulting key expansion more secure. It is preferred in calculating this key expansion that the ratio of the number of known typically random segments to the number of subkeys calculated is 1 to 1 or greater.

The fixed table of known values should be as large or larger than the table of calculated subkeys called the subkey expansion table. While the fixed table is initially loaded with constant values prior to key expansion, it may in fact be stored in the same memory space in the microprocessor as the key expansion table and may use the same variable name.

Other alternatives include: (1) using any fixed s-box tables as a fixed table of known values to inject adequate irregularity into the subkey generation process where the calculation of new subkey values may replace the known s-box table such that each new subkey is also a new s-box output segment, and (2) any such known or predetermined values which inject irregularity into the subkey generation process need not be from a fixed table, but may for example be calculated by a linear feedback shift register or other mathematical expansion method.

In each round, if the fixed table and subkey expansion table are equal in size, using a common index position to load or store any segments in either table will speed up calculation. For example, two consecutive segments may be taken from the fixed table in positions (i+(n×q) and (i+((n+1)×q). The subkey segments when calculated may be placed into the subkey expansion table at the same relative locations (i+(n×q) and (i+((n+1)×q). This use of one incremented position value to access segments in both tables speeds up the calculation. Of course, q would have to be calculated in the modulus of the size of the fixed table and subkey expansion table in order to avoid any positions being accessed which are outside of the fixed table or subkey expansion table.

The use of q as shown above is simply a constant increment which is typically chosen to ensure that after generation when the subkey segment results are accessed during block encryption using a different increment, such as 1, each successive subkey segment accessed (or each pair of subkeys) is generally uncorrelated to the previous subkey value (or to the previous pair of subkeys). If the subkey segments are read from the subkey expansion table using an increment of 1, it may be preferred if q is an integer which equals roughly plus or minus the square root of the size of the fixed table, but where q is relatively prime to the size of the fixed table.

Figure 1:
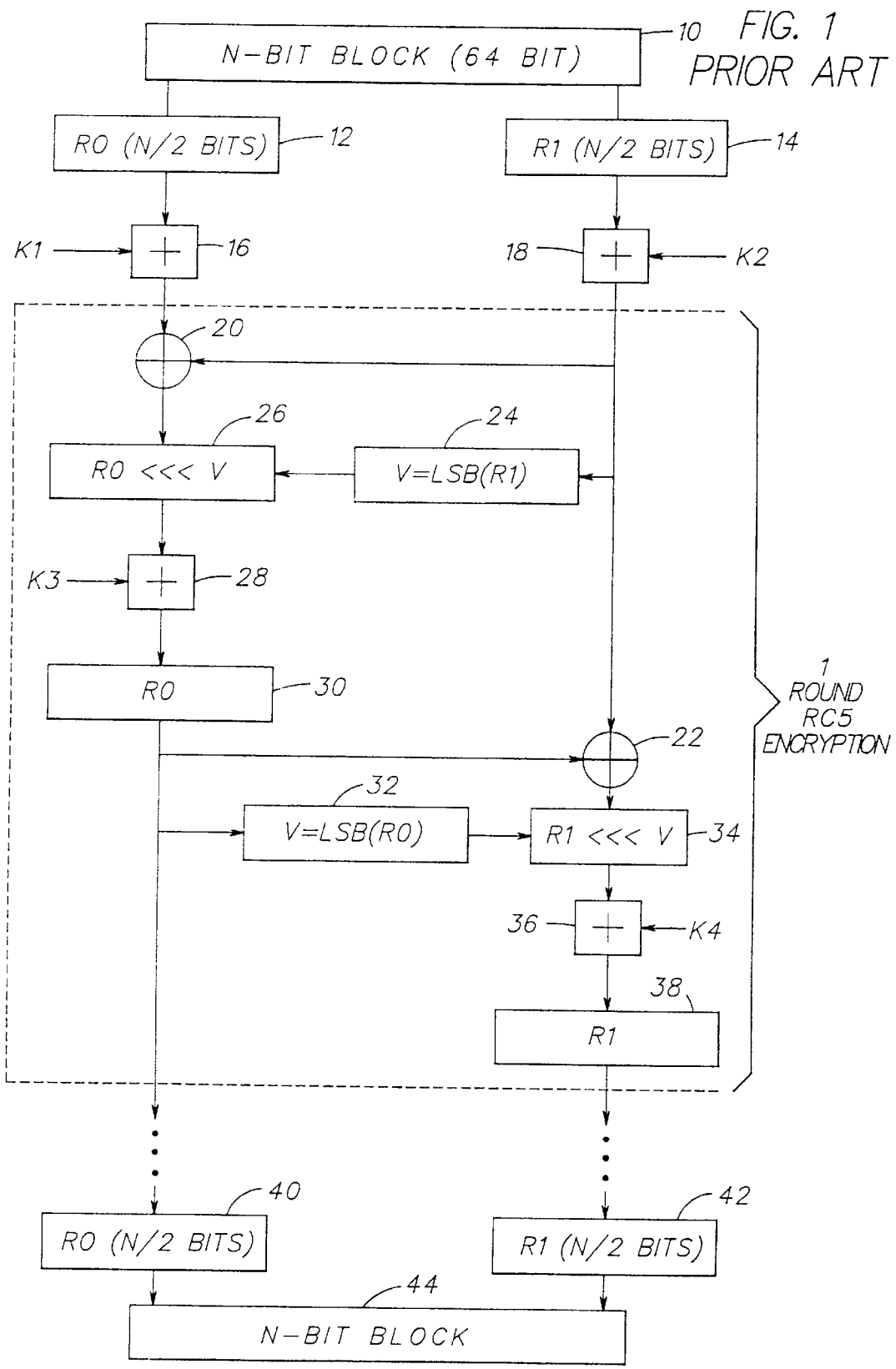
FIG. 1 is an algorithmic flow chart of RC5 encryption in accordance with the prior art.
Figure 2:
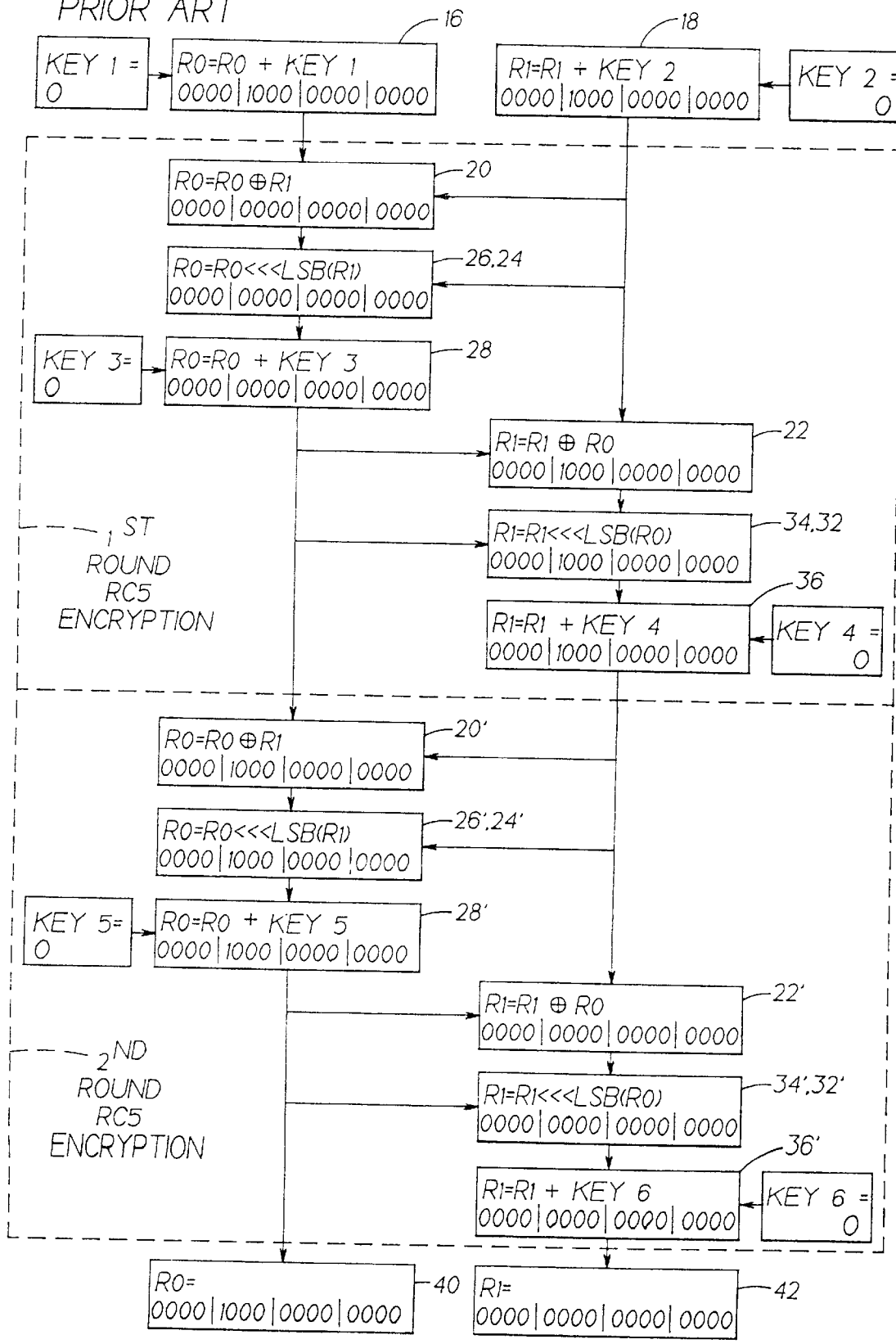
FIG. 2 is an example illustrating two rounds of RC5 encryption assuming particular plaintext input and subkey values in accordance with the prior art.

Referring to FIG. 1, an example of key expansion is shown using the method of FIG. 10 using the generative block cipher, which uses an s-box. In will be noted that each input of a fixed table value has a corresponding output subkey value which is taken from a primary round segment in the generative block cipher.

This key expansion method involves a generative block cipher with x primary segments (x=2) which generally uses x fixed table segments per round and produces x=2 subkey values per round, where over the course of a generative subkey expansion in total there are segments which may be loaded from a fixed table and storage available for S segments in the subkey expansion table.

An initial key block 250 of n input bits is key input. Each key input block is divided up into two one-to-one primary round segments 252 (K0) and 254 (K1), i.e., block halves, each of which contain n/2 bits. The first of a plurality of rounds are performed. Each round computes new subkey values of the one-to-one primary round segments K0 and K1. Each computation of the two primary segments is similar in form, even though it has different inputs and outputs and uses different registers.

To compute the first half round, i.e., to compute the primary round segment K0, the following procedure is used. Extract (block 256) the least significant g bits of K1. Use these as input into the s-box lookup table. Assign the value of the s-box output to register V. Linearly combine (block 258) using operator L1 segment K0 with segment V to produce a replacement primary round segment K0. Linearly combine (block 260) using operator L2 the right segment with F[i] to form a new intermediate segment. Then linearly combine (block 262) using operator L3 this new intermediate segment with K0. Then compute a one-to-one segment by rotating (block 264) the register K0 rightward by g bits. The result is the new subkey value [i] from segment K0.

Then repeat this process to compute the second half round, but where the roles of K0 and K1 are switched. To compute the second half round, i.e., to compute a replacement primary round segment K1, the following procedure is used. Extract (block 266) the least significant g bits of the replacement segment of K0. Use these as input into the s-box lookup table. Assign the value of the s-box output to register V. Linearly combine (block 268) using operator L4 primary segment K1 with value V to produce a replacement round segment K1. Linearly combine (block 270) using operator L5 the left segment with F[i+q] to form a new intermediate segment. Then linearly combine (block 272) using the operator L6 this new intermediate segment with K1. Then compute a one-to-one segment by rotating (block 274) the register K1 rightward by g bits. The result is the new subkey value [i+q] from segment K1.

Each such round generates two subkey values whereby the number of rounds is dependent the requirement for subkey values, which is itself dictated by the number of rounds in the encryption system.

It is possible to generalize this key expansion method to generate subkeys from a variable number of secret key segments. In this generalized version the number of generative primary segments is at least 2, and may be as large as desired but ideally is between 2 and 4. This generalized method for the generative block cipher calculates a new primary segment for register[j] from a prior segment of register[j] where j is an index which increments from 0 to (x−1) before repeating. S is the number of fixed table segments used per generative subkey expansion, and it is typically the number of subkey segments output per generative subkey expansion from new primary round segments. F[i] is the table of constant values, and Subkey[i] is the resulting subkey expansion table, where i is an index incremented from 0 to (s−1) before repeating.

A register Cxor is a cumulative xor of all other primary segments or registers except for the current primary segment being calculated at register[j]. Note in the equations below that the equation for Cxor updates its value for each new value of index j. The initialization equations are not discussed for the following equations for they are readily determined by one skilled in the art.

The following loop computes such new primary segment, also called new register values, using this generalized key expansion method, where NewRv is such a new segment value or new register value:

```
{
i=i + q, mod s;                                           Eq. 32
j=j + 1, mod x;                                           Eq. 33
Reg = register [j];                                       Eq. 34
Cxor = Cxor xor Reg xor NewRV;                            Eq. 35
NonLin = s-boxlsb(Cxor)];                                 Eq. 36
NewRV = ((Reg xor NonLin) + (Cxor xor F[i]))>>>g;         Eq. 37
register [j] = NewRV;                                     Eq. 38
Subkey [I] = NewRV;                                       Eq. 39
}
```

The flexibility of this method may result in a reduction of cipher speed and efficiency. Yet it is still capable of expanding an input key faster than many other methods used by bulk encryption ciphers and satisfying the preferred properties of the present invention.

Figure 14:
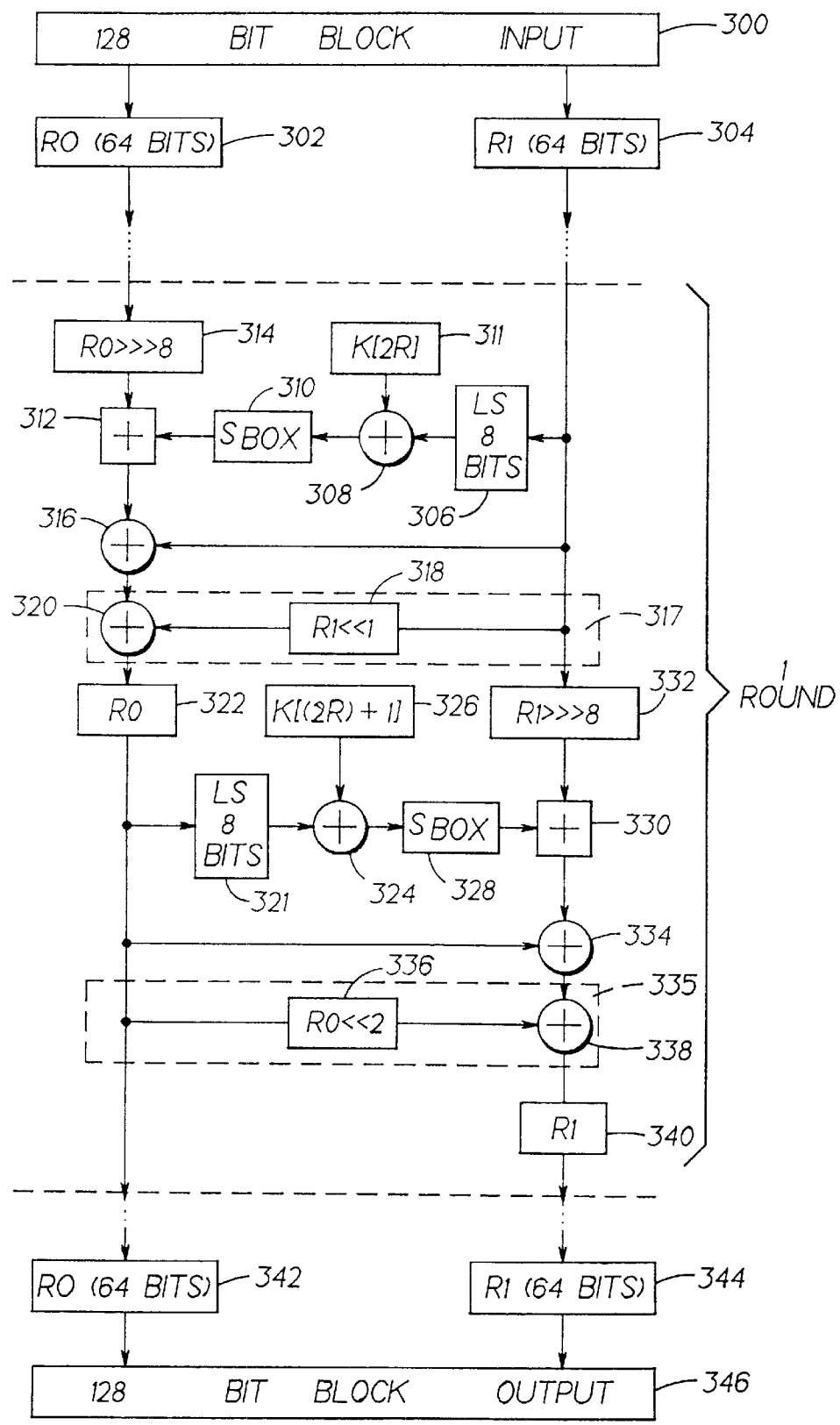
FIG. 14 is an algorithmic flow chart of an encryption method using an s-box in accordance with another alternate embodiment of the present invention.

Referring to FIG. 14, an algorithmic flow chart for one round of the cryptographic system and method using relatively non-commutative linear operators, in which an s-box affects the block data with an operator that is non-commutative with an operator used to achieve robust linear diffusion in accordance with an alternate embodiment is generally shown. The algorithm is a symmetric Feistel block cipher which allows a variable number of rounds to permit variable security levels, and a block size of at least 128 bits.

An initial block 300 of n input bits is plaintext input, wherein the n is at least 128 bits. Each plaintext input block 300 is divided up into two one-to-one primary round segments, 302 and 304, i.e., block halves, each of which contains n/2 bits. For example, a 128-bit version of the cryptographic system divides up its input into two 64-bit one-to-one round segments, R0 (block 302) and R1 (block 304) respectively.

Both R0 and R1 are primary segments, and are also one-to-one round segments. In fact, except for the small sections of bits which are s-box input, the round segments of s-box output, all variable segments in each round of this embodiment are one-to-one round segments.

The method shown in FIG. 14 next performs the first of a plurality of rounds of encryption (preferably equal to or exceeding 5 rounds). Each round of encryption computes new values of the one-to-one primary round segments R0 and R1. Each computation of the two primary segments is similar in form, even though it has different inputs and outputs and uses different registers.

To compute the first half round, i.e., to compute the primary round segment R0, the following procedure is used. Extract (block 306) the least significant 8 bits of R1. Exclusive-or (block 308) the right round segment with subkey segment K [2R] (block 311) to form a new intermediate segment. Use the new intermediate segment as input into the s-box lookup table (block 310). Assign the 64 bit value of the s-box output to register V. SIMD add (block 312) segment V with segment R0 that is rotated rightward by 8 bits (block 314) to produce a replacement primary round segment R0. Exclusive-or (block 316) the round segment R1 with the replacement primary round segment R0 to form a new intermediate segment. Periodically, in only even rounds as shown at 317, shift (block 318) the round segment R1 leftward by 1 bit and then exclusive-or (block 320) this shifted round segment R1 with the new intermediate segment R0. The result is the new value of primary segment R0 (block 322).

The extra diffusion steps (block 317 and 335) every other round improves the thoroughness of linear diffusion. Consequently, even rounds of the method are different than the odd rounds. These extra diffusion steps also increases significantly the resistance of the cipher to linear cryptanalysis and differential analysis.

Then repeat this process to compute the second half round, but where the roles of R0 and R1 are switched, and where the subkey segment used is K[(2R)+1] and the round segment R0 is shifted leftward by 2 bits every even round. To compute the second half round, i.e., to compute a replacement primary round segment R1, the following procedure is used. Extract (block 321) the least significant 8 bits of the new primary round segment R0 (block 322). Exclusive-or (block 324) the least significant 8 bits of new round segment R0 with subkey segment K[(2R)+1] (block 326) to form a new intermediate segment. Use the new intermediate segment as input into the s-box lookup table (block 328). Assign the 64 bit value of the s-box output to register V. SIMD add (block 330) segment V with new segment R1 that is rotated rightward by 8 bits (block 332) to produce a replacement primary round segment R1. Exclusive-or (block 334) the new round segment R0 with the replacement primary round segment R1 to form a new R1. Periodically, in only even rounds as shown at 335, shift leftward (block 336) the new round segment R0 leftward by 2 bits and then exclusive-or (block 338) this shifted round segment R0 with the new segment R1. The result is the new value of primary segment R1 (block 340).

Each such round in which new primary round segments R0 and R1 are computed is only part of the process. Many rounds may be necessary depending on block size and the users desire for security, but this number of rounds is typically between 8 and 64 rounds, with at least 5 of such rounds incorporating the described process, and such rounds are herein called qualified operative rounds; some users may select a larger number of rounds, such as 128 rounds. Indeed, there is no true upper limit to the number of rounds which can be employed, with the tradeoff being that more rounds reduce the speed of calculation.

After completion of the last round, the values of segments R0 (block 342) and R1 (block 344) are ciphertext consisting of n bits, i.e., a n-bit cipher output (block 346).

The equations which represent two rounds of the alternative embodiment shown in FIG. 14 are,

| | |
|---|---|
| Odd Round | |
| index=LS8(RH) xor Skey[i] | Eq. 40 |
| LH=LH>>>8 | Eq. 41 |
| LH=(LH + Sbox[index]) xor RH | Eq. 42 |
| index=LS8 (LH) xor Skey[i + 1] | Eq. 43 |
| RH=RH>>>8 | Eq. 44 |
| RH=(RH + Sbox[index]) xor LH | Eq. 45 |
| Even Round | |
| index=LS8(RH) xor Skey[i + 2] | Eq. 46 |
| LH=LH>>>8 | Eq. 47 |
| LH=(LH + Sbox[index]) xor RH xor (RH<<1) | Eq. 48 |
| index=LS8 (LH) xor Skey[i+3] | Eq. 49 |
| RH=RH>>>8 | Eq. 50 |
| RH=(RH + Sbox[index]) xor LH xor (LH<<2) | Eq. 51 |

The equations which represent the inverse (i.e., decryption) of FIG. 14 are, Even Round

| | |
|---|---|
| Even Round | |
| index=LS8(LH) xor Skey[i + 3] | Eq. 52 |
| RH= (RH xor LH xor (LH<<2)) − Sbox[index] | Eq. 53 |
| RH=RH<<<56 | Eq. 54 |
| index=LS8 (RH) xor Skey[i + 2] | Eq. 55 |
| LH=(LH xor RH xor (RH<<1)) − Sbox[index] | Eq. 56 |
| LH=LH<<<56 | Eq. 57 |
| Odd Round | |
| index=LS8(LH) xor Skey[i+1] | Eq. 58 |
| RH=(RH xor LH) − Sbox[index] | Eq. 59 |
| RH=RH<<<56 | Eq. 60 |
| index=LS8(RH) xor Skey[i] | Eq. 61 |
| LH=(LH xor RH) − Sbox[index] | Eq. 62 |
| LH=LH<<<56 | Eq. 63 |

Note that, as discussed elsewhere in the specification, it is possible to add extra key combinations, for example to combine the left half and right half with secret key data prior to and after such rounds of encryption and decryption. Further, it may be convenient to xor the left and right block halves with secret key data prior to and after such rounds of encryption and decryption (rather than combining the values using addition).

The variation of this embodiment shown below as encryption equations demonstrates not only use of extra key combinations prior to and after the rounds of encryption, it also helps to demonstrate that the additional shift operations used in the even rounds for extra diffusion can of course be used in the odd rounds as well (and generally in any round in the cipher). In this embodiment, which is more compact than the version shown in FIG. 14 the initial and final session key values are 64-bit key values and are called Skey2,

| | |
|---|---|
| LH=LH xor Skey2[0]; | Eq. 64 |
| RH=RH xor Skey2[1]; | Eq. 65 |
| For i=0 to last, increment 2 | Eq. 66 |
| { | |
| index=LS8(RH) xor Skey[i]; | Eq. 67 |
| LH=LH>>>8; | Eq. 68 |

-continued

| | |
|---|---|
| LH=(LH + Sbox[index]) xor RH xor (RH<<1); | Eq. 69 |
| index=LS8(LH) xor Skey[i+1]; | Eq. 70 |
| RH=RH>>>8; | Eq. 71 |
| RH=(RH + Sbox[index]) xor LH xor (LH<<2); | Eq. 72 |
| } | |
| LH=LH xor Skey2[2]; | Eq. 73 |
| RH=RH xor Skey2[3]; | Eq. 74 |

It is assumed that Skey2 would typically be an output of the same key expansion which generates Skey1 (although Skey2 contains 64 output bits in each word which is larger than the 8 output bits in each byte of Skey), which is to say that the values of Skey2 may for example be the encrypted output of a two-step master key expansion process where the encryption used in such key expansion has fixed inputs and has session key values which in general are generated by a linear key expansion process using round-dependent shift operations, and where the variation shown immediately above could be used to compute the encryption used in the key expansion process.

Another variation on FIG. 14 is a less compact and possibly more efficient version, which uses extra initial and final key operations plus bit-shifting every other round as follows:

| | |
|---|---|
| LH=LH xor Skey2[0]; | Eq. 75 |
| RH=RH xor Skey2[1]; | Eq. 76 |
| For i=0 to last, increment 4 | Eq. 77 |
| { | |
| // Odd Round | Eq. 78 |
| index=LS8(RH) xor Skey[i]; | Eq. 79 |
| LH=LH>>>8; | Eq. 80 |
| LH=(LH + Sbox[index]) xor RH; | Eq. 81 |
| index=LS8(LH) xor Skey[i+1]; | Eq. 82 |
| RH=RH>>>8; | Eq. 83 |
| RH=(RH + Sbox[index]) xor LH; | Eq. 84 |
| // Even Round | Eq. 85 |
| index=LS8(RH) xor Skey[i+2]; | Eq. 86 |
| LH=LH>>>8; | Eq. 87 |
| LH=(LH + Sbox[index]) xor (RH<<1); | Eq. 88 |
| index=LS8(LH) xor Skey[i+3]; | Eq. 89 |
| RH=RH>>>8; | Eq. 90 |
| RH=(RH + Sbox[index]) xor (RH<<2); | Eq. 91 |
| } | |
| LH=LH xor Skey2[2]; | Eq. 92 |
| RH=RH xor Skey2[3]; | Eq. 93 |

This version eliminates two xor operations in the even round which may be unnecessary. The left shift operations in those rounds are preserved as a means to reduce byte alignment and to reduce the effectiveness of certain linear attacks, especially in the case of a potentially weak sbox.

And note further that nothing in this discussion restricts the choice of the subkey/session key generation method used in the present invention for possible block ciphers using sboxes; there are many known generally secure published key expansion methods for block ciphers using sboxes which have an avalanche effect and use some non-linear operations, and it seems that virtually all of them appear to be secure key expansion methods consistent with FIG. 14 and variations of FIG. 14.

There are three general attributes of the method of FIG. 14 which contribute to its security: (a) each input bit difference is guaranteed to cause a change in s-box input within 8 rounds, (b) each bit diffuses linearly in a robust manner to affect most bits after roughly 8 rounds, and (c) the bitwise variability of its nonlinear s-box operation exceeds the number of bits of its s-box input.

First, similar to many block ciphers, bit input changes in the method are guaranteed to cause a substantial affect on nonlinear input in a small number of rounds. In 8 rounds, after 128 bits of cipher data affect the s-box inputs, any input difference affects the output of an s-box.

Second, the extra shift operations every even round combined with the xor diffusion operations result in smooth effective bitwise linear diffusion. When only the linear diffusion patterns of the cipher is evaluated, there doesn't appear to be any periodic linear diffusion patterns resulting from input differences for which the Hamming number of changed bits is on average only a small number of bits per round.

Third, the bitwise variability of its nonlinear operator generally exceeds the number of bits input into its box. In most block ciphers, the s-box is the sole source of nonlinear strength. By contrast, the non-commutative interaction of s-box outputs and linear cipher data diffusion of the present invention gives rise to unpredictable variability which is an additional source of nonlinear strength.

The present invention can be embodied in the from of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium (electronic, magnetic or optic), loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 13:
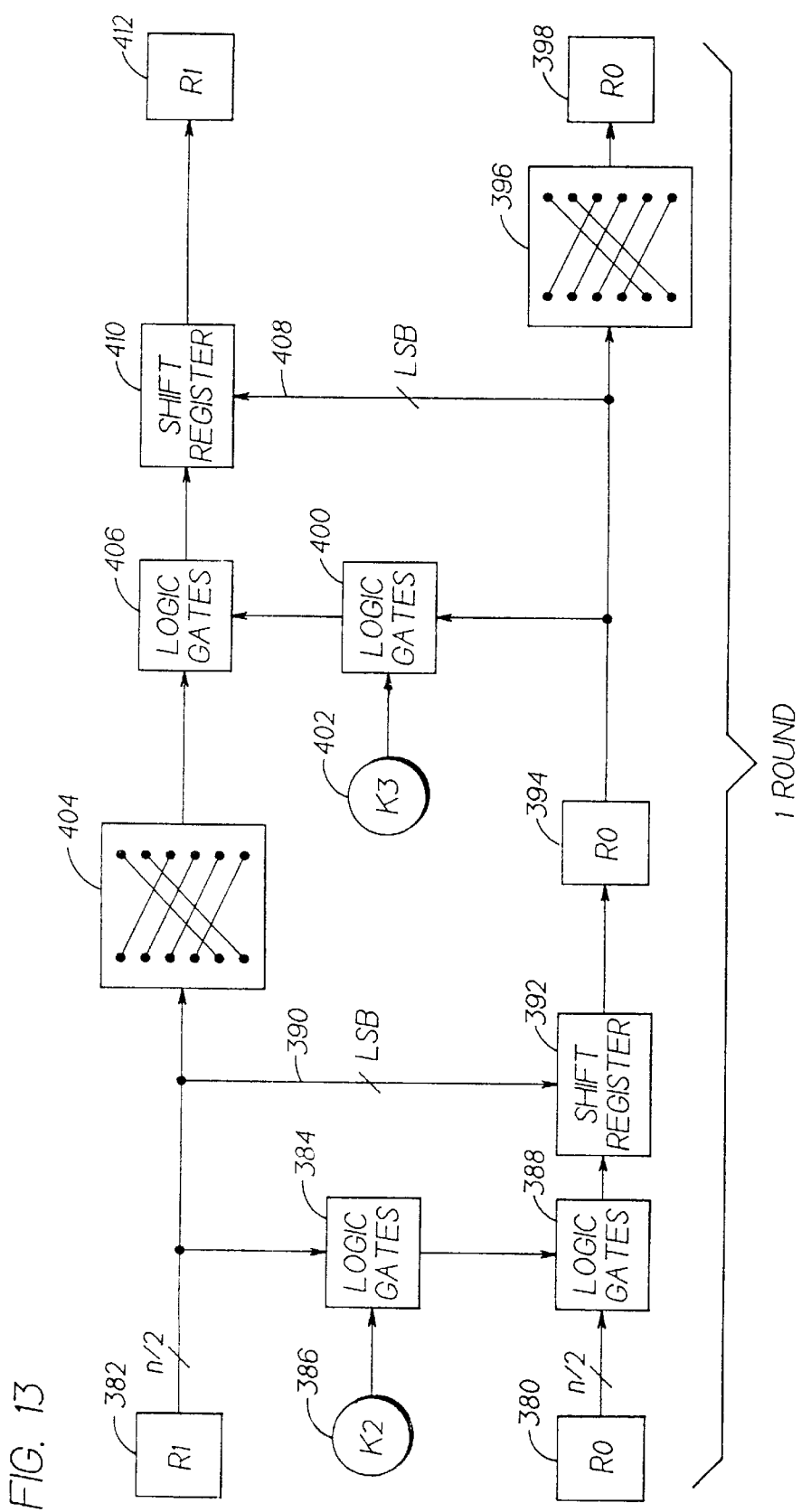
FIG. 13 is a block diagram of a hardware embodiment of the method of the encryption method using data-dependent rotation in accordance with the algorithmic flow chart of FIG. 6.

An example of which shows how the present invention may be embodied in hardware is generally shown in a block diagram in FIG. 13. The block diagram is illustrative of a circuit for employing the encryption method using data-dependent rotation in accordance with the algorithmic flow chart of FIG. 6. Specifically, the block diagram illustrates the circuitry necessary to encrypt one round.

Referring to FIG. 13, a block of plaintext input of n bits is divided up into two equal size primary round segments or half blocks of n/2 bits, R0 (block 380) and R1 (block 382). Each computation of the two primary segments in each encryption round is similar in form, even though it has different inputs and outputs, uses different subkeys, and uses different registers.

To compute the primary round segments R0 and R1 in the first half round, the following procedure is used. First, combine linearly using logic gates (block 384) (such as AND, or and XOR gates) the register RI with the subkey K2 (block 386) to produce an intermediate segment value. Combine linearly using logic gates (block 388) the intermediate segment with R0 producing a replacement value of primary segment R0. Then, provide the data or leads of the LSB of R1 at 390 to a shift register (block 392). The shift register rotates the replacement value of R0 by the value representative of the LSB of R1. This resulting value of R0 after the rotation is the new value of R0 (block 394). The output data or leads of the shift register are also switched or rotated a predetermined number of positions (block 396) effectively rotating the segment of data by a predetermined number of bits. The resulting value of R0 is the new value of R0 (block 398). Then repeat this process to compute the second half round, but where the roles of R0 and R1 are switched, and where the subkey segment used is K3.

To compute the primary round segments R0 and R1 in the second half round, the following procedure is used. First, combine linearly using logic gates (block 400) the new value of R0 (block 394) with the subkey K3 (block 402) to produce an intermediate segment value. The leads representative of R1 (block 382) are switched or rotated a predetermined number of positions (block 404) effectively rotating the segment of data by a predetermined number of bits. Then, combine linearly using logic gates (block 406) the intermediate segment of R0 with rotated segment R1 producing a replacement value of primary segment R1. Then, provide the leads of the LSB of R0 at 408 to a shift register (block 410). The shift register rotates the replacement value of R1 by the value representative of the LSB of R0. The resulting value of R1 is the new value of R1 (block 412).

While a predetermined rotation (circular bit rotation) has been described with respect to the various embodiments of the present invention, it is within the scope of the present invention that as a substitute for such predetermined rotation other predetermined bit moving operations (especially bit-permutations and bit-shifts) may be employed as such will be readily appreciated by one of ordinary skill in the art.

While the use of keys and bit moving operations have been described with respect to various embodiments of the present invention, one skilled in the art will appreciate that additional keys and predetermined or variable bit moving operations (e.g., fixed or variable rotations and fixed or variable shifts) may generally be used.

And, while the embodiments of the present invention have not used certain cryptographic operations, nothing restricts the use in the embodiments of such operators, restricts the type of key-dependent sbox transformations permitted, requires in all cases use of secret keys, or restricts use of the block ciphers as stand-alone encryption functions. For example, to the block ciphers of the present invention, one may add use of data-dependent shift operations, integer multiplication, data-dependent multiplication, byte permutations, use of 64-bit addition (or subtraction) instead of 64-bit SIMD addition (or subtraction), or even to find ways of combining sbox operations and data-dependent rotations in the same block cipher. As a further example, a standard fixed sbox called in the block cipher embodiments which use an sbox may be modified bytewise prior to use by a simple method such as bytewise rotor encryption, or otherwise modified using, generally any method, in order to provide a key-dependent sbox. And further, while the block ciphers in the embodiments were shown using, a secret key as a means of encryption (or perhaps to calculate a message authentication code), it is possible to use the same block ciphers where any key values are publically known as hash functions. And finally, while the block cipher embodiments have been shown as stand-alone functions which encrypt plaintext to ciphertext and vice-versa, they may also of course be used as components of stream ciphers or other cryptographic tools.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of enciphering plaintext in a block cipher, said enciphering using a secret key, said method comprising:

processing round segments in a plurality of rounds of said block cipher, said plurality of rounds including a plurality of bit-moving rounds, each of said bit-moving rounds transforming input primary segments having a total of n bits of data into out-put primary segments having a total of n bits of data, each of said input primary segments originating directly or indirectly from said plaintext, each of said round segments of each said bit-moving round comprising a segment which originates from at least one of said input primary segments of said bit-moving round, each output primary segment of each said bit-moving round being equal to one of said round segments of said bit-moving round, said processing round segments in each of said bit-moving rounds comprising, predetermined bit-moving at least one present bit-value in a present bit-position of one of said round segments of said bit-moving round to determine a bit-value in an other bit-position of one of said round segments of said bit-moving round, said present bit-position being different than said other bit-position, variable bit-moving bits of one of said round segments of said bit-moving round by a number of bits dependent on a value from data of one of said round segments of said bit-moving round, and wherein each of said segments is an ordered set of bits.

2. The method of claim 1 wherein said bit-moving round includes one of said primary segments having a value which is a one-to-one function of a prior value of said one of said primary segments.

3. The method of claim 1 wherein said predetermined bit-moving comprises moving said at least one present bit-value in said present bit-position of said one of said round segments to determine said bit-value in a same said round segment.

4. The method of claim 1 wherein said input primary segments of one of said bit-moving rounds is said output primary segments of a previous one of said bit-moving rounds.

5. The method of claim 1 wherein said variable bit-moving comprises variable circular bit-rotating said bits of one of said round segments of said bit-moving round by a number of bits dependent on said value from a selected number of bits of data in selected locations of one of said round segments of said bit-moving round.

6. The method of claim 5 wherein said variable circular bit-rotating said bits of one of said round segments comprises variably circular bit-rotating said bits of one of said round segments having a bit-size where a log base 2 of said bit-size equals said selected number of bits of data.

7. The method of claim 5 wherein said output primary segments have a bit-size of 32 bits or 64 bits.

8. The method of claim 5 wherein said predetermined bit-moving affects which bits affect said value of said variable circular bit-rotating, and at least one of said output primary segments originating from said round segment which has been rotated by said variable circular bit-rotating.

9. The method of claim 8 wherein said predetermined bit-moving comprises predetermined bit-rotating.

10. The method of claim 9 wherein substantially all of the bits produced by said predetermined bit-rotating affect said output primary segments of said bit-moving round.

11. The method of claim 5 wherein said one present bit-value in said present bit-position solely determines said bit-value in said other bit-position.

12. The method of claim 11 wherein said predetermined bit-moving affects which bits affect said value of said variable circular bit-rotating, and at least one of said output primary segments originating from said round segment which has been rotated by said variable circular bit-rotating.

13. The method of claim 5 wherein at least one of said output primary segments of each said bit-moving round is affected directly or indirectly by each of said predetermined bit-moving of said bit-moving round and said variable circular bit-rotating of said bit-moving round.

14. The method of claim 5 wherein said processing round segments in each of said bit-moving rounds further comprises a plurality of said predetermined bit-moving steps and a plurality of said variable circular bit-moving steps, each of said output primary segments of each said bit-moving round is affected directly or in directly by each of at least on e of said predetermined bit-moving steps of said bit-moving round and at least one of said variable circular bit-rotating steps of said bit-moving round.

15. The method of claim 14 wherein said predetermined bit-moving comprises predetermined bit-rotating.

16. The method of claim 5 wherein said output primary segments comprise a predetermined number of equal-sized primary segments, said predetermined number of equal-sized primary segments is equal to x, where x is an integer of 2, 3 or 4, and said equal-sized primary segments have a bit-size equal to (n/x) bits of data, where n is at least 128 bits.

17. The method of claim 5 wherein said predetermined bit-moving is non-commutative with respect to said variable circular bit-rotating.

18. The method of claim 5 wherein said predetermined bit-moving comprises predetermined bit-rotating.

19. The method of claim 18 wherein substantially all of the bits produced by said predetermined bit-rotating affect said output primary segments.

20. The method of claim 5 wherein said predetermined bit-moving comprises predetermined circular bit-rotating predetermined bit-shifting or predetermined bit-permuting.

21. The method of claim 5 wherein said variable circular bit-rotating includes said predetermined bit-moving.

22. The method of claim 5 wherein said value of said variable circular bit-rotating is from said selected locations which are preselected least significant bits of said bits of data of one of said round segments of said bit-moving round.

23. The method of claim 5 wherein said output primary segments of one of said rounds result directly or indirectly in ciphertext, such that said plaintext can be decrypted from said ciphertext.

24. The method of claim 23 wherein said predetermined bit-moving affects which bits affect said value which determines said number of bits of said variable circular bit-rotating, and at least one of said output primary segments originating from said round segment which has been rotated by said variable circular bit-rotating.

25. The method of claim 23 wherein said predetermined bit-moving comprises predetermined bit-rotating.

26. The method of claim 23 wherein said one present bit-value in said present bit-position solely determines said bit-value in said other bit-position.

27. The method of claim 26 wherein said predetermined bit-moving affects which bits affect said value of said variable circular bit-rotating, and at least one of said output primary segments originating from said round segment which has been rotated by said variable circular bit-rotating.

28. The method of claim 23 wherein said processing round segments in each of said bit-moving rounds further comprises a plurality of said predetermined bit-moving steps and a plurality of said variable circular bit-moving steps, each of said output primary segments of each said bit-moving round is affected directly or indirectly by each of at least one of said predetermined bit-moving steps of said bit-moving round and at least one of said variable circular bit-rotating steps of said bit-moving round.

29. The method of any of claims 1 to 28 wherein said plurality of bit-moving rounds comprises at least five said bit-moving rounds.

30. The method of claim 1 wherein said variable bit-moving comprises variable bit-shifting said bits of one of said round segments of said bit-moving round by a number of bits dependent on said value from a selected number of bits of data in selected locations of one of said round segments of said bit-moving round.

31. The method of claim 30 wherein said predetermined bit-moving affects which bits affect said value to said variable bit-shifting, and at least one of said output primary segments originating from said round segment which has been shifted by said variable bit-shifting.

32. The method of claim 30 wherein said one present bit-value in said present bit-position solely determines said bit-value in said other bit-position.

33. The method of claim 30 wherein said processing round segments in each of said bit-moving rounds further comprises a plurality of said predetermined bit-moving steps and a plurality of said variable bit-shifting steps, each of said output primary segments of each said bit-moving round is affected directly or indirectly by each of at least one of said predetermined bit-moving steps of said bit-moving round and at least on e of said variable bit- shifting steps of said bit-moving round.

34. The method of claim 30 wherein said variable bit-shifting includes said predetermined bit-moving.

35. The method of claim 30 wherein said value of said variable bit-sifting is from said selected locations which are preselected least significant bits of said bits of data of one of said round segments of said bit-moving round.

36. The method of claim 30 wherein said output primary segments of one of said rounds result directly or indirectly in ciphertext, such that said plaintext can be decrypted from said ciphertext.

37. The method of any of claims 30 to 36 wherein said plurality of bit-moving rounds comprises at least five of said bit-moving rounds.

38. The method of claim 1 wherein said processing round segments in each of said bit-moving rounds further comprises:
  combining two of said round segments in said bit-moving round using a linear mathematical operator.

39. The method of claim 38 wherein said bit -moving round includes one of said primary segments having a value which is a one-to-one function of a prior value of said one of said primary segments.

40. The method of claim 38 wherein said predetermined bit-moving comprises moving said at least one present bit-value in said present bin-position of said one of said round segments to determine said bit-value in a same said round segment.

41. The method of claim 38 wherein said input primary segments of one of said bit-moving rounds is said output primary segments of a previous one of said bit-moving rounds.

42. The method of claim 38 wherein said linear operator comprises addition, subtraction, exclusive-OR, SIMD addition, or SIMD subtraction.

43. The method of claim 38 wherein said variable bit-moving comprises variable bit-shifting said bits of one of said round segments of said bit-moving round by a number of bits dependent on said value from a selected number of bits of data in selected locations of one of said round segments in said bit-moving round.

44. The method of claim 43 wherein said linear operator comprises addition, subtraction, exclusive-OR, SIMD addition, or SIMD subtraction.

45. The method of claim 38 wherein said variable bit-moving comprises variable circular bit- rotating said bits of one of said round segments of said bit moving round by a number of bits dependent on said value from a selected number of bits of data in selected locations of one of said round segments of said bit-moving round.

46. The method of claim 45 wherein said variable circular bit-rotating said bits of one of said round segments comprises variably circular bit-rotating said bits of one of said round segments having a bit-size where a log base 2 of said bit-size equals said selected number of bits of data.

47. The method of claim 45 wherein said output primary segments have a bit-size of 32 bits or 64 bits.

48. The method of claim 45 wherein at least one of said output primary segments of each said bit-moving round is affected directly or indirectly by each of ad predetermined bit-moving of said bit-moving round, said variable circular bit-rotating of said bit-moving round, and said combining of said bit-moving round.

49. The method of claim 48 wherein said linear operator comprises addition, subtraction, exclusive-OR, SIMD addition, or SIMD subtraction.

50. The method of claim 49 wherein said predetermined bit-moving comprises predetermined bit-rotating.

51. The method of claim 45 wherein said processing round segments in each of said bit-moving rounds further comprises a plurality of said predetermined bit-moving steps, a plurality of said variable circular bit-moving steps, and a plurality of said combining steps, each of said output primary segments of each said bit-moving round is affected directly or indirectly by each of at least one of said predetermined bit-moving steps of said bit-moving round, at least one of said variable circular bit-rotating steps of said bit-moving round, and at least one of said combining steps of said bit-moving, round.

52. The method of claim 51 wherein said linear operator comprises addition, subtraction, exclusive-OR, SIMD addition, or SIMD subtraction.

53. The method of claim 52 wherein said predetermined bit-moving comprises predetermined bit-rotating.

54. The method of claim 45 wherein said predetermined bit-moving comprises predetermined bit-rotating.

55. The method of claim 45 wherein said one present bit-value in said present bit-position solely determines said bit-value in said other bit-position.

56. The method of claim 45 wherein said predetermined bit-moving comprises predetermined circular bit-rotating, predetermined bit-shifting or predetermined bit-permuting.

57. The method of claim 45 wherein said variable circular bit-rotating includes said predetermined bit-moving.

58. The method of claim 45 wherein said value of said variable circular bit-rotating is from said selected locations which are preselected least significant bits of said bits of data of one of said round segments of said bit-moving round.

59. The method of claim 45 wherein said linear operator comprises addition, subtraction, exclusive-OR, SIMD addition, or SIMD subtraction.

60. The method of claim 45 wherein said output primary segments of one of said rounds result directly or indirectly in ciphertext, such that said plaintext can be decrypted from said ciphertext.

61. The method of any of claims 38 to 40 wherein said plurality of bit-moving rounds comprises at least five said bit-moving rounds.

62. A method of enciphering plaintext inputted to a block cipher, said plaintext having n bits of data, said enciphering using a secret key, said method comprising:
processing round segments in a plurality of rounds of said block cipher, said plurality of rounds including a plurality of bit-moving rounds, each of said round segments in said bit-moving rounds comprising a segment in said bit-moving rounds which originates from said plaintext directly or through a present or previous one of said rounds, said processing round segments in each of said bit-moving rounds comprising,
predetermined bit-moving at least one present bit-value in a present bit-position of one of said round segments of said bit-moving round to determine a bit-value in an other bit-position of one of said round segments of said bit-moving round,
said present bit-position being different than said other bit-position, variable bit-moving bits of one of said round segments of said bit-moving round by a number of bits dependent on a value from data of one of said round segments of said bit-moving round, and wherein each of said segments comprises an ordered set of bits.

63. The method of claim 62 wherein said predetermined bit-moving comprises moving said at least one present bit-value in said present bit-position of said one of said round segments to determine said bit-value in a same said round segment.

64. The method of claim 62 wherein said variable bit-moving comprises variable circular bit-rotating said bits of one of said round segments of said bit-moving round by a number of bits dependent on said value from a selected number of bits of data in selected locations of one of said round segments of said bit-moving round.

65. The method of claim 64 wherein said predetermined bit-moving comprises predetermined bit-rotating.

66. The method of claim 64 wherein said predetermined bit-moving comprises predetermined circular bit-rotating, predetermined bit-shifting or predetermined bit-permuting.

67. The method of claim 64 wherein said one present bit-value in said present bit-position solely determines said bit-value in said other bit-position.

68. The method of claim 64 wherein said variable circular bit-rotating includes said predetermined bit-moving.

69. The method of claim 64 wherein said value of said variable circular bit-rotating is from said selected locations which are preselected least significant bits of said bits of data of one of said round segments of said bit-moving round.

70. The method of claim 64 wherein said predetermined bit-moving affects which bits affect said value of said variable circular bit-rotating.

71. The method of claim 62 wherein said variable bit-moving comprises variable bit-shifting said bits of one of said round segments of said bit-moving round by a number of bits dependent on said value from a selected number of bits of data in selected locations of one of said round segments of said bit-moving round.

72. The method of claim 71 wherein said predetermined bit-moving comprises predetermined bit-rotating.

73. The method of claim 71 wherein said predetermined bit-moving comprises predetermined circular bit-rotating, predetermined bit-shifting or predetermined bit-permuting.

74. The method of claim 71 wherein said one present bit-value in said present bit-position solely determines said bit-value in said other bit-position.

75. The method of claim 71 wherein said variable bit-shifting includes said predetermined bit-moving.

76. The method of claim 71 wherein said value of said variable circular bit-shifting is from said selected locations which are preselected least significant bits of said bits of data of one of said round segments of said bit-moving round.

77. The method of any of claims 62 to 76 wherein said plurality of bit-moving rounds comprises at least five of said bit-moving rounds.

78. The method of claim 62 wherein said processing round segments in each of said bit-moving rounds further comprises:
combining two of said round segments in said bit-moving round using a linear mathematical operator.

79. The method of claim 78 wherein said predetermined bit-moving comprises moving said at least one present bit-value in said present bit-position of said one of said round segments to determine said bit-value in a same said round segment.

80. The method of claim 78 wherein said variable bit-moving comprises variable circular bit-rotating said bits of one of said round segments of said bit moving round by a number of bits dependent on said value from a selected number of bits of data in selected locations of one of said round segments of said bit-moving round.

81. The method of claim 80 wherein said predetermined bit-moving comprises predetermined bit-rotating.

82. The method of claim 80 wherein said one present bit-value in said present bit-position solely determines said bit-value in said other bit-position.

83. The method of claim 80 wherein said variable circular bit-rotating includes said predetermined bit-moving.

84. The method of claim 80 wherein said value of said variable circular bit-rotating is from said selected locations which are preselected least significant bits of said bits of data of one of said round segments of said bit-moving round.

85. The method of claim 80 wherein said predetermined bit-moving affects which bits affect said value of said variable circular bit-rotating.

86. The method of claim 80 wherein said linear operator comprises addition, subtraction, exclusive-OR, SIMD addition, or SIMD subtraction.

87. The method of claim 78 wherein said variable bit-moving comprises variable bit-shifting said bits of one of said round segments of said bit-moving round by a number of bits dependent on said value from a selected number of bits of data in selected locations of one of said round segments of said bit-moving round.

88. The method of claim 87 wherein said predetermined bit-moving comprises predetermined bit-rotating.

89. The method of claim 87 wherein said one present bit-value in said present bit-position solely determines said bit-value in said other bit-position.

90. The method of claim 87 wherein said variable bit-shifting includes said predetermined bit-moving.

91. The method of claim 87 wherein said value of said variable bit-shifting is from said selected locations which are preselected least significant bits of said bits of data of one of said round segments of said bit-moving round.

92. The method of claim 87 wherein said predetermined bit-moving affects which bits affect said value which determines said number of bits of said variable bit-shifting.

93. The method of claim 87 wherein said linear operator comprises addition, subtraction, exclusive-OR, SIMD addition, or SIMD subtraction.

94. The method of any of claims 78 to 93 wherein said plurality of bit-moving rounds comprises at least five of said bit-moving rounds.

95. A binary block cipher system for enciphering plaintext in a block cipher, said enciphering using a secret key, said system comprising:
memory registers for storing segments;
a computing unit for executing a plurality of rounds of said block cipher, said plurality of rounds including a plurality of bit-moving rounds, each of said bit-moving rounds transforming input primary segments having a total of n bits of data into output primary segments having a total of n bits of data, each of said input primary segments originating directly or indirectly from said plaintext, each of said bit-moving rounds including round segments each of which comprise a segment which originates from at least one of said input primary segments of said bit-moving round, each output primary segment of each said bit-moving round being equal to one of said round segments of said bit-moving round;
a variable bit-moving function executed on said computing unit in each of said bit-moving rounds, said variable bit-moving function moving bits of one of said memory registers having one of said round segments stored therein by a number of bits dependent on a value from data of one of said memory registers having one of said round segments stored therein;
a predetermined bit-moving function executed on said computing unit in each of said bit-moving rounds, said predetermined bit-moving function moving at least one present bit-value in a present bit-position of one of said round segments to determine a bit-value in an other bit-position of one of said round segments of said bit-moving round, said present bit-position being different than said other bit-position; and
wherein each of said segments is an ordered set of bits.

96. The binary block cipher system of claim 95 wherein one of said bit-moving rounds includes one of said primary segments having a value that is a one-to-one function of a prior value of one of said primary segments.

97. The binary block cipher system of claim 95 wherein said predetermined bit-moving function moves said at least one present bit-value in said present bit-position of said one of said round segments to determine said bit-value in a same said round segment.

98. The binary block cipher system of claim 95 wherein said variable bit-moving function comprises a variable circular bit-rotating function moving bits of one of said memory registers having one of said round segments stored therein by a number of bits dependent on said value from a selected number of bits of data in selected locations of one of said memory registers having one of said round segments stored therein.

99. The binary block cipher system of claim 98 wherein said predetermined bit-moving function affects which bits affect said value of said variable circular bit-rotating function, and at least one of said output primary segments originating from said memory register having said round segment stored therein which has been rotated by said variable circular bit-rotating function.

100. The binary block cipher system of claim 99 wherein said predetermined bit-moving function comprises a predetermined bit-rotating function.

101. The binary block cipher system of claim 100 wherein substantially all of the bits executed on by said predetermined bit-rotating function affect said output primary segments of said bit-moving round.

102. The binary block cipher system of claim 99 wherein said one present bit-value in said present bit-position solely determines said bit-value in said other bit-position.

103. The binary block cipher system of any of claims 135 to 102 wherein said plurality of bit-moving rounds comprises at least five of said bit-moving rounds.

104. The binary block cipher system of claim 95 further comprising:
a combining function executed on said computing unit in each of said bit-moving rounds, said combining function combining two of said memory registers, each of said memory registers having one of said round segments stored therein, using a linear mathematical operator.

105. The binary block cipher system of claim 104 wherein one of said bit moving rounds includes one of said primary segments having a value that is a one-to-one function of a prior value of one of said primary segments.

106. The binary block cipher system of claim 104 wherein said predetermined bit-moving function moves said at least one present bit-value in said present bit-position of said one of said round segments to determine said bit-value in a same said round segment.

107. The binary block cipher system of claim 104 wherein said variable bit-moving function comprises a variable circular bit-rotating function moving bits of one of said memory registers having one of said round segments stored therein by a number of bits dependent on said value from a selected number of bits of data in selected locations of one of said memory registers having one of said round segments stored therein.

108. The binary block cipher system of claim 104 wherein said predetermined bit-moving function affects which bits affect said value of said variable circular bit-rotating function, and at least one of said output primary segments originating from said memory register having said round segment stored therein which has been rotated by said variable circular bit-rotating function.

109. The binary block cipher system of claim 108 wherein said predetermined bit-moving function comprises a predetermined bit-rotating function.

110. The binary block cipher system of claim 109 wherein substantially all of the bits executed on by said predetermined bit-rotating function affect said output primary segments of said bit-moving round.

111. The binary block cipher system of claim 108 wherein said one present bit-value in said present bit-position solely determines said bit-value in said other bit-position.

112. The binary block cipher system of any of claims 104 to 111 wherein said plurality of bit-moving rounds comprises at least five of said bit-moving rounds.

113. A method of key expansion to generate subkey values used in rounds of a block cipher, the block cipher using data-dependent rotation of round segments in at least three of the rounds, the data-dependent rotation having a variable number of bits of rotation which depend directly or indirectly on plaintext, the method of key-expansion including a plurality of expansion calculations on key-dependent segments to generate the subkey values, each of said expansion calculations comprising mathematically combining key-dependent segments with predetermined values to produce the subkey values, wherein the improvement comprises:
said key expansion using expansion calculations having a mathematical operator ratio less than 3.5 to 1, said operator ratio being a ratio of a total number of bits produced by all mathematical operators of said key expansion to a total number of all subkey bits produced.

114. The method of claim 113 wherein the improvement further comprises said expansion calculations comprising mathematically combining said key-dependent segments with said predetermined values to directly produce the subkey values.

115. The method of claim 113 wherein said mathematical operator ratio is less than 2 to 1.

116. The method of claim 113 wherein said mathematically combining of said key-dependent segment and said predetermined values is substantially linear.

117. The method of claim 113 wherein said mathematically combining of said key-dependent segment and said predetermined value comprises mathematically combining using a linear operator, said linear operator comprising addition, subtraction, exclusive-OR, SIMD addition or SIMD subtraction.

118. A method of enciphering plaintext in a block cipher, said enciphering using a secret key, said method comprising:
processing round segments in a plurality of rounds of said block cipher, certain of said rounds transforming input primary segments having a total of n bits of data into output primary segments having a total of n bits of data, each of said input primary segments originating directly or indirectly from said plaintext, each of said round segments of each of said rounds comprising a segment which originates from at least one of said input primary segments of said round, each output primary segment of each said round being equal to one of said round segments of said round, said processing round segments in at least one of said rounds comprising, linearly combining first, second, and third variable segments of data, said first variable segment of at least 64 bits includes at least 50 variable bits from one of said round segments of said round, said second variable segment of at least 64 bits includes at least 50 variable bits from one of said round segments of said round, and said third variable segment is derived from a value selected from a lookup table in response to one of said round segments of said round, and
wherein each of said segments is an ordered set of bits.

119. The method of claim 118 wherein said at least one of said rounds comprises at least five of said rounds.

120. The method of claim 118 wherein said linear combining comprises linearly combining using a plurality of linear operators, said plurality of linear operators comprising exclusive-OR and at least one of addition, subtraction, SIMD addition or SIMD subtraction.

121. The method of claim 120 wherein said output primary segments of each said round comprises an integer number of 2 or 3 output primary segments.

122. The method of claim 121 wherein said linear combining comprises linearly combining using a plurality of linear operators, said plurality of linear operators comprising exclusive-OR and at least one of addition, subtraction, SIMD addition or SIMD subtraction.

123. The method of claim 121 wherein said linear combining comprises direct linear combining.

124. A method of enciphering plaintext in a block cipher, said enciphering using a secret key, said method comprising:
processing round segments in a plurality of rounds of said block cipher, certain of said rounds transforming input primary segments having a total of n bits of data into output primary segments having a total of n bits of data, each of said input primary segments originating directly or indirectly from said plaintext, each of said round segments of said rounds comprising a segment which originates from at least one of said input primary segments of said rounds, each output primary segment of each said round being equal to one of said round segments of said round, said processing round segments in at least one of said rounds comprising, linearly combining first, second, and third variable segments of data, said first variable segment including at least 75 percent of variable bits of one of two said primary segments of said round, said second variable segment including at least 75 percent of variable bits of the other of said two of said primary segments of said round, and said third variable segment is derived from a value selected from a lookup table in response to one of said round segments of said round, and wherein each of said segments is an ordered set of bits.

125. The method of claim 124 wherein said at least one of said rounds comprises at least five of said rounds.

126. The method of claim 124 wherein said linear combining comprises linearly combining using a plurality of linear operators, said plurality of linear operators comprising exclusive-OR and at least one of addition, subtraction, SIMD addition or SIMD subtraction.

127. The method of claim 124 wherein said linear combining comprises direct linear combining.

128. A storage medium encoded with machine-readable program code for enciphering plaintext in a block cipher, said enciphering using a secret key, said program code including instructions for causing, a computer to implement a method comprising:

processing round segments in a plurality of rounds of said block cipher, said plurality of rounds including a plurality of bit-moving rounds, each of said bit-moving rounds transforming input primary segments having a total of n bits of data into output primary segments having a total of n bits of data, each of said input primary segments originating directly or indirectly from said plaintext, each of said round segments of each said bit-moving round comprising a segment which originates from at least one of said input primary segments of said bit-moving round, each output primary segment of each said bit-moving round being equal to one of said round segments of said bit-moving round, said processing round segments in each of said bit-moving rounds comprising, predetermined bit-moving at least one present bit-value in a present bit-position of one of said round segments of said bit-moving round to determine a bit-value in an other bit-position of one of said round segments of said bit-moving round, said present bit-position being different than said other bit-position, variable bit-moving bits of one of said round segments of said bit-moving round by a number of bits dependent on a value from data of one of said round segments of said bit-moving round, and wherein each of said segments is an ordered set of bits.

129. The storage medium of claim 128 wherein said method further comprises said variable bit-moving comprising variable circular bit-rotating said bits of one of said round segments of said bit-moving round by a number of bits dependent on said value from a selected number of bits of data in selected locations of one of said round segments of said bit-moving round.

130. The storage medium of claim 129 wherein said method further comprises said variable circular bit-rotating said bits of one of said round segments comprising variably circular bit-rotating said bits of one of said round segments having a bit-size where a log base 2 of said bit-size equals said selected number of bits of data.

131. The storage medium of claim 129 wherein said method further comprises said Output primary segments having a bit-size of 32 bits or 64 bits.

132. The storage medium of claim 129 wherein said method further comprises said predetermined bit-moving affecting which bits affect said value of said variable circular bit-rotating, and at least one of said output primary segments originating from said round segment which has been rotated by said variable circular bit-rotating.

133. The storage medium of claim 129 wherein said method further comprises said predetermined bit-moving comprising predetermined bit-rotating.

134. The storage medium of claim 128 wherein said method further comprises said variable bit-moving comprising variable bit-shifting said bits of one of said round segments of said bit-moving round by a number of bits dependent on said value from a selected number of bits of data in selected locations of one of said round segments of said bit-moving round.

135. The storage medium of any of claims 128 to 134 wherein said method further comprises said plurality of bit-moving rounds comprising at least five said bit-moving rounds.

136. The storage medium of claim 128 wherein said method further comprises:

combining two of said round segments in said bit-moving round using a linear mathematical operator.

137. The storage medium of claim 136 wherein said method further comprises said variable bit-moving comprising variable circular bit-rotating said bits of one of said round segments of said bit-moving round by a number of bits dependent on said value from a selected number of bits of data in selected locations of one of said round segments of said bit-moving round.

138. The storage medium of claim 137 wherein said method further comprises said variable circular bit-rotating said bits of one of said round segments comprising variably circular bit-rotating said bits of one of said round segments having a bit-size where a log base 2 of said bit-size equals said selected number of bits of data.

139. The storage medium of claim 137 wherein said method further comprises said output primary segments having a bit-size of 32 bits or 64 bits.

140. The storage medium of claim 137 wherein said method further comprises said predetermined bit-moving affecting which bits affect said value of said variable circular bit-rotating, and at least one of said output primary segments originating from said round segment which has been rotated by said variable circular bit-rotating.

141. The storage medium of claim 137 wherein said method further comprises said predetermined bit-moving comprising predetermined bit-rotating.

142. The storage medium of claim 136 wherein said method further comprises said variable bit-moving comprising variable bit-shifting said bits of one of said round segments of said bit-moving round by a number of bits dependent on said value from a selected number of bits of data in selected locations of one of said round segments of said bit-moving round.

143. The storage medium of any of claims 136 to 142 wherein said method further comprises said plurality of bit-moving rounds comprising at least five said bit-moving rounds.

144. A storage medium encoded with machine-readable program code for enciphering plaintext inputted to a block cipher, said plaintext having n bits of data, said block cipher using a secret key, said program code including instructions for causing a computer to implement a method comprising:

processing round segments in a plurality of rounds of said block cipher, said plurality of rounds including a plurality of bit-moving rounds, each of said round segments in said bit-moving rounds comprising a segment in said bit-moving rounds which originates from said plaintext directly or through a present or previous one of said rounds, said processing round segments in each of said bit-moving rounds comprising, predetermined bit-moving at least one present bit-value in a present bit-position of one of said round segments of said bit-moving round to determine a bit-value in an other bit-position of one of said round segments of said bit-moving round, said present bit-position being different than said other bit-position, variable bit-moving bits of one of said round segments of said bit-moving round by a number of bits dependent on a value from data of one of said round segments of said bit-moving round, and wherein each of said segments comprises an ordered set of bits.

145. The storage medium of claim 144 wherein said method further comprises said variable bit-moving comprising variable circular bit-rotating said bits of one of said round segments of said bit-moving round by a number of bits dependent on said value from a selected number of bits of data in selected locations of one of said round segments of said bit-moving round.

146. The storage medium of claim 145 wherein said method further comprises said variable circular bit-rotating said bits of one of said round segments comprising variably circular bit-rotating said bits of one of said round segments having a bit-size where a log base 2 of said bit-size equals said selected number of bits of data.

147. The storage medium of claim 145 wherein said method further comprises said predetermined bit-moving affecting which bits affect said value of said variable circular bit-rotating, and at least one of said output primary segments originating from said round segment which has been rotated by said variable circular bit-rotating.

148. The storage medium of claim 145 wherein said method further comprises said predetermined bit-moving comprising predetermined bit-rotating.

149. The storage medium of claim 144 wherein said method further comprises said variable bit-moving comprising variable bit-shifting said bits of one of said round segments of said bit-moving round by a number of bits dependent on said value from a selected number of bits of data in selected locations of one of said round segments of said bit-moving round.

150. The storage medium of any of claims 145 to 149 wherein said method further comprises said plurality of bit-moving rounds comprising at least five said bit-moving rounds.

151. The storage medium of claim 144 wherein said method further comprises:

combining two of said round segments in said bit-moving round using a linear mathematical operator.

152. The storage medium of claim 151 wherein said method further comprises said variable bit-moving comprising variable circular bit-rotating said bits of one of said round segments of said bit-moving round by a number of bits dependent on said value from a selected number of bits of data in selected locations of one of said round segments of said bit-moving round.

153. The storage medium of claim 152 wherein said method further comprises said variable circular bit-rotating said bits of one of said round segments comprising variably circular bit-rotating said bits of one of said round segments having a bit-size where a log base 2 of said bit-size equals said selected number of bits of data.

154. The storage medium of claim 152 wherein said method further comprises said predetermined bit-moving affecting which bits affect said value of said variable circular bit-rotating, and at least one of said output primary segments originating from said round segment which has been rotated by said variable circular bit-rotating.

155. The storage medium of claim 152 wherein said method further comprises said predetermined bit-moving comprising predetermined bit-rotating.

156. The storage medium of claim 151 wherein said method further comprises said variable bit-moving comprising variable bit-shifting said bits of one of said round segments of said bit-moving round by a number of bits dependent on said value from a selected number of bits of data in selected locations of one of said round segments of said bit-moving round.

157. The storage medium of any of claims 151 to 156 wherein said method further comprises said plurality of bit-moving rounds comprising at least five said bit-moving rounds.

158. A storage medium encoded with machine-readable program code for key expansion, said program code including instructions for causing a computer to implement a method of said key expansion to generate subkey values used in rounds of a block cipher, the block cipher using data-dependent rotation of round segments in at least three of the rounds, the data-dependent rotation having a variable number of bits of rotation which depend directly or indirectly on plaintext, the method of key-expansion including a plurality of expansion calculations on key-dependent segments to generate the subkey values, each of said expansion calculations comprising mathematically combining key-dependent segments with predetermined values to produce the subkey values, wherein the improvement comprises said program code including instructions for causing said computer to implement said key expansion using expansion calculations having a mathematical operator ratio less than 3.5 to 1, said operator ratio is a ratio of a total number of bits produced by all mathematical operators of said key expansion to a total number of all subkey bits produced.

159. A storage medium encoded with machine-readable program code for enciphering plaintext in a block cipher, said enciphering using a secret key, said program code including instructions for causing a computer to implement a method comprising:

processing round segments in a plurality of rounds of said block cipher, certain of said rounds transforming input primary segments having a total of n bits of data into output primary segments having a total of n bits of data, each of said input primary segments originating directly or indirectly from said plaintext, each of said round segments of each of said rounds comprising a segment which originates from at least one of said input primary segments of said round, each output primary segment of each said round being equal to one of said round segments of said round, said processing round segments in at least one of said rounds comprising, linearly combining first, second, and third variable segments of data, said first variable segment of at least 64 bits includes at least 50 variable bits from one of said round segments of said round, said second variable segment of at least 64 bits includes at least 50 variable bits from one of said round segments of said round, and said third variable segment is derived from a value selected from a lookup table in response to one of said round segments of said round, and wherein each of said segments is an ordered set of bits.

160. A storage medium encoded with machine-readable program code for enciphering plaintext in a block cipher, said enciphering, using a secret key, said program code including instructions for causing a computer to implement a method comprising:

processing round segments in a plurality of rounds of said block cipher, certain of said rounds transforming input primary segments having a total of n bits of data into output primary segments having, a total of n bits of data, each of said input primary segments originating-directly or indirectly from said plaintext, each of said round segments of said rounds comprising a segment which originates from at least one of said input primary segments of said rounds, each output primary segment of each said round being equal to one of said round segments of said round, said processing round segments in at least one of said rounds comprising, linearly combining first, second, and third variable segments of data, said first variable segment including at least 75 percent of variable bits of one of two said primary segments of said round, said second variable segment including at least 75 percent of variable bits of the other of said two of said primary segments of said round, and said third variable segment is derived from a value selected from a lookup table in response to one of said round segments of said round, and wherein each of said segments is an ordered set of bits.

161. An apparatus for enciphering plaintext in a block cipher using a secret key, said block cipher including a plurality of rounds having round segments, said plurality of rounds including, a plurality of bit-moving rounds, each of said bit-moving, rounds for transforming input primary segments having a total of n bits of data into output primary segments having a total of n bits of data, each of said input primary segments originating directly or indirectly from said plaintext, each of said round segments of each said bit-moving round comprising a segment which originates from at least one of said input primary segments of said bit-moving round, each output primary segment of each said bit-moving round being equal to one of said round segments of said bit-moving round, said apparatus comprising:

means for predetermined bit-moving at least one present bit-value in a present bit-position of one of said round segments in each of said bit-moving rounds to determine a bit-value in an other bit-position of one of said round segments, said present bit-position being different than said other bit-position;

means for variable bit-moving bits of one of said round segments in each of said bit-moving rounds by a number of bits dependent on a value from data of one of said round segments of said bit-moving round; and wherein each of said segments is an ordered set of bits.

162. The apparatus of claim 161 wherein said means for variable bit-moving comprises means for variable circular bit-rotating said bits of one of said round segments of said bit-moving round by a number of bits dependent on said value from a selected number of bits of data in selected locations of one of said round segments of said bit-moving round.

163. The apparatus of claim 162 wherein said means for variable circular bit-rotating said bits of one of said round segments comprising means for variably circular bit-rotating said bits of one of said round segments having a bit-size where a log base 2 of said bit-size equals said selected number of bits of data.

164. The apparatus of claim 162 wherein said output primary segments have a bit-size of 32 bits or 64 bits.

165. The apparatus of claim 162 wherein said means for predetermined bit-moving affects which bits affect said value of said means for variable circular bit-rotating, and at least one of said output primary segments originating from said round segment which has been rotated by said means for variable circular bit-rotating.

166. The apparatus of claim 162 wherein said means for predetermined bit-moving comprising means for predetermined bit-rotating said at least one present bit value.

167. The apparatus of claim 161 wherein said means for variable bit-moving comprising means for variable bit-shifting said bits of one of said round segments of said bit-moving round by a number of bits dependent on said value from a selected number of bits of data in selected locations of one of said round segments of said bit-moving round.

168. The apparatus of any of claims 161 to 167 wherein said plurality of bit-moving rounds comprising at least five said bit-moving rounds.

169. The apparatus of claim 161 further comprising:

means for combining two of said round segments in each of said bit-moving rounds using a linear mathematical operator.

170. The apparatus of claim 169 wherein said means for variable bit-moving comprises means for variable circular bit-rotating said bits of one of said round segments of said bit-moving round by a number of bits dependent on said value from a selected number of bits of data in selected locations of one of said round segments of said bit-moving round.

171. The apparatus of claim 170 wherein said means for variable circular bit-rotating said bits of one of said round segments comprises means for variably circular bit-rotating said bits of one of said round segments having a bit-size where a log base 2 of said bit-size equals said selected number of bits of data.

172. The apparatus of claim 170 wherein said output primary segments have a bit-size of 32 bits or 64 bits.

173. The apparatus of claim 170 wherein said means for predetermined bit-moving affects which bits affect said value of said means for variable circular bit-rotating, and at least one of said output primary segments originating from said round segment which has been rotated by said means for variable circular bit-rotating.

174. The apparatus of claim 170 wherein said means for predetermined bit-moving comprising means for predetermined bit-rotating said at least one present bit value.

175. The apparatus of claim 169 wherein said means for variable bit-moving comprises means for variable bit-shifting said bits of one of said round segments of said bit-moving round by a number of bits dependent on said value from a selected number of bits of data in selected locations of one of said round segments of said bit-moving round.

176. The apparatus of any of claims 169 to 175 wherein said plurality of bit-moving, rounds comprising at least five said bit-moving rounds.

177. An apparatus for enciphering plaintext inputted to a block cipher using a secret key, said block cipher including a plurality of rounds having round segments, said plurality of rounds including a plurality of bit-moving rounds, each of said round segments in said bit-moving rounds comprising a segment in said bit-moving rounds which originates from said plaintext directly or through a present or previous one of said rounds, said apparatus comprising:

means for predetermined bit-moving at least one present bit-value in a present bit-position of one of said round segments in each of said bit-moving rounds to determine a bit-value in an other bit-position of one of said round segments, said present bit-position being different than said other bit-position;

means for variable bit-moving bits of one of said round segments in each of said bit-moving rounds by a number of bits dependent on a value from data of one of said round segments of said bit-moving round; and wherein each of said segments comprises an ordered set of bits.

178. The apparatus of claim 177 wherein said means for variable bit-moving comprises means for variable circular bit-rotating said bits of one of said round segments of said bit-moving round by a number of bits dependent on said value from a selected number of bits of data in selected locations of one of said round segments of said bit-moving round.

179. The apparatus of claim 178 wherein said means for variable circular bit-rotating said bits of one of said round segments comprising means for variably circular bit-rotating said bits of one of said round segments having a bit-size where a log base 2 of said bit-size equals said selected number of bits of data.

180. The apparatus of claim 178 wherein said means for predetermined bit-moving affects which bits affect said value of said means for variable circular bit-rotating, and at least one of said output primary segments originating from said round segment which has been rotated by said means for variable circular bit-rotating.

181. The apparatus of claim 178 wherein said means for predetermined bit-moving comprising means for predetermined bit-rotating said at least one present bit value.

182. The apparatus of claim 177 wherein said means for variable bit-moving comprising means for variable bit-shifting said bits of one of said round segments of said bit-moving, round by a number of bits dependent on said value from a selected number of bits of data in selected locations of one of said round segments of said bit-moving round.

183. The apparatus of any of claims 177 to 182 wherein said plurality of bit-moving rounds comprising at least five said bit-moving rounds.

184. The apparatus of claim 177 further comprising:

means for combining two of said round segments in each of said bit-moving rounds using a linear mathematical operator.

185. The apparatus of claim 184 wherein said means for variable bit-moving comprises means for variable circular bit-rotating said bits of one of said round segments of said bit-moving round by a number of bits dependent on said value from a selected number of bits of data in selected locations of one of said round segments of said bit-moving round.

186. The apparatus of claim 185 wherein said means for variable circular bit-rotating said bits of one of said round segments comprises means for variably circular bit-rotating said bits of one of said round segments having a bit-size where a log base 2 of said bit-size equals said selected number of bits of data.

187. The apparatus of claim 185 wherein said means for predetermined bit-moving affects which bits affect said value of said means for variable circular bit-rotating, and at least one of said output primary segments originating from said round segment which has been rotated by said means for variable circular bit-rotating.

188. The apparatus of claim 185 wherein said means for predetermined bit-moving comprising means for predetermined bit-rotating said at least one present bit value.

189. The apparatus of claim 184 wherein said means for variable bit-moving comprises means for variable bit-shifting said bits of one of said round segments of said bit-moving round by a number of bits dependent on said value from a selected number of bits of data in selected locations of one of said round segments of said bit-moving round.

190. The apparatus of any of claims 184 to 189 wherein said plurality of bit-moving rounds comprising at least five said bit-moving rounds.

191. An apparatus including means for key expansion to generate subkey values used in rounds of a block cipher, the block cipher using data-dependent rotation of round segments in at least three of the rounds, the data-dependent rotation having a variable number of bits of rotation which depend directly or indirectly on plaintext, said means for key-expansion utilizing a plurality of expansion calculations on key-dependent segments to generate the subkey values, each of said expansion calculations comprising mathematically combining key-dependent segments with predetermined values to produce the subkey values, wherein the improvement comprises, said means for key expansion using said expansion calculations having a mathematical operator ratio less than 3.5 to 1, said operator ratio being a ratio of a total number of bits produced by all mathematical operators of said key expansion to a total number of all subkey bits produced.

192. An apparatus for enciphering plaintext in a block cipher using a secret key, said block cipher including a plurality of rounds having round segments, certain of said rounds for transforming input primary segments having a total of n bits of data into output primary segments having a total of n bits of data, each of said input primary segments originating directly or indirectly from said plaintext, each of said round segments of each of said rounds comprising a segment which originates from at least one of said input primary segments of said round, each output primary segment of each said round being equal to one of said round segments of said round, wherein the improvement comprises:

means for linearly combining first, second, and third variable segments of data, said first variable segment of at least 64 bits includes at least 50 variable bits from one of said round segments, said second variable of at least 64 bits includes at least 50 variable bits from one of said round segments, and said third variable segment is derived from a value selected from a lookup table in response to one of said round segments; and wherein each of said segments is an ordered set of bits.

193. An apparatus for enciphering plaintext in a block cipher using a secret key, said block cipher including a plurality of rounds having round segments, certain of said rounds for transforming input primary segments having a total of n bits of data into output primary segments having a total of n bits of data, each of said input primary segments originating directly or indirectly from said plaintext, each of said round segments of each of said rounds comprising a segment which originates from at least one of said input primary segments of said round, each output primary segment of each said round being equal to one of said round segments of said round, wherein the improvement comprises:

means for linearly combining first, second and third variable segments of data, said first variable segment including at least 75 percent of variable bits of one of two said primary segments, said second variable segment including at least 75 percent of the variable bits of the other of said two of said primary segments, and said third variable segment is derived from a value selected from a lookup table in response to one of said round segments; and wherein each of said segments is an ordered set of bits.

194. A method of deciphering ciphertext inputted to a block cipher, said ciphertext having n bits of data, said deciphering using a secret key, said method comprising:

processing round segments in a plurality of rounds of said block cipher, said plurality of rounds including a plurality of bit-moving rounds, each of said round segments in said bit-moving rounds comprising a segment in said bit-moving rounds which originates from said ciphertext directly or through a present or previous one of said rounds, said processing round segments in each of said bit-moving rounds comprising, predetermined bit-moving at least one present bit-value in a present bit-position of one of said round segments of said bit-moving round to determine a bit-value in an other bit-position of one of said round segments of said bit-moving round, said present bit-position being different than said other bit-position, variable bit-moving bits of one of said round segments of said bit-moving round by a number of bit s dependent on a value from data of one of said round segments of said bit-moving round, and wherein each of said segments comprises an ordered set of bits.

195. The method of claim 194 wherein said variable bit-moving comprises variable circular bit-rotating said bits of one of said round segments of said bit moving round by a number of bits dependent on said value from a selected number of bits of data in selected locations of one of said round segments of said bit-moving round.

196. The method of claim 195 wherein said predetermined bit-moving comprises pre determined bit-rotating.

197. The method of claim 195 wherein said predetermined bit-moving comprises predetermined circular bit-rotating, predetermined bit-shifting or predetermined bit-permuting.

198. The method of claim 195 wherein said one present bit-value in said present bit-position solely determines said bit-value in said other bit-position.

199. A storage medium encoded with machine-readable program code for deciphering ciphertext inputted to a block cipher, said ciphertext having n bits of data, said block cipher using a secret key, said program code including instructions for causing a computer to implement a method comprising:

processing round segments in a plurality of rounds of said block cipher, said plurality of rounds including a plurality of bit-moving rounds, each of said round segments in said bit-moving rounds comprising a segment in said bit-moving rounds which originates from said ciphertext directly or through a present or previous one of said rounds, said processing round segments in each of said bit-moving rounds comprising, predetermined bit-moving at least one present bit-value in a present bit-position of one of said round segments of said bit-moving round to determine a bit-value in an other bit-position of one of said round segments of said bit-moving round, said present bit-position being different than said other bit-position, variable bit-moving bits of one of said round segments of said bit-moving round by a number of bits dependent on a value from data of one of said round segments of said bit-moving round, and wherein each of said segments comprises an ordered set of bits.

200. The storage medium of claim 199 wherein said method further comprises said variable bit-moving comprising variable circular bit-rotating said bits of one of said round segments of said bit-moving round by a number of bits dependent on said value from a selected number of bits of data in selected locations of one of said round segments of said bit-moving round.

201. The storage medium of claim 199 wherein said method further comprises said predetermined bit-moving comprising predetermined bit-rotating.

202. The storage medium of claim 199 wherein said method further comprises said predetermined bit-moving, comprising predetermined circular bit-rotating, predetermined bit-shifting or predetermined bit-permuting.

203. The method of claim 199 wherein said method further comprises said one present bit-value in said present bit-position solely determining said bit-value in said other bit position.

204. An apparatus for deciphering ciphertext inputted to a block cipher using a secret key, said block cipher including a plurality of rounds having round segments, said plurality of rounds including a plurality of bit-moving rounds, each of said round segments in said bit-moving rounds comprising a segment in said bit-moving rounds which originates from said ciphertext directly or through a present or previous one of said rounds, said apparatus comprising:

means for predetermined bit-moving at least one present bit-value in a present bit-position of one of said round segments in each of said bit-moving rounds to determine a bit-value in an other bit-position of one of said round segments, said present bit-position being different than said other bit-position;

means for variable bit-moving bits of one of said round segments in each of said bit-moving rounds by a n umber of bit s dependent on a value from data of one of said round segments of said bit-moving round; and wherein each of said segments comprises an ordered set of bits.

205. The apparatus of claim 204 wherein said means for variable bit-moving comprises means for variable circular bit-rotating said bits of one of said round segments of said bit-moving round by a number of bits dependent on said value from a selected number of bits of data in selected locations of one of said round segments of said bit-moving round.

206. The apparatus of claim 205 wherein said means for predetermined bit-moving comprising means for predetermined bit-rotating said at least one present bit value.

207. The apparatus of claim 205 wherein said means for predetermined bit-moving comprises means for predetermined circular bit-rotating, means for predetermined bit-shifting or means for predetermined bit-permuting.

208. The apparatus of claim 205 wherein said one present bit-value in said present bit-position solely determines said bit-value in said other bit-position.

209. A method of encrypting a plaintext message, comprising:

(a) identifying the plaintext message, the plaintext message including a plurality of words;

(b) applying a mathematical function to at least one of the words;

(c) rotating a value which is based on the result of the applying step (b) by a first number of bits;

(d) rotating a value which is based on the result of the rotating step (c) by a second number of bits, wherein one of the first number of bits and the second number of bits is a predetermined number of bits and the other one of the first number of bits and the second number of bits is derived from one of the words;

(e) applying a secret key to a value originating from one of the words; and (f) repeating steps (b), (c), (d), and (e) for a number of rounds.

210. The method of claim 209 wherein the applying the mathematical function comprises applying an operation on two unsigned integers of 32 bits or 64 bits.

211. The method of claim 210 wherein a result of the applying the operation has an equal probability of having bits equal to one or zero when one of the integers has an equal probability of having bits equal to one or zero.

212. The method of claim 209 wherein the predetermined number of bits is given by a log base 2 of the number of bits in a given one of the words.

213. The method of claim 209 further comprising:

(g) rotating a value which is based on the result of the rotating step (d) by a third number of bits, wherein the third number of bits is a predetermined number of bits different from the predetermined number of bits of step (d).

214. The method of claim 213 wherein the step (f) comprises repeating steps (b), (c), (d), (g), and (e) for the number of rounds.

215. A method of encrypting a plaintext message, comprising:

(a) identifying the plaintext message, the plaintext message including a plurality of words;

(b) applying a mathematical function to at least one of the words;

(c) rotating a value originating from one of the words which is based on the result of the applying step (b) by a first number of bits resulting in another value which affects another one of the words, with the one of the words being affected by the other value only indirectly through the other one of the words;

(d) rotating a value which is based on the result of the rotating step (c) by a second number of bits derived from one of the words;

(e) applying a secret key to a value originating from one of the words; and (f) repeating steps (b), (c), (d), and (e) for a number of rounds.

216. The method of claim 215 wherein the applying the mathematical function comprises applying an operation on two unsigned integers of 32 bits or 64 bits.

217. The method of claim 215 wherein the first number of bits comprises a predetermined number of bits given by a log base 2 of the number of bits in a given one of the words.

218. A system for encrypting a plaintext message, comprising:

memory registers for storing the plaintext message, the plaintext message including a plurality of words;

a computing unit for applying a mathematical function to at least one of the words;

a first rotating function executed on the computing unit for rotating a value which is based on the result of the applying the mathematical function by a first number of bits;

a second rotating function executed on the computing unit for rotating a value which is based on the result of the first rotating function by a second number of bits, wherein one of the first number of bits and the second number of bits is a predetermined number of bits and the other one of the first number of bits and the second number of bits is derived from one of the words; and a function executed on the computing unit for applying a secret key to a value originating from one of the words.

219. The system of claim 218 wherein the computing unit for applying the mathematical function includes applying an operation on two unsigned integers of 32 bits or 64 bits.

220. The system of claim 219 wherein a result of the applying the operation has an equal probability of having bits equal to one or zero when one of the integers has an equal probability of having bits equal to one or zero.

221. The system of claim 218 wherein the predetermined number of bits is given by a log base 2 of the number of bits in a given one of the words.

222. The system of claim 218 further comprising:

a third rotating function executed on the computing unit for rotating a value which is based on the result of the second rotating function by a third number of bits, wherein the third number of bits is a predetermined number of bits different from the predetermined number of bits of the second rotation function.

223. A system for encrypting a plaintext message, comprising:

memory registers for storing the plaintext message, the plaintext message including a plurality of words;

a computing unit for applying a mathematical function to at least one of the words;

a first rotating function executed on the computing unit for rotating a value originating from one of the words which is based on the result of the applying the mathematical function by a first number of bits resulting in another value which affects another one of the words, with the one of the words being affected by the other value only indirectly through the other one of the words;

a second rotating function executed on the computing unit for rotating a value which is based on the result of the first rotating function by a second number of bits derived from one of the words; and a function executed on the computing unit for applying a secret key to a value originating from one of the words.

224. The system of claim 223 wherein the computing unit for applying the mathematical function includes applying an operation on two unsigned integers of 32 bits or 64 bits.

225. The system of claim 223 wherein the first number of bits comprises a predetermined number of bits given by a log base 2 of the number of bits in a given one of the words.

226. A storage medium encoded with machine-readable program code for encrypting a plaintext message, the program code including instructions for causing a computer to implement a method comprising:

(a) identifying the plaintext message, the plaintext message including a plurality of words;

(b) applying a mathematical function to at least one of the words;

(c) rotating a value which is based on the result of the applying step (b) by a first number of bits;

(d) rotating a value which is based on the result of the rotating step (c) by a second number of bits, wherein one of the first number of bits and the second number of bits is a predetermined number of bits and the other one of the first number of bits and the second number of bits is derived from one of the words;

(e) applying a secret key to a value originating from one of the words; and (f) repeating steps (b), (c), (d), and (e) for a number of rounds.

227. The storage medium of claim 226 wherein the method further comprises the applying the mathematical function comprising applying an operation on two unsigned integers of 32 bits or 64 bits.

228. The storage medium of claim 227 wherein the method further comprises a result of the applying the operation having an equal probability of having bits equal to one or zero when one of the integers has an equal probability of having bits equal to one or zero.

229. The storage medium of claim 226 wherein the method further comprises the predetermined number of bits being given by a log base 2 of the number of bits in a given one of the words.

230. The storage medium of claim 226 wherein the method further comprises:

(g) rotating a value which is based on the result of the rotating step (d) by a third number of bits, wherein the third number of bits is a predetermined number of bits different from the predetermined number of bits of step (d).

231. The storage medium of claim 230 wherein the method further comprises the step (f) comprising repeating steps (b), (c), (d), (g), and (e) for the number of rounds.

232. A storage medium encoded with machine-readable program code for encrypting a plaintext message, the program code including instructions for causing a computer to implement a method comprising:

(a) identifying the plaintext message, the plaintext message including a plurality of words;

(b) applying a mathematical function to at least one of the words;

(c) rotating a value originating from one of the words which is based on the result of the applying step (b) by a first number of bits resulting in another value which affects another one of the words, with the one of the words being affected by the other value only indirectly through the other one of the words;

(d) rotating a value which is based on the result of the rotating step (c) by a second number of bits derived from one of the words;

(e) applying a secret key to a value originating from one of the words; and (f) repeating steps (b), (c), (d), and (e) for a number of rounds.

233. The storage medium of claim 232 wherein the method further comprises the applying the mathematical function comprising applying an operation on two unsigned integers of 32 bits or 64 bits.

234. The storage medium of claim 232 wherein the method further comprises the first number of bits comprising a predetermined number of bits given by a log base 2 of the number of bits in a given one of the words.

235. A method of encrypting a plurality of words, comprising:

(a) rotating a value which is based directly or indirectly on at least one of the words by a first number of bits;

(b) rotating a value which is based on the result of the rotating step (a) by a second number of bits, wherein one of the first number of bits and the second number of bits is a predetermined number of bits and the other one of the first number of bits and the second number of bits is derived from one of the words;

(c) rotating a value which is based on the result of the rotating step (b) by a third number of bits, wherein the third number of bits is a predetermined number of bits different from the predetermined number of bits of step (b);

(d) applying a secret key to a value originating from one of the words; and (e) repeating steps (a), (b), (c) and (d) for a number of rounds.

236. The method of claim 235 further comprising:

(f) applying a mathematical function to a value originating from one of the words.

237. The method of claim 235 wherein the step (e) comprises repeating steps (a), (b), (c), (d), and (f) for the number of rounds.

238. The method of claim 236 wherein the applying the mathematical function comprises applying an operation on two unsigned integers of 32 bits or 64 bits.

239. A system for encrypting a plurality of words, comprising:

a computing unit for processing the plurality of words;

a first rotating function executed on the computing unit for rotating a value which is based on at least one of the words by a first number of bits;

a second rotating function executed on the computing unit for rotating a value which is based on the result of the first rotating function by a second number of bits, wherein one of the first number of bits and the second number of bits is a predetermined number of bits and the other one of the first number of bits and the second number of bits is derived from one of the words;

a third rotating function executed on the computing unit for rotating a value which is based on the result of the second rotating function by a third number of bits, wherein the third number of bits is a predetermined number of bits different from the predetermined number of bits of the second rotating function; and a function executed on the computing unit for applying a secret key to a value originating from one of the words.

240. The system of claim 239 further comprising:

mathematical function executed the computing unit for operating on a value originating from one of the words.

241. The system of claim 240 wherein the computing unit for applying the mathematical function includes applying an operation on two unsigned integers of 32 bits or 64 bits.

242. A storage medium encoded with machine-readable program code for encrypting a plurality of words, the program code including instructions for causing a computer to implement a method comprising:

(a) rotating a value which is based on at least one of the words by a first number of bits;

(b) rotating a value which is based on the result of the rotating step (a) by a second number of bits, wherein one of the first number of bits and the second number of bits is a predetermined number of bits and the other one of the first number of bits and the second number of bits is derived from one of the words;

(c) rotating a value which is based on the result of the rotating step (b) by a third number of bits, wherein the third number of bits is a predetermined number of bits different from the predetermined number of bits of step (b);

(d) applying a secret key to a value originating from one of the words; and (e) repeating steps (a), (b), (c) and (d) for a number of rounds.

243. The storage medium of claim 242 wherein the method further comprises:
  (f) applying a mathematical function to a value originating from one of the words.

244. The storage medium of claim 243 wherein the method further comprises the step (e) comprising repeating steps (a), (b), (c), (d), and (f) for the number of rounds.

245. The storage medium of claim 243 wherein the method further comprises the applying the mathematical function comprising applying an operation on two unsigned integers of 32 bits or 64 bits.

246. A method of decrypting a plaintext message, comprising:
  (a) identifying the plaintext message, the plaintext message including a plurality of words;
  (b) applying a mathematical function to at least one of the words;
  (c) rotating a value which is based on the result of the applying step (b) by a first number of bits;
  (d) rotating a value which is based on the result of the rotating step (c) by a second number of bits, wherein one of the first number of bits and the second number of bits is a predetermined number of bits and the other one of the first number of bits and the second number of bits is derived from one of the words;
  (e) applying a secret key to a value originating from one of the words; and
  (f) repeating steps (b), (c), (d), and (e) for a number of rounds.

247. A method of decrypting a plaintext message, comprising:
  (a) identifying the plaintext message, the plaintext message including a plurality of words;
  (b) applying a mathematical function to at least one of the words;
  (c) rotating a value originating from one of the words which is based on the result of the applying step (b) by a first number of bits resulting in another value which affects another one of the words, with the one of the words being affected by the other value only indirectly through the other one of the words;
  (d) rotating a value which is based on the result of the rotating step (c) by a second number of bits derived from one of the words;
  (e) applying a secret key to a value originating from one of the words; and
  (g) repeating steps (b), (c), (d), and (e) for a number of rounds.

248. A method of decrypting a plurality of words, comprising:
  (a) rotating a value which is based on at least one of the words by a first number of bits;
  (b) rotating a value which is based on the result of the rotating step (a) by a second number of bits, wherein one of the first number of bits and the second number of bits is a predetermined number of bits and the other one of the first number of bits and the second number of bits is derived from one of the words;
  (c) rotating a value which is based on the result of the rotating step (b) by a third number of bits, wherein the third number of bits is a predetermined number of bits different from the predetermined number of bits of step (b);
  (d) applying a secret key to a value originating from one of the words; and
  (e) repeating steps (a), (b), (c) and (d) for a number of rounds.

* * * * *

UNITED STATES PATENT AND TRADEMARK OFFICE
CERTIFICATE OF CORRECTION

PATENT NO. : 6,199,162 B1
DATED : March 6, 2001
INVENTOR(S) : Frank C. Luyster

It is certified that error appears in the above-identified patent and that said Letters Patent is hereby corrected as shown below:

<u>Title page,</u>
Item [56], References Cited,
U.S. PATENT DOCUMENTS, insert:
-- 4,982,429    1/1991        Takaragi et al.
5,103,479       4/1992        Takaragi et al.
5,835,600       10/1998       Rivest --

FOREIGN PATENT DOCUMENTS, insert:
-- PCT/US99/13358 6/1999 (WO) --

OTHER PUBLICATIONS, insert:
-- AES - A Crypto Algorithm for Twenty-First Century - The First Advanced Encryption Standard Candidate Conference August 20-22, 1998 sponsored by: Information Technology Laboratory National Institute of Standards and Technology --

<u>Column 2,</u>
Line 17, after "use", delete "so me" and insert therefor -- some --

<u>Column 6,</u>
Line 3, delete "modem" and insert therefor -- modern --

<u>Column 7,</u>
Line 9, before "(see,", delete "Test 1" and insert therefor -- Test1 --
Line 44, after "is", delete "a" and insert therefor -- an invertible --

<u>Column 8,</u>
Line 4, after "such", delete "a" and insert therefor -- an --
Line 8, after "Encryption", delete "Algorithim." and insert therefor -- Algorithm. --
Line 35, delete "ail" and insert therefor -- art --
Line 48, after "and", delete "$K_2$" and insert therefor -- K2 --
Line 49, after "of", delete "Kw" and insert therefor -- K1 --
Line 53, after "encryption", delete "Computes" and insert therefor -- computes --

<u>Column 9,</u>
Line 8, after "possible" delete "bit-"
Line 11, after "values", delete "from" and insert therefor -- in --
Line 15, after "30)", delete "in" and insert therefor -- from --
Line 30, after "38)", delete "in" and insert therefor -- from --
Line 36, after "ciphertext", delete "value" and insert therefor -- values --

UNITED STATES PATENT AND TRADEMARK OFFICE
CERTIFICATE OF CORRECTION

PATENT NO.    : 6,199,162 B1
DATED         : March 6, 2001
INVENTOR(S)   : Frank C. Luyster It is certified that error appears in the above-identified patent and that said Letters Patent is hereby corrected as shown below:

Column 11,
Line 15, after "input", delete "segment" and insert therefor -- segments --

Column 12,
Line 66, after "all", delete "data- dependent" and insert therefor -- data-dependent --

Column 16,
Line 19, after "subtraction", delete "bit-wise" and insert therefor -- bitwise --

Column 21,
Line 34, after "containing", delete "O's" and insert -- therefor -- 0's --

Column 22,
Line 52, after "segment", delete "RO" and insert therefor -- R0 --

Column 23,
Line 24, after "a", delete "segment of" and insert therefor -- segment, --

Column 27,
Line 23, after "not", delete "pail", and insert therefor -- part --
Line 28, after "input", delete "RI", and insert therefor -- R1 --

Column 28,
Line 15, after "the", delete "stricture", and insert therefor -- "structure" --

Column 29,
Line 60, after "moved"," delete "i.e." and insert therefor -- e.g. --

Column 32,
Line 2, after "bit-moving" delete "," (comma)
Line 53, after "Due", delete "to-such" and insert therefor -- to such --

Column 34,
Line 35, after "bit-shifts", delete "arc" and insert therefor -- are --

Column 36,
Line 58, delete "b lock" and insert therefor -- block --

Column 40,
Lines 9 and 10, after "generated", begin new paragraph

UNITED STATES PATENT AND TRADEMARK OFFICE
CERTIFICATE OF CORRECTION

PATENT NO.     : 6,199,162 B1
DATED          : March 6, 2001
INVENTOR(S)    : Frank C. Luyster It is certified that error appears in the above-identified patent and that said Letters Patent is hereby corrected as shown below:

Column 49,
Line 55, after "by", delete "9" (within double quotes) and insert therefor -- g --

Column 54,
Line 26, after "are", delete "Even Round"
Line 54, after "course", delete "bc" and insert therefor -- be --

Column 57,
Line 51, after "using", delete "," (comma)

Column 58,
Line 8, after "into", delete "out-put" and insert therefor -- output --

Column 59,
Line 16, after "or", delete "in directly" and insert therefor -- indirectly --
Line 16, after "least", delete "on e" and insert therefor -- one --

Column 60,
Line 17, after "value", delete "to" and insert therefor -- of --
Line 31, after "least", delete "on e" and insert therefor -- one --
Line 31, after "variable", delete "bit- shifting" and insert therefor -- bit-shifting --
Line 51, after "said", delete "bit -moving" and insert therefor -- bit-moving --
Line 57, after "present", delete "bin-position" and insert therefor -- bit-position --

Column 61,
Line 9, after "circular", delete "bit- rotating" and insert therefor -- bit-rotating --
Line 10, after "said" (second occurrence), delete "bit moving" and insert therefor -- bit-moving --
Line 23, after "of", delete "ad" and insert therefor -- said --

Column 62,
Line 19, after "round," insert -- said present bit-position being different than said other bit-position --
Lines 20 and 21, delete "said present bit-position being different than said other bit-position,"
Line 21, before "variable" begin a new paragraph
Line 24, after "and" delete "wherein"
Line 25, before "each" begin a new paragraph and insert -- wherein --

UNITED STATES PATENT AND TRADEMARK OFFICE
CERTIFICATE OF CORRECTION

PATENT NO. : 6,199,162 B1
DATED : March 6, 2001
INVENTOR(S) : Frank C. Luyster

It is certified that error appears in the above-identified patent and that said Letters Patent is hereby corrected as shown below:

Column 63,
Line 22, after "said" (second occurrence), delete "bit moving" and insert therefor -- bit moving --

Column 65,
Line 1, after "claims" delete "135" and insert -- therefor -- 95 --

Column 67,
Line 22, after "causing", delete "," (comma)
Line 64, after "said", delete "Output" and insert therefor -- output --

Column 72,
Line 7, after "present", delete "bit value" and insert therefor -- bit-value --
Line 45, after "present", delete "bit value" and insert therefor -- bit value --
Line 54, after "bit-moving", delete "," (comma)

Column 73,
Line 30, after "present", delete "bit value" and insert therefor -- bit-value --
Line 65, after "present", delete "bit value" and insert therefor -- bit-value --

Column 75,
Line 23, after "of", delete "bit s" and insert therefor -- bits --
Line 30, after "said" (second occurrence), delete "bit moving" and insert therefor -- bit-moving --
Line 35, after "comprises", delete "pre determined" and insert therefor -- predetermined --

Column 76,
Line 10, after "claim", delete "199" and insert therefor -- 200 --
Line 13, after "claim", delete "199" and insert therefor -- 200 --
Line 14, after "bit-moving", delete "," (comma)
Line 17, after "claim", delete "199" and insert therefor -- 200 --
Line 36, after "a", delete "n"

UNITED STATES PATENT AND TRADEMARK OFFICE
CERTIFICATE OF CORRECTION

PATENT NO. : 6,199,162 B1
DATED : March 6, 2001
INVENTOR(S) : Frank C. Luyster

It is certified that error appears in the above-identified patent and that said Letters Patent is hereby corrected as shown below:

<u>Column 76 cont'd,</u>
Line 37, before "of" (first occurrence), delete "umber" and insert therefor -- number --
Line 37, after "of" (first occurrence), delete "bit s" and insert therefor -- bits --
Line 50, after "present", delete "bit value" and insert therefor -- bit-value --

Signed and Sealed this

Twenty-fourth Day of September, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.      : 6,199,162 B1
DATED           : March 6, 2001
INVENTOR(S)     : Frank C. Luyster Page 1 of 1

It is certified that error appears in the above-identified patent and that said Letters Patent is hereby corrected as shown below:

<u>Column 81,</u>
Lines 12, 14, 30 and 32, delete "plaintext" and insert therefor -- ciphertext --

Signed and Sealed this

Nineteenth Day of August, 2003

JAMES E. ROGAN
*Director of the United States Patent and Trademark Office*

(12) EX PARTE REEXAMINATION CERTIFICATE (4942nd)
United States Patent
Luyster

(10) Number: US 6,199,162 C1
(45) Certificate Issued: May 25, 2004

(54) BLOCK CIPHER METHOD

(75) Inventor: Frank C. Luyster, 100 Riverside La., Riverside, CT (US) 06878

(73) Assignee: Frank C. Luyster, Riverside, CT (US)

Reexamination Request:
No. 90/006,364, Aug. 23, 2002

Reexamination Certificate for:
Patent No.: 6,199,162
Issued: Mar. 6, 2001
Appl. No.: 09/506,285
Filed: Feb. 17, 2000

Certificate of Correction issued Sep. 24, 2002.

Certificate of Correction issued Aug. 19, 2003.

Related U.S. Application Data

(63) Continuation of application No. 09/154,391, filed on Sep. 16, 1998, now Pat. No. 6,182,216.
(60) Provisional application No. 60/059,142, filed on Sep. 17, 1997, provisional application No. 60/062,992, filed on Oct. 23, 1997, provisional application No. 60/064,331, filed on Oct. 30, 1997, provisional application No. 60/094,632, filed on Jul. 30, 1998, provisional application No. 60/096,788, filed on Aug. 17, 1998, provisional application No. 60/096,921, filed on Aug. 18, 1998, and provisional application No. 60/098,905, filed on Sep. 2, 1998.

(51) Int. Cl.$^7$ ................................................. G06F 1/26
(52) U.S. Cl. ........................ 713/168; 713/171; 713/200; 713/201; 380/28; 380/44
(58) Field of Search ............................. 380/28, 37, 42, 380/43, 44

(56) References Cited

PUBLICATIONS

RSA Security Inc.'s Responses to Franklin Luyster's First Set of Interrogatories to RSA Security Inc. (Nos. 1–13) filed Apr. 30, 2002.
RSA Security Inc.'s Supplemental Responses to Interrogatory Nos. 1, 3, 4, 6, 8–12 filed Aug. 1, 2002.
Complaint filed Dec. 10, 2001.
RSA Security Inc.'s Answer and Counterclaim filed Dec. 21, 2001.
Plaintiff/Defendant–in–Counterclaim's Answer to Counterclaims filed Jan. 9, 2002.
First Amended Complaint filed Mar. 6, 2002.
RSA Security Inc.'s Answer to First Amended Complaint and Counterclaims filed Mar. 26, 2002.
Plaintiff/Defendant–in–Counterclaim's Franklin Luyster's Answer to Defendant, RSA Security, Inc.'s Answer to First Amended Complaint and Counterclaims filed Apr. 3, 2002.
Plaintiff Franklin Luyster's Answers to Defendant RSA Security Inc.'s First Set of Interrogatories filed Apr. 1, 2002.
Plaintiff Franklin Luyster's Proposed Terms and Claim Elements for Construction filed May 8, 2002.
Plaintiff Franklin Luyster's Supplemental Answers to Defendant RSA Security Inc.'s First Set of Interrogatories filed May 21, 2002.

(List continued on next page.)

Primary Examiner—Matthew B. Smithers

(57) ABSTRACT

A data encryption system for encrypting an n-bit block of input in a plurality of rounds is presented, where n is preferably 128 bits or more. The data encryption system includes a computing unit for the execution of each round; memory for storing and loading segments; a bit-moving function capable of rotating, shifting, or bit-permute round segments by predetermined numbers of bits preferably to achieve active and effective fixed rotation; a linear combination function which provides new one-to-one round segments using a round operator generally from one algebraic group to combine two different one-to-one round segments taken from one one-to-one round segment set; and a non-linear function which affects a one-to-one round segment from a particular one-to-one round segment set based on a value which depends on a preselected number of bits in a preselected location from a different one-to-one round segment from the same one-to-one round segment set. The nonlinear function is a variable rotation function or an s-box. A subkey combining function is generally employed in each round to provide new round segments by combining a round segment typically linearly with a subkey segment.

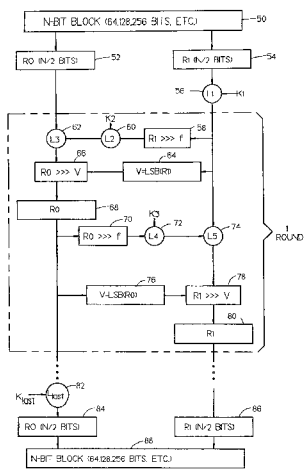

OTHER PUBLICATIONS

Plaintiff Franklin Luyster's Second Supplemental Answers to Defendant RSA Security Inc.'s First Set of Interrogatories filed Aug. 16, 2002.

Stipulation of Dismissal with Prejudice filed Sep. 10, 2002.

RSA Security Inc.'s Responses and Objections to Plaintiff Franklin Luyster's First Request for Admissions filed Aug. 5, 2002.

M.J.B. Robshaw, "Block Ciphers," RSA Laboratories Technical Report TR–601, Version 2.0, Aug. 2, 1995.

Rolald L. Rivest, "The RC5 Encryption Algorithm," Fast Software Encryption, LNCS 1008, B. Preneel, Ed., Springer–Verlag, 1995, pp. 86–96.

B. Kaliski and T. L. Yin, "On differential and linear cryptanalysis of the RC5 encryption algorithm," in Advances in Cryptology—CRYPTO '95, D. Coppersmith (Ed), LNCS 963, Springer Verlag, 1995, pp. 171–184.

G. Alvarez, D. de la Guiaia, F. Montoya and A. Peinado, "Akelarre: a new Block Cipher Algorithm," Proceedings of SAC '96, Third Annual Workshop on Selected Areas in Cryptography, Queen's University, Kingston, Ontario, 1996.

B. Schneier, "Applied Cryptography Second Edition: protocols, algorithms, and source code in C," John Wiley & Sons, 1996, pp. 331–334.

B. Schneier, "Applied Cryptography Second Edition: protocols, algorithms, and source code in C," John Wiley & Sons, 1996, pp. 442–445.

B. Schneier, "Applied Cryptography Second Edition; protocols, algorithms, and source code in C," John Wiley & Sons, 1996, pp. 398–400.

L. Knudsen and W. Meier, "Improved Differential Attacks on RC5," in Advances in Cryptology—CRYPTO'96, Aug. 18–22, 1996, LNCS 1109, Springer Verlag, 1996, pp. 216–228.

Y. Zheng, "The SPEED Cipher," in Proceedings of Financial Cryptography '97, Feb. 24–28, 1997, Anguilla, British West Indies, Rafael Hirschfeld (Ed.), Springer–Verlag, pp. 71–89.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 113–115, 118–127, 158–160, 191–193, 213, 214, 222, 230, 231, 235–245 and 248 is confirmed.

Claims 1–112, 116, 117, 128–157, 161–190, 194–212 and 215–221, 223–229, 232–234, 246, 247 are cancelled.

\* \* \* \* \*